(12) United States Patent
Fiske

(10) Patent No.: US 8,712,942 B2
(45) Date of Patent: *Apr. 29, 2014

(54) ACTIVE ELEMENT MACHINE COMPUTATION

(75) Inventor: Michael Stephen Fiske, San Francisco, CA (US)

(73) Assignee: AEMEA Inc., Las Vegas, NV (US)

(*) Notice: Subject to any disclaimer, the term of this patent is extended or adjusted under 35 U.S.C. 154(b) by 1866 days.

This patent is subject to a terminal disclaimer.

(21) Appl. No.: 11/789,517

(22) Filed: Apr. 24, 2007

(65) Prior Publication Data

US 2007/0288668 A1 Dec. 13, 2007

Related U.S. Application Data

(63) Continuation-in-part of application No. PCT/US2006/026159, filed on Jul. 3, 2006, which is a continuation-in-part of application No. 11/178,665, filed on Jul. 11, 2005, now Pat. No. 8,010,467, and a continuation-in-part of application No. 11/477,201, filed on Jun. 27, 2006, now Pat. No. 8,019,705, application No. 11/789,517, which is a continuation-in-part of application No. 10/791,249, filed on Mar. 2, 2004, now Pat. No. 7,398,260.

(60) Provisional application No. 60/699,244, filed on Jul. 14, 2005, provisional application No. 60/456,715, filed on Mar. 24, 2003.

(51) Int. Cl.
*G06E 1/00* (2006.01)
*G06E 3/00* (2006.01)
*G06F 15/18* (2006.01)
*G06G 7/00* (2006.01)
*G06N 3/00* (2006.01)

(52) U.S. Cl.
USPC ............................................ 706/31; 706/14

(58) Field of Classification Search
USPC ...................................................... 706/14–44
See application file for complete search history.

(56) References Cited

U.S. PATENT DOCUMENTS 3,950,733 A * 4/1976 Cooper et al. ................. 706/26
4,255,811 A 3/1981 Adler
(Continued)

FOREIGN PATENT DOCUMENTS

WO WO/2007/008519 A2 1/2007
WO WO/2007/008519 A2 1/2007
WO WO/2007/075156 A2 7/2007

OTHER PUBLICATIONS

Gurney, K. "An Introduction to Neural Networks", 1997. ISBN: 1-85728-503-4.*

(Continued)

*Primary Examiner* — Jeffrey A Gaffin
*Assistant Examiner* — Benjamin Buss
(74) *Attorney, Agent, or Firm* — David Lewis

(57) ABSTRACT

An active element machine is a new kind of computing machine. When implemented in hardware, the active element machine can execute multiple instructions simultaneously, because every one of its computing elements is active. This greatly enhances the computing speed. By executing a meta program whose instructions change the connections in a dynamic active element machine, the active element machine can perform tasks that a digital computer are unable to compute.

In an embodiment, instructions in a computer language are translated into instructions in a register machine language. The instructions in the register machine language are translated into active element machine instructions.

In an embodiment, an active element machine may be programmed using instructions for a register machine. The active element machine is not limited to these embodiments.

72 Claims, 21 Drawing Sheets

(56) References Cited

U.S. PATENT DOCUMENTS

| | | | |
|---|---|---|---|
| 4,316,055 A | | 2/1982 | Feistel |
| 4,405,829 A | | 9/1983 | Rivest et al. |
| 4,660,166 A | | 4/1987 | Hopfield |
| 4,961,005 A | * | 10/1990 | Salam ............... 706/33 |
| 4,962,342 A | | 10/1990 | Mead |
| 5,001,753 A | | 3/1991 | Davio et al. |
| 5,148,514 A | * | 9/1992 | Arima et al. ............. 706/34 |
| 5,155,802 A | | 10/1992 | Mueller |
| 5,216,752 A | * | 6/1993 | Tam ................ 706/17 |
| 5,297,207 A | | 3/1994 | Degele |
| 5,303,328 A | * | 4/1994 | Masui et al. ............. 706/25 |
| 5,325,464 A | * | 6/1994 | Pechanek et al. ............ 706/41 |
| 5,369,731 A | | 11/1994 | Masumoto |
| 5,375,170 A | | 12/1994 | Shamir |
| 5,422,983 A | | 6/1995 | Castelaz |
| 5,481,644 A | * | 1/1996 | Inazumi ............. 706/10 |
| 5,511,123 A | | 4/1996 | Adams |
| 5,524,175 A | | 6/1996 | Sato |
| 5,524,176 A | | 6/1996 | Narita |
| 5,619,618 A | | 4/1997 | Bigus |
| 5,687,238 A | | 11/1997 | Shimada |
| 5,724,428 A | | 3/1998 | Rivest |
| 5,832,466 A | | 11/1998 | Feldgajer |
| 5,835,600 A | | 11/1998 | Rivest et al. |
| 6,031,911 A | | 2/2000 | Adams et al. |
| 6,049,793 A | | 4/2000 | Tomita |
| 6,169,771 B1 | * | 1/2001 | Shou et al. ............. 375/343 |
| 6,256,619 B1 | | 7/2001 | Grichnik |
| 6,292,586 B1 | * | 9/2001 | Kawakami et al. ........... 382/236 |
| 6,327,661 B1 | | 12/2001 | Kocher et al. |
| 6,332,137 B1 | | 12/2001 | Hori |
| 6,347,143 B1 | | 2/2002 | Goff et al. |
| 6,470,261 B1 | | 10/2002 | Ng et al. |
| 6,601,053 B1 | | 7/2003 | Schaffer et al. |
| 6,678,548 B1 | * | 1/2004 | Echauz et al. ............ 600/544 |
| 6,704,757 B1 | * | 3/2004 | Ohmi et al. ............ 708/3 |
| 6,751,601 B2 | | 6/2004 | Zegers |
| 6,754,645 B2 | | 6/2004 | Shi |
| 6,971,008 B2 | | 11/2005 | Wasilewski et al. |
| 7,215,769 B2 | | 5/2007 | Fiske |
| 7,249,116 B2 | | 7/2007 | Fiske |
| 7,317,799 B2 | | 1/2008 | Hammersmith et al. |
| 7,398,260 B2 | | 7/2008 | Fiske |
| 7,657,033 B2 | | 2/2010 | Fiske |
| 2002/0038294 A1 | * | 3/2002 | Matsugu ............. 706/20 |
| 2002/0059154 A1 | * | 5/2002 | Rodvold ............. 706/26 |
| 2002/0172366 A1 | | 11/2002 | Peterka et al. |
| 2003/0147532 A1 | | 8/2003 | Hakkarainen et al. |
| 2003/0183878 A1 | * | 10/2003 | Tajiri et al. ............ 257/350 |
| 2003/0212645 A1 | | 11/2003 | Schaffer et al. |
| 2004/0128004 A1 | | 7/2004 | Adams |
| 2004/0162795 A1 | * | 8/2004 | Dougherty et al. ............. 706/20 |
| 2005/0075702 A1 | * | 4/2005 | Shafer ............. 607/72 |
| 2006/0259894 A1 | | 11/2006 | Fiske |
| 2006/0277533 A1 | | 12/2006 | Fiske |
| 2007/0079108 A1 | | 4/2007 | Fiske |
| 2007/0288668 A1 | | 12/2007 | Fiske |

OTHER PUBLICATIONS

Reyneri, L.M. "Theoretical and implementation aspects of pulse streams: an overview." Proceedings of the Seventh International Conference on Microelectronics for Neural, Fuzzy and Bio-Inspired Systems, 1999. MicroNeuro'99. IEEE, 1999.*

Murray, A.F. et al. "Pulse-stream VLSI neural networks mixing analog and digital techniques." IEEE Transactions on Neural Networks, vol. 2, No. 2, pp. 193-204, 1991.*

Maniezzo, V. "Genetic evolution of the topology and weight distribution of neural networks." IEEE Transactions on Neural Networks, vol. 5, No. 1, pp. 39-53, 1994.*

Upegui, A. et al. "A methodology for evolving spiking neural-network topologies on line using partial dynamic reconfiguration." ICCI—International Conference on Computational Intelligence, Medellin, Colombia. 2003.*

Angeline, P.J. et al. "An evolutionary algorithm that constructs recurrent neural networks." IEEE Transactions on Neural Networks, vol. 5, No. 1, pp. 54-65, 1994.*

Yao, X. "Evolving artificial neural networks." Proceedings of the IEEE, vol. 87, No. 9, pp. 1423-1447, 1999.*

Horio, Y. et al. "An asynchronous spiking chaotic neuron integrated circuit", Neurocomputing, vol. 64, pp. 447-472, Available online Dec. 7, 2004. doi:10.1016/j.neucom.2004.09.001.*

G.E.P. Box, Evolutionary Operation: A Method for Increasing Industrial Production, Applied Statistics, 1957, pp. 81-101 vol. 6, No. 2, Royal Statistical Society, England.

H.J. Bremerman, Optimization Through Evolution and Recombination, Self-Organizing Systems, 1962, pp. 93-106, Spartan Books, Washington D.C.

Carver Mead, Analog VLSI and Neural Systems, 1989, pp. 36-39, 67-81, 208-209, 260-263 Addison-Wesley, United States.

Wilfrid Rall, Theoretical Significance of Dendritic Trees for Neuronal Input-Output Relations, The Theoretical Foundation of Dendritic Function, 1964, pp. 122-145, MIT Press.

Alan Turing, On Computable Numbers with an Application to the Entscheidungs Problem, 1936, Proceedings London Mathematical Society, pp. 230-265, vol. 42, pp. 544-546, vol. 93, England.

George J. Friedman. Digital Simulation of an Evolutionary Process. 1959. pp. 171-184, vol. 4 of General Systems Yearbook.

W.W. Bledsoe, The Use of Biological Concepts in the Analytical Study of Systems. 1961. ORSA-TIMS National Meeting, San Francisco. pp. 1-25.

Lindgren et. al. "Regular Language Inference Using Evolving Neural Networks" IEEE 1992.

Elias, J.G. "Genetic Generation of Connection Patterns for a Dynamic Artificial Neural Network" IEEE 1992.

Dasgupta et. al. "Designing Application—Specific Neural Networks Using the Structured Genetic Algorithm" IEEE 1992.

Schaffer et. al. "Combinations of Genetic Algorithms and Neural Networks: A Survey of the State of the Art" IEEE 1992.

Wiltink, European Search Report mailed Feb. 1, 2010, for European Application 06786344.9. 7 pages.

Schaffer et al. "Combinations of Genetic Algorithms and Neural Networks: A Survey of the State of the Art" IEEE 1992.

de Garis, H. et al. "The CAM-brain Machine (CBM): an FPGA based hardware tool that evolves a 1000 neuron-net circuit module in seconds and updates a 75 million neuron artificial brain for real-time robot control" Neurocomputing 2002.

Siegelmann, H.T. et al. "Neural Networks and Analog Computation Beyond the Turing Limit" pp. 29-33, 153-164. Birkhäuser 1999.

Azam, F. "Biologically Inspired Modular Neural Networks" PhD Dissertation. Virginia Tech. May 2000.

Marian, I.D. "A Biologically Inspired Model of Motor Control of Direction" MS Thesis. Univerisity College, Dublin, Ireland. Oct. 2002.

Atsumi, M. "Artificial Neural Development for Pulsed Neural Network Design—A Simulation Experiment on Animal's Cognitive Map Genesis" IEEE. 2000.

Hérault, L. "Optimization by Pulsed Recursive Neural Networks" IEEE. 1995.

Gallagher, J.C. et al. "Continuous Time Recurrent Neural Networks: A Paradigm for Evolvable Analog Controller Circuits" IEEE. 2000.

Floreuno, D. et al. "Evolution of Spiking Neural Controllers for Autonomous Vision-Based Robots" 2001.

* cited by examiner

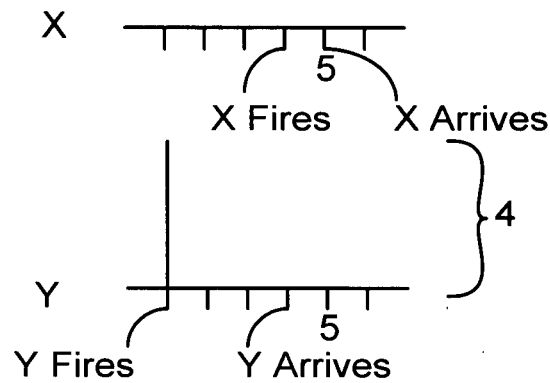
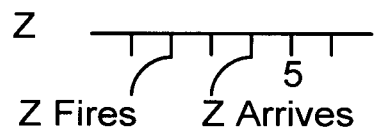
FIG. 1C

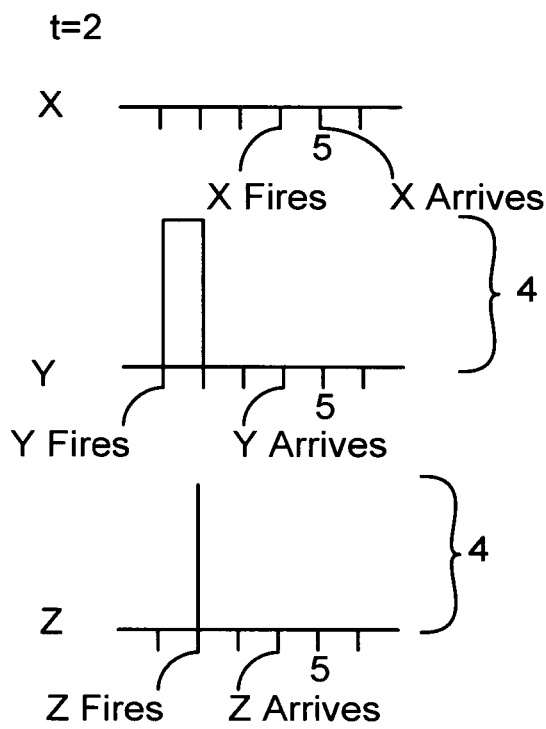
FIG. 1D

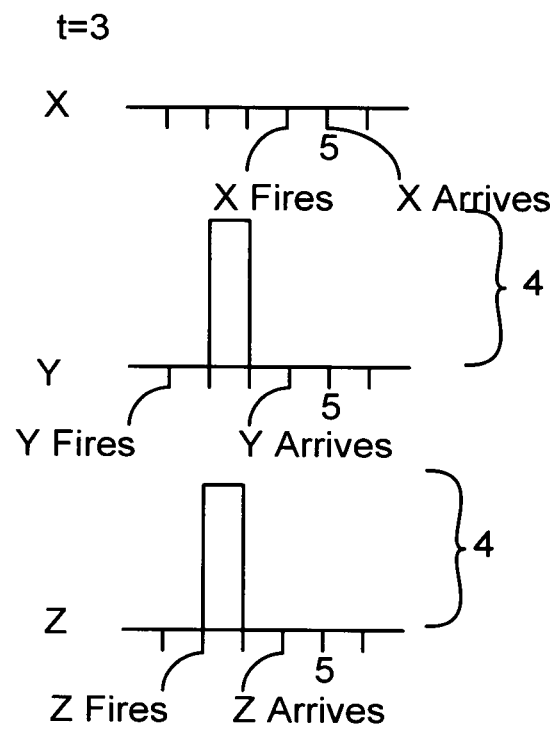
FIG. 1E

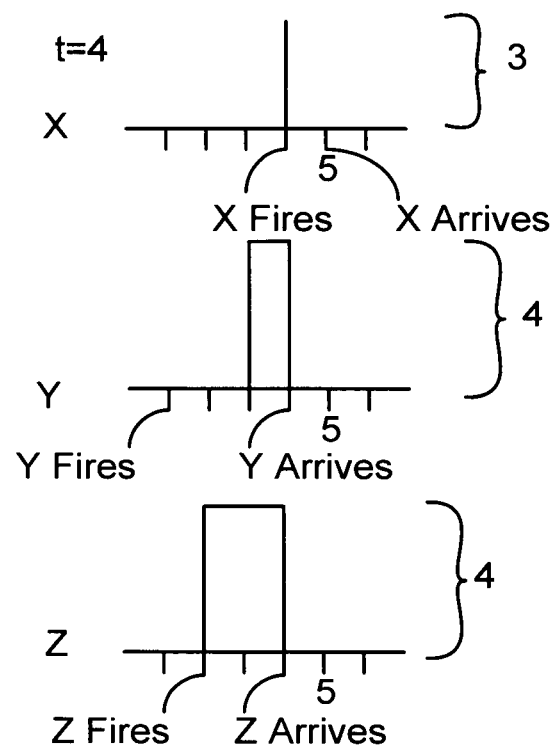
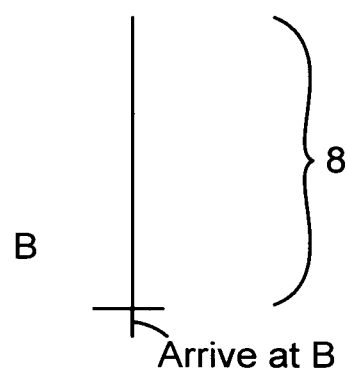
FIG. 1F

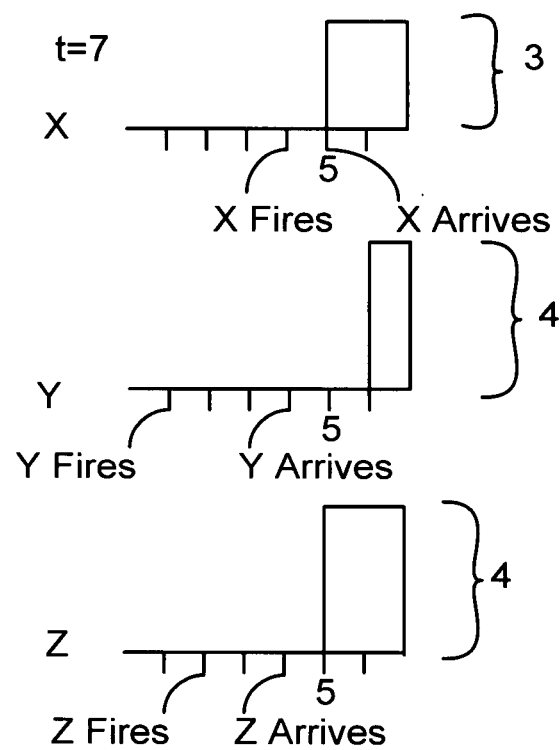
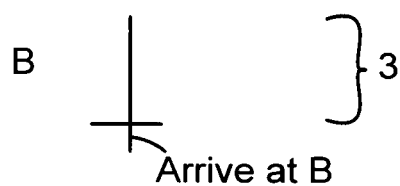
FIG. 1I

FIG. 2
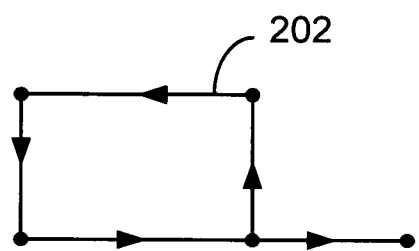
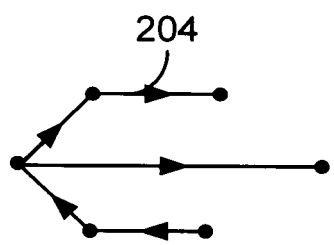

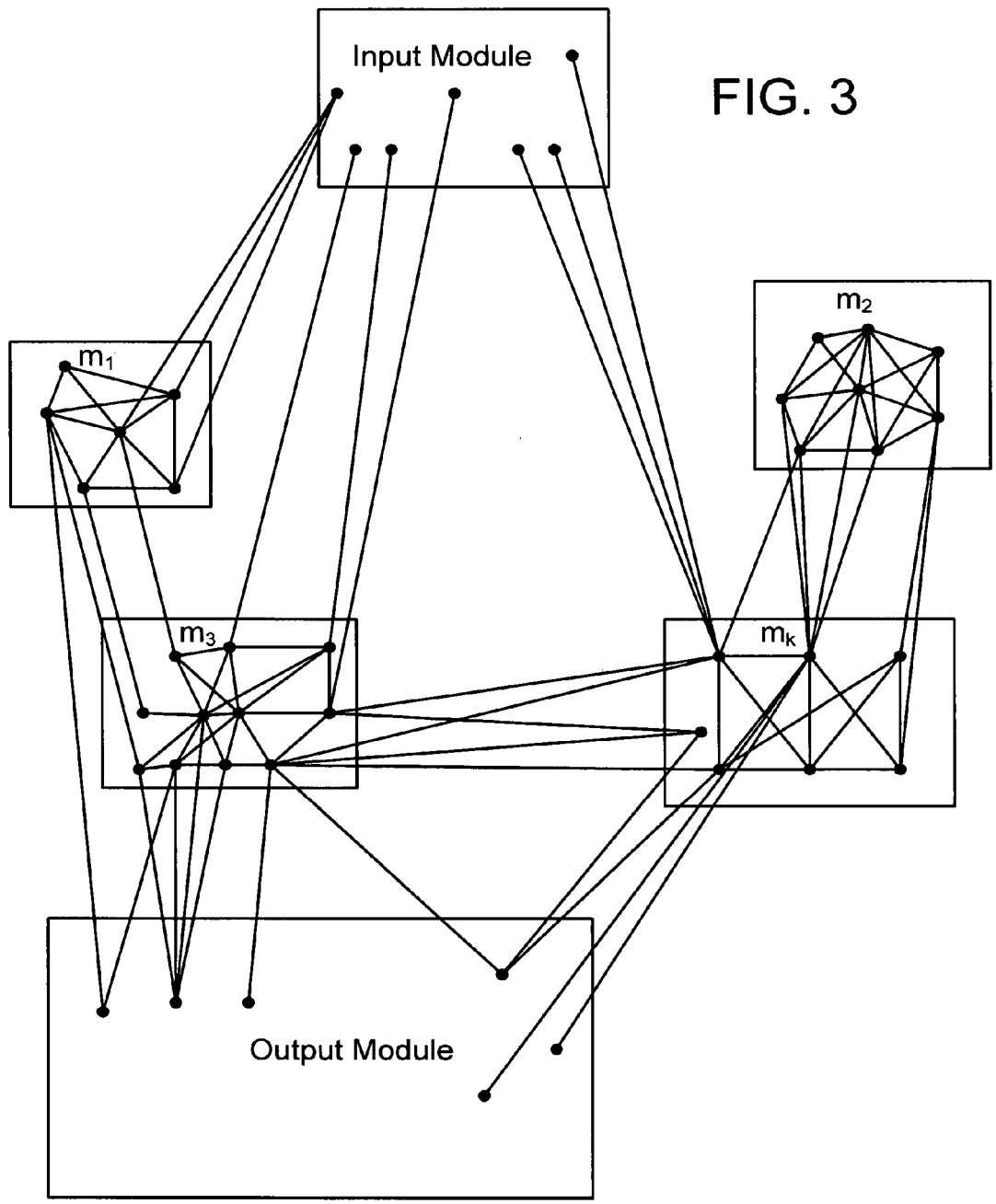

FIG. 4    CGE Crossover
Before Crossover
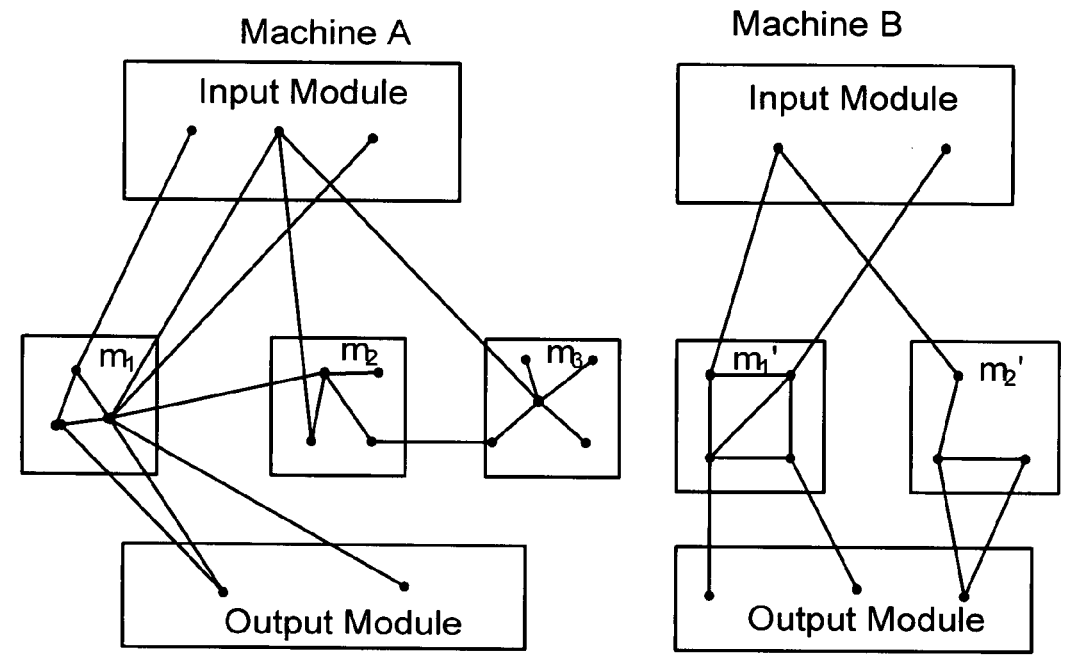
After Crossover
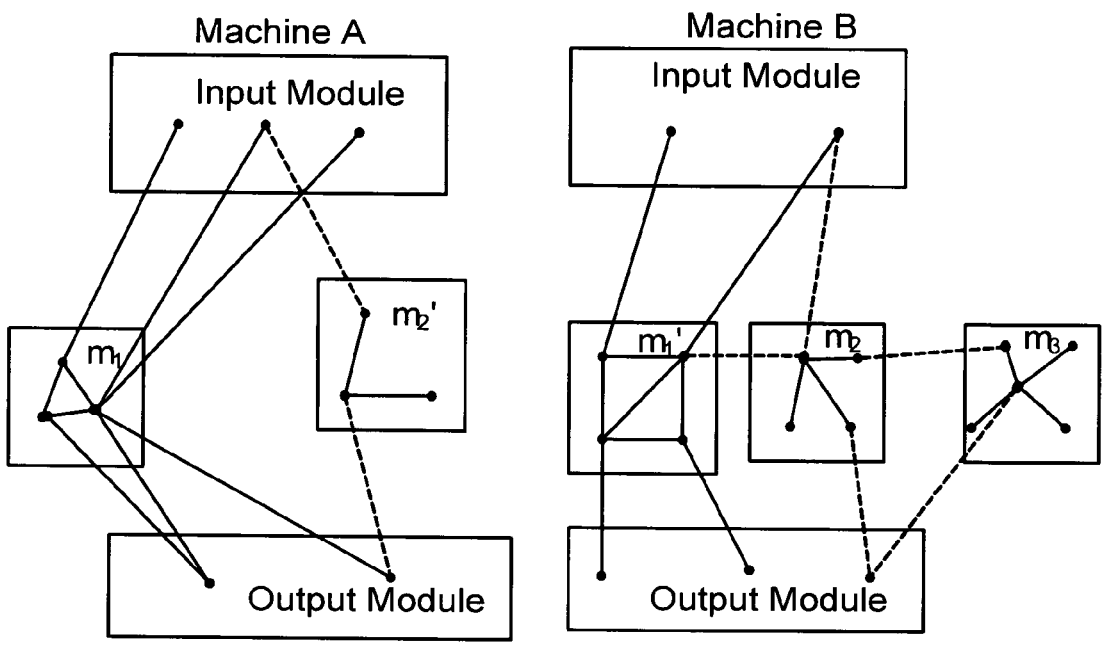
- - - - - - - - - - - - New External Connections Error Tolerance in Effectors Active Element

ACTIVE ELEMENT MACHINE COMPUTATION

RELATED APPLICATIONS

This application is a continuation-in-part of Patent Cooperation Treaty Application, Serial Number PCT/US06/26159, entitled "Active Element Machine Computation," filed Jul. 3, 2006, which
- is a continuation-in-part of U.S. patent application Ser. No. 11/178,665 entitled, "Active Element Machine Computation," filed Jul. 11, 2005, and
- is a continuation-in-part of U.S. patent application Ser. No. 11/477,201, entitled, "Register and Active Element Machines: Commands, Programs, Simulators, and Translators," filed Jun. 27, 2006, and
- claims priority benefit of U.S. Provisional Application Ser. No. 60/699,244, "Abstract Register and Active Element Machines Commands, Programs, Simulators, and Translators," entitled filed Jul. 14, 2005;

this application is also a continuation-in-part of U.S. patent application Ser. No. 11/477,201, entitled, "Register and Active Element Machines: Commands, Programs, Simulators, and Translators," filed Jun. 27, 2006,
- which is a continuation-in-part of U.S. patent application Ser. No. 11/178,665 entitled, "Active Element Machine Computation," filed Jul. 11, 2005,
- which is a continuation-in-part of U.S. patent application Ser. No. 10/791,249, entitled "Effector Machine Computation," filed Mar. 2, 2004,
- which claims priority benefit of Provisional Patent Application Ser. No. 60/456,715, filed Mar. 24, 2003,
- where U.S. patent application Ser. No. 11/477,201 also claims priority benefit of U.S. Provisional Application Ser. No. 60/699,244, entitled "Abstract Register and Active Element Machines Commands, Programs, Simulators, and Translators," filed Jul. 14, 2005 is a continuation-in-part of Ser. No. 11/178,665, and is a continuation in-part of U.S. patent application Ser. No. 10/791,249, entitled "Effector Machine Computation," filed Mar. 2, 2004, which claims priority of 60/456,715;

this application is also a continuation-in-part of U.S. patent application Ser. No. 11/178,665, entitled "Active Element Machine Computation," filed Jul. 11, 2005,
- which is a continuation-in-part of U.S. patent application Ser. No. 10/791,249, entitled "Effector Machine Computation," filed Mar. 2, 2004,
- which claims priority benefit of Provisional Patent Application Ser. No. 60/456,715, "Effector Machine Computation," filed Mar. 24, 2003; and this application is also a continuation-in-part of U.S. patent application Ser. No. 10/791,249, entitled "Effector Machine Computation," filed Mar. 2, 2004,
- which claims priority benefit of Provisional Patent Application 60/456,715, entitled "Effector Machine Computation," filed Mar. 24, 2003.

The inventor of all of the above applications is Michael Fiske. All of the above applications are incorporated herein by reference.

FIELD

The subject matter of this specification is related to computers.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In a standard digital computer, the only active computing elements (which will be referred to as active elements) are specialized registers in the microprocessor. The active elements play a role in performing computations. Usually only one machine instruction can be computed at a time. This creates a computational bottleneck.

In some software and hardware development efforts, the use of a higher level programming language, such as LISP, Java, C++, FORTRAN or Python may help simplify product or technology development, saving money and/or reducing development time.

The following references are incorporated herein by reference:
[Adelman_1] L. Adleman, "Molecular computation of solutions to combinatorial problems," Science v. 266, November 1994, 1021-1024; [Adelman_2] L. Adleman. On constructing a molecular computer, ftp://usc.edu/pub/csinfo/papers/adleman; [Bledsoe] Bledsoe, W. W. (1961), "The use of biological concepts in the analytical study of systems," ORSA-TIMS National Meeting, San Francisco, Calif.; [Box] Box, G. E. P. (1957) "Evolutionary operation: A method for increasing industrial production," Journal of the Royal Statistical Society, C, 6(2), 81-101; [Bremermann] Bremermann, R. J. (1962) "Optimization through evolution and recombination, Self-organizing systems," pp. 93-106, Washington, D.C., Spartan Books; [Enderton] Enderton, Herbert B. (1972) A Mathematical Introduction to Logic, Academic Press, Inc., ISBN 0-12-238450-4, pp. 50-58; [Friedman] Friedman, G. J. (1959) "Digital simulation of an evolutionary process," General Systems Yearbook, 4, pp. 171-184; [Gershenfeld], N. A. Gershenfeld and I. L. Chuang, "Bulk spin resonance quantum computation," Science 275 (1997), 350-356; [Kane], B. E. Kane, "A silicon-based nuclear spin quantum computer," Nature 393 (1998), pp. 133-137. [Kari], Lila Kari, "DNA computing: arrival of biological mathematics," The Mathematical Intelligence, vol. 19, 2(1997), 9-22; [Mead] Mead, Carver, (1989) Analog VLSI and Neural Systems, Addison-Wesley Publishing Company, ISBN 0-201-05992-4; [Rall] Rall, Wilfrid. (1995) The Theoretical Foundation of Dendritic Function, MIT Press. ISBN 0-262-19356-6; [Shor] Peter Shor, Quantum Computing, Documenta Mathematica, Extra Volume ICM 1998, I, 467-486; [Turing] Turing, Alan M. (1936) "On Computable Numbers, with an Application to the Entscheidungsproblem," Proceedings, London Mathematical Society, 2, no. 42, 230-265, and no. 43, 544-546. [Gokhale] (2005) Gokhale, Maya, Graham, Paul, Reconfigurable Computing, Springer, presents an introduction to RGA chips.

BRIEF DESCRIPTION OF THE FIGURES

In the following drawings like reference numbers are used to refer to like elements. Although the following figures depict various examples of the invention, the invention is not limited to the examples depicted in the figures.

FIGS. 1B-J show plots of amplitudes of messages and an input function associated with the four active elements.

FIG. 2 shows an example of a directed graph that has a cycle and an example of a directed graph that does not have a cycle.

FIG. 3 shows an example of a machine in which the active elements are divided into modules to facilitate cyclic graph evolution.

FIG. 4 shows an example of how CGE executes a crossover between two machines.

DETAILED DESCRIPTION

Figure 1A:
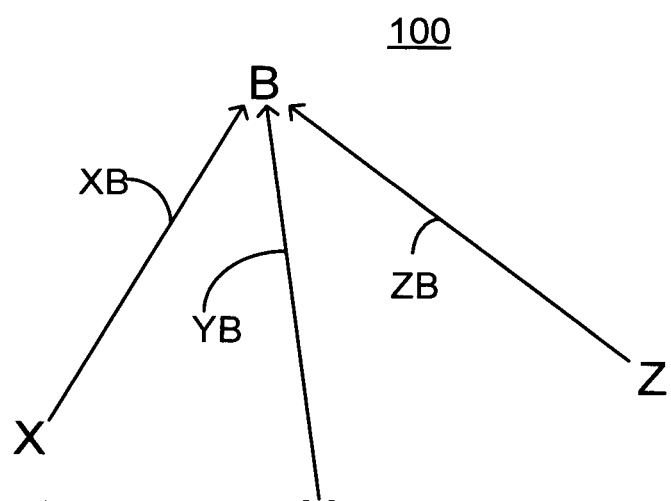
FIG. 1A show an example of a system of four active elements.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies that may be discussed in the specification, and some embodiments may not address any of these deficiencies. Although this specification is divided into sections, nonetheless, there is no one location where all of the information of any element is necessarily located. Unique information about any particular element or any other aspect of any of the invention may be found in, or implied by, any part of the specification.

Active Elements

An active element is any element that is capable of performing computations; an "active element" is a computing element that is capable of both receiving and sending messages. Active computing elements can be any number of different types of elements. For example, an active element may be implemented with one or more registers that together are capable of sending and receiving messages. As an alternative to a register, an active element may be implemented as a collection of transistors, operating at subthreshold, and other electronic components, as will be discussed in conjunction with FIG. 6. At the quantum level, an active element may be a collection of one or more quantum gates, [Gershenfeld], [Kane], and [Shor]. An active element may be a collection of DNA that is designed to perform computations, [Adelman_1], [Adelman_2], and [Kari]. An active element may be an artificial neuron, composed of organic molecules such as a bi-lipid layer, with voltage-gated proteins embedded in the bi-lipid layer.

A collection of active elements may be assembled to form a computing machine. In this specification, the term "active" or "active element" is used in many places where in the parent application the term effector was used. The term "active element" is generic to, but broader than, the term "effector."

Messages

In an embodiment, each message associated with an active element is a single pulse. In another embodiment, each message is composed of one or more pulses and/or other wave forms, and thus may be composed of a multiplicity of pulses. A machine may only allow active elements to send and/or receive one type of message or a multiplicity of types of messages.

Computing Machines Including One or More Collections of Active Elements

In an embodiment, a computing machine is constructed such that every computing element is active, and consequently any possible bottleneck is expected to be reduced because instead of only a small number of computing elements being able to participate in the computation any of the computing elements can participate in the computation. A computing machine having multiple active elements may be referred to as an active element machine (which is generic to an Effector machine). In an embodiment, the collection of active computing elements can execute multiple machine instructions simultaneously. The computing machine can be implemented in hardware and/or software. In an embodiment in which the computing machine is implemented in hardware, constructing a computing machine from a collection of active computing elements that can execute machine instructions simultaneously is expected to increase the computing speed over current digital computers for a large variety of computations. In another embodiment, the machine includes a multiplicity of active elements and also includes other computing elements.

Types of Active Elements

There are many different types of active elements that may be used to form a computing machine. In an embodiment, in a machine there are at least two kinds of active elements, which are input elements and output elements. In another embodiment there are also computational elements.

Input elements are capable of receiving, or receive, information from the environment (e.g., external sources), another machine, and/or a program, depending on the embodiment. Input elements may send messages to their selves, computational elements (if present), output elements, and/or other input elements, depending on the embodiment.

Computational elements are capable of receiving, or receive, messages from the input elements, and/or other computational elements, depending on the embodiment. A given computational element may send messages to itself, other computational elements, output elements, and/or input elements. The output elements receive messages from the input elements and computational elements (if computational elements are present). The output of the output elements represents the output of the machine.

Output elements may send messages to receptors external to the machine, itself, other computational elements, output elements, and/or input elements, depending on the embodiment. Receptors external to the machine may be other machines, other active elements that are not part of the machine or other types of receptors.

In the discussion below, the variables $\Gamma$, $\Lambda$, $\Delta$ represent index sets, used to index the input elements, computational elements, and output elements, respectively. Also, a set of input elements may be represented by the J, a set of computational elements may be represented by C, and a set of output elements may be represented by D. A machine including input elements J, computational elements C, and output elements D may be represented by $M(J, C, D)$. For example, a machine M(J, C, D) consists of a collection of input active elements, denoted as $J=\{E_i: i \in \Gamma\}$; a collection of computational active elements, $C=\{E_i: i \in \Lambda\}$; and a collection of output active elements, $D=\{E_i: i \in \Delta\}$, where $E_i$ is the ith active element and the symbol $\in$ means "is an element of." In other words, a machine may be characterized by the sets of active elements, J, C, and D, where J represents the set of active elements having indices that belong to the set $\Gamma$, and are therefore input elements; C represents the set of active elements having indices that belong to the set $\Lambda$, and are therefore computational elements; and D represents the set of active elements having indices that belong to the set $\Delta$, and are therefore output elements.

Machine Architecture

The manner in which the active elements are capable of sending messages to one another is at least part of the architecture of the machine. In this specification, the active element that is sending the message may be referred to as the sender or as the sending active element, and the active element receiving the message may be referred to as the receiving active element or as the receiver. However, the sender may also be capable of being a receiver and the receiver may also be capable of being a sender. In an embodiment, when a sender is said to "fire" the sender sends a message to whichever set of receivers the sender is capable of sending a messages to. In another embodiment, it may be possible for a sender to selectively choose which receivers a given message is sent to, and to change the set of receivers a given message is sent to each time the sender fires.

In an embodiment in which the messages are composed of pulses or in which the messages have one or more amplitudes associated with them, the one or more amplitudes associated with the messages sent are dependent on both the receiver and the sender. Thus, for example, if a sender fires, a multitude of messages may be sent to a multitude of different receivers, respectively (each message may have a different set of one or more amplitudes). It is possible that a sender may fire, but the amplitudes associated with all of the messages (e.g., pulses) that are sent as a result of the firing are zero. Thus, despite the firing of a sender, the effect may be no different than no actual message being sent, because all of the messages that are sent as a result of the firing have an amplitude that is equal to zero. In another embodiment, the amplitude of a message may only be dependent on the receiver. In another embodiment, the amplitude of a message may only be dependent on the sender.

In different machine architectures different types of active elements (e.g., input elements $\Gamma$, computational elements $\Lambda$, and output elements $\Delta$) are allowed to be connected to one another. Depending on the particular machine architecture, it is possible for the intersections $\Gamma \cap \Lambda$ and $\Lambda \cap \Delta$ to be empty sets or non-empty sets, where the symbol $\cap$ is used to indicate the intersection of two sets. The intersection of two sets is the set of elements that is common to both sets. If $\Gamma \cap \Lambda$ is empty, then there are no active elements that belong to the set of input elements, $\Gamma$, and computational elements, $\Lambda$. Conversely, if $\Gamma \cap \Lambda$ is not empty, then there is at least one active element that is both an input element and a computational element. Similarly, if $\Lambda \cap \Delta$ is empty, then there is no active element that are both a computational element and an output element, while if $\Lambda \cap \Delta$ is not empty, then there is at least one active element that is both a computational element and an output element. In an embodiment, an active element, $E_i$, can be an input element and a computational element. Likewise, in an embodiment, an active element can be an output element and a computational element. In this embodiment, when an output element, $E_i$, is not a computational element, in other words when $i \in \Delta$, then $E_i$ does not send messages to active elements in this machine.

Refractory Period

In an embodiment, each computational element and output element has a refractory period $r_i$, where $r_i > 0$, which is a period of time that must elapse after last sending a message before it may send another message. In other words, the refractory period, $r_i$, is the amount of time that must elapse after active element $E_i$ just fired and before active element $E_i$ can fire again. In an alternative embodiment, refractory period $r_i$ could be zero, and the active element could send a message simultaneously with receiving a message and/or could handle multiple messages simultaneously.

Message Amplitude and Width

In an embodiment, each computational element and output element may be associated with a collection of message amplitudes, $\{A_{ki}\}_{k \in \Gamma \cup \Lambda}$, where the first of the two indices k and i denote the active element from which the message associated with amplitude $A_{ki}$ is sent, and the second index denotes the active element receiving the message. The amplitude, $A_{ki}$, represents the strength of the message that active element $E_k$ transmits to active element $E_i$ after active element $E_k$ has fired. There are many different measures of amplitude that may be used for the amplitude of a message. For example, the amplitude of a message may be represented by the maximum value of the message or the root mean square height of the message. The same message may be sent to multiple active elements that are either computational elements or output elements, as indicated by the subscript $k \in \Gamma \cup \Lambda$. However, each message may have a different amplitude $A_{ki}$. Similarly, each message may be associated with its own message width, $\{\omega_{ki}\}_{k \in \Gamma \cup \Lambda}$, sent from active element $E_i$ to $E_k$, where $\omega_{ki} > 0$ for all $k \in \Gamma \cup \Lambda$. After a message reaches active $E_i$, the message width $\omega_{ki}$ represents how long the message lasts as input to active element $E_i$.

Threshold

In an embodiment, any given active element may be capable of sending and receiving a message, in response to receiving one or more messages, which when summed together, have an amplitude that is greater than a threshold associated with the active element. For example, if the messages are pulses, each computational and output active element, $E_i$, may have a threshold, $\theta_i$, such that when a sum of the incoming pulses is greater than the threshold the active element fires (e.g., sends an output message). In an embodiment, when a sum of the incoming messages is lower than the threshold the active element does not fire. In another embodiment, it is possible to set the active element such that the active element fires when the sum of incoming messages is lower than the threshold; and when the sum of incoming messages is higher than the threshold, the active element does not fire.

In still another embodiment, there are two numbers $\alpha$ and $\theta$ where $\alpha \leq \theta$ and such that if the sum of the incoming messages lie in $[\alpha, \theta]$, then the active element fires, but the active element does not fire if the sum lies outside of $[\alpha, \theta]$. In a variation of this embodiment, the active element fires if the sum of the incoming messages does not lie in $[\alpha, \theta]$ and does not fire if the sum lies in $[\alpha, \theta]$.

In another embodiment, the incoming pulses may be combined in other ways besides a sum. For example, if the product of the incoming pulses is greater than the threshold the active element may fire. Another alternative is for the active element to fire if the maximum of the incoming pulses is greater than the threshold. In still another alternative, the active element fires if the minimum of the incoming pulses is less than the threshold. In even another alternative if the convolution of the incoming pulses over some finite window of time is greater than the threshold, then the active element may fire.

Transmission Time

In an embodiment, each computational and output element may be associated with collection of transmission times, $\{\tau_{ki}\}_{k \in \Gamma \cup \Lambda}$, where $\tau_{ki} > 0$ for all $k \in \Gamma \cup \Lambda$, which are the times that it takes a message to be sent from active element $E_k$ to active element $E_i$ (if the transmission takes place via conduction, the time for transmission may be the time for conduction, which may be referred to as a conduction time). The transmission time, $\tau_{ki}$, is the amount of time it takes for active element $E_i$ to find out that active element $E_k$ has fired. The transmission times, $\tau_{ki}$, may be chosen in the process of establishing the architecture.

Firing Function

In an embodiment, each active element is associated with a function of time, $\psi_i(t)$, representing the time t at which active element $E_i$ last fired. Mathematically, the function of time can be defined as $\psi_i(t)$=supremum $\{s \in R : s < t \text{ AND } g_i(s)=1\}$. The function $\psi_i(t)$ always has the value of the last time that the active element fired. In general, throughout this specification the variable t is used to represent the current time, while in contrast s is used as variable of time that is not necessarily the current time.

Set of Firing Times and the Integrating Window

In an embodiment, each active element is associated with a function of time $\Xi_{ki}(t)$, which is a set of recent firing times of active element $E_k$ that are within active element $E_i$'s integrating window. In other words, the set of firing times $\Xi_{ki}(t)$= $\{s \in R : \text{active element k fired at time s and } 0 \le t - s - \tau_{ki} < \omega_{ki}\}$. The integrating window is a duration of time during which the active element accepts messages. The integrating window may also be referred to as the window of computation. Other lengths of time could be chosen for the integrating window. In contrast to $\psi_i(t)$, $\Xi_{ki}(t)$ is not a function, but a set of values. Also, where as $\psi_i(t)$ has a value as long as active element $E_i$ fired at least once, $\Xi_{ki}(t)$ does not have any values (is an empty set) if the last time that active element $E_i$ fired is outside of the integrating window. In other words, if there are no firing times, s, that satisfy the inequality $0 \le t - s - \tau_{ki} < \omega_{ki}$, then $\Xi_{ki}(t)$ is the empty set. Let $|\Xi_{ki}(t)|$ denote the number of elements in the set $\Xi_{ki}(t)$. If $\Xi_{ki}(t)$ is the empty set, then $|\Xi_{ki}(t)|=0$. Similarly, if $\Xi_{ki}(t)$ has only one element in it then $|\Xi_{ki}(t)|=1$.

Input Function

In an embodiment, each input element and output element may have associated with it a collection of input functions, $\{\emptyset_{ki}(t)\}_{k \in \Gamma \cup \Lambda}$. Each input function may be a function of time, and may represent messages coming from computational elements and input elements. The value of input function $\emptyset_{ki}(t)$ is given by $\emptyset_{ki}(t)=|\Xi_{ki}(t)|A_{ki}$, because each time a message from active element $E_k$ reaches active element $E_i$, the amplitude of the message is added to the last message. The number of messages inside the integrating window is the same as the value of $|\Xi_{ki}(t)|$. Since for a static machine the amplitude of the message sent from active element k to i is always the same value, $A_{ki}$, therefore, the value $\emptyset_{ki}(t)$ equals $|\Xi_{ki}(t)|A_{ki}$.

Input elements that are not computational elements have the same characteristics as computational elements, except they have no input functions, $\emptyset_{ki}(t)$, coming from active elements in this machine. In other words, input elements do not receive messages from active elements in the machine with which the input element is associated. In an embodiment, input elements are assumed to be externally firable. An externally firable element is an element that an external element or machine can cause to fire. In an embodiment, an external source such as the environment or an output element from another distinct machine, M'(J'; E';D') can cause an input element to fire. An input element can fire at any time as long as this time minus the time the input element last fired is greater than or equal to the input element's refractory period.

Output Function

An output function, $g_i(t)$, may represent whether the active element fires at time t. The function $g_i(t)$ is given by $$g_i(t) = \begin{cases} 1 & \text{if } \sum_{k \in \Gamma \cup \Lambda} \emptyset_{ki}(t) > \theta_i \text{ AND } t - \psi_i(t) \ge r_i \\ 0 & \text{otherwise.} \end{cases}$$

In other words, if the sum of the input functions $\emptyset_{ki}(t)$ is greater than the threshold, $\theta_i$, and time t is greater than or equal to the refractory period, $r_i$, plus the time, $\psi_i(t)$, that the active element last fired, then the active element $E_i$ fires, and $g_i(t)=1$. If $g_i(t_0)=1$, then active element $E_i$ fired at time $t_0$.

The fact that in an embodiment, output elements do not send messages to active elements in this machine is captured formally by the fact that the index k for the transmission times, message widths, message amplitudes, and input functions lies in $\Gamma \cup \Lambda$ and not in $\Delta$ in that embodiment.

Connections

The expression "connection" from k to i represents the triplet $(A_{ki}; \omega_{ki}; \tau_{ki})$. If $A_{ki}=0$, then there is no connection from active element $E_k$ to active element $E_i$. If $A_{ki} \ne 0$, then there is a non-zero connection from active element $E_k$ to active element $E_i$. In any given embodiment the active elements may have all of the above properties, only one of the above properties, or any combination of the above properties. In an embodiment, different active elements may have different combinations of the above properties. Alternatively, all of the active elements may have the same combination of the above properties.

Examples of Specific Machine Architecture

Two examples of the many different types of possible machine architectures are a static machine and dynamic machine, which are described below in the next two sections.

Static Machine

In a static machine M(J, C, D), the properties of the active elements do not change over time. Although the active elements of a static machine are associated with functions of time (e.g., the input and output functions, the firing function, and the set of firing times), there are certain parameters that do not change with time. For example, in an embodiment in a static machine the connections (e.g., the message amplitudes, the message widths, and the transmission times) are not functions of time.

In a static machine the contents of sets J, C, and D do not change overtime. A user may be able to determine the times at which different active elements fire. A user may be able to set the properties of the static machine prior to using the static machine, but the properties of the static machine do not change while a program is running. In other embodiments, static machines may have other parameters that change over time.

Dynamic Machine

The active elements of a dynamic machine may have many of the same functions of time as a static machine, such as the input and output functions, the firing function, and the set of firing times. In a dynamic machine the connections $(A_{ki}(s); \omega_{ki}(s); \tau_{ki}(s))$ may be functions of time or of the firing times. In other words, each of the connection variables, $A_{ki}(s)$, $\omega_{ki}(s)$, and $\tau_{ki}(s)$, is a function of s, which is a parameter for time. Thus, the message amplitudes, message widths and transmission times may change over time. In other embodiments other parameters may also be a function of time instead of, or in addition to, the connection parameters. The dependence of the connection parameters on time affects other parameters that depend on the connection variables. For example, in a dynamic machine, the set of recent firing times $\Xi_{ki}(t)$ becomes $\Xi_{ki}(t)=\{s\in R:$ Effector k fired at time s and $0\leq t-s-\tau_{ki}(S)<\omega_{ki}(s)\}$. Similarly, in an embodiment of a dynamic machine, the input functions become $$\emptyset_{ki}(t) = \sum_{s\in\Xi_{ki}(t)} A_{ki}(s),$$

where $\{\emptyset_{ki}(t)\}_{k\in\Gamma\cup\Lambda}$ is a collection of input functions. In other embodiments, dynamic machines may have other parameters that change over time.

EXAMPLE 1

FIG. 1A shows a system 100, which includes active elements B, X, Y, and Z. System 100 also include connections XB, YB, and ZB. Active element X is connected, via connection XB, to active element B. System 100 may be located within a machine, which may have many other active elements. Active element Y is connected, via connection YB, to active element B. Active element Z is connected, via connection ZB, to active element B. This example shows how the firings of active elements X, Y, and Z affect active element B. Active element X, fires at time t=4, active element Y fires at time t=1, and active element Z fires at t=2. The symbol $A_{XB}=3$ is the message amplitude from active element X to active element B. The message width from active element X to active element B is $\omega_{XB}=2$. The transmission time from active element X to active element B is $\tau_{XB}=1$. The transmission time $\tau_{XB}$ represents how long it takes for a message from active element X to arrive at active element B after active element X fires. These values are presented in the following table.

|  | Message Amplitude $A_{XB}$ | Message Width $\omega_{XB}$ | Transmission Time $\tau_{XB}$ | Firing Time |
|---|---|---|---|---|
| From active element X To To active element B | 3 | 2 | 1 | 4 |

Similarly, the values below represent the message amplitude, message width and transmission time from active element Y to active element B. Also, included is the time that active element Y last fired.

|  | Message Amplitude $A_{YB}$ | Message Width $\omega_{YB}$ | Transmission Time $\tau_{YB}$ | Firing Time |
|---|---|---|---|---|
| From active element Y To To active element B | 4 | 1 | 3 | 1 |

Similarly, the values below represent the message amplitude, message width and transmission time from active element Z to active element B. Also, included is the time that active element Z last fired.

|  | Message Amplitude $A_{ZB}$ | Message Width $\omega_{ZB}$ | Transmission Time $\tau_{ZB}$ | Firing Time |
|---|---|---|---|---|
| From active element Z To To active element B | 4 | 2 | 2 | 2 |

FIGS. 1B-1I show a sequence of events associated with system 100. These figures are a convenient method for a person to understand the behavior of an active element. FIGS. 1B-1I correspond to times t=0 to t=7. In each of FIGS. 1B-1I there are four plots B, X, Y, and Z. Plots X, Y, and Z show the firing times of active elements X, Y, and Z and the times of arrival at active element B of the messages associated with connections XB, YB, and ZB, respectively. The differences between the firing times of active elements X, Y, and Z and the arrival times at active element B are the transmission times associated with connections XB, YB, and ZB.

Plot X shows the message from active element X on connection XB, and shows a firing time at t=4 and an arrival time at t=5. Plot Y shows the message from active element Y on connection YB, and shows a firing time at t=1 and an arrival time at t=4. Plot Z shows the message from active element Z on connection ZB, and shows a firing time at t=2 and an arrival time at t=4. Plot B shows the sum of the amplitudes of the messages that are arriving at active element B.

Figure 1B:
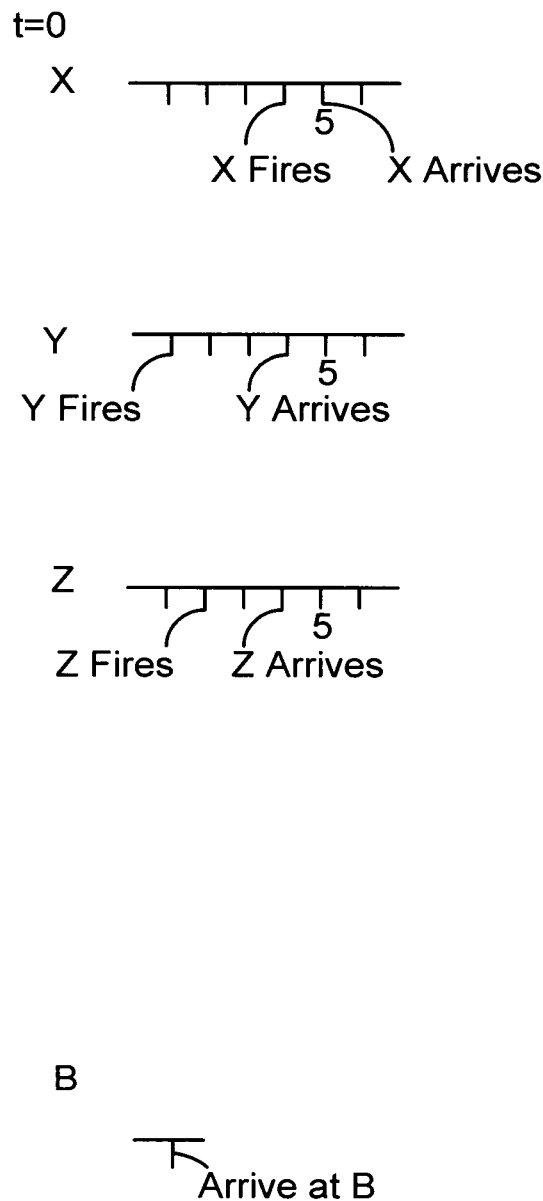

As shown in FIG. 1B, at time t=0, none of the active elements have fired, and consequently none of the plots X, Y, and Z show a message. Similarly, since no message has arrived at active element B, the amplitude arriving at active element B is shown as 0 in plot B.

As shown in FIG. 1C, at time t=1, active element Y fires, while active elements X and Z have not fired. Consequently, plot Y shows a message emerging from active element Y, and there are no messages shown on plots X and Z. Since the amplitude associated with connection YB is 4, message on plot Y has a height of 4. Although the message width associated with connection YB is 1, since the message is just beginning to emerge from active element Y, the message is shown as a line. Since no messages have arrived at active element B, the amplitude arriving at active element B is still shown as 0 in plot B.

As shown in FIG. 1D, at time t=2, zero units of time have passed since active element Z fired, one unit of time has passed since active element Y fired, and active element X has still not fired. Consequently, plot Y shows a message of width 1 emerging from active element Y, plot Z shows a message just beginning to emerge from active element Z, and no message is shown on plot X. Since the amplitude associated with connection ZB is 4, message on plot Z has a height of 4. The message shown on plot Y has now reached its full width, because the message width associated with connection YB is 1. Although the message width associated with connection ZB is 2, since the message is just beginning to emerge from active element Z, the message on shown plot Z is as a line. Since no messages have arrived at active element B, the amplitude arriving at active element B is still shown as 0 in plot B.

As shown in FIG. 1E, at time t=3, one unit of time has passed since active element Z began to fire, two units of time has passed since active element Y fired, and active element X has still not fired. Consequently, plot Y shows a message of width 1 displaced one unit of time from the firing time of active element Y, plot Z shows a message of width 1 that is still emerging from active element Z, and no message is shown on plot X. Although the message width associated with connection ZB is 2, since only one unit of time has passed since the message began to emerge from active element Z, the message shown plot Z is only one unit of time wide. Since no messages have arrived at active element B, the amplitude arriving at active element B is still shown as 0 in plot B.

As shown in FIG. 1F, at time t=4, two units of time has passed since active element Z fired, three units of time has passed since active element Y fired, and active element X fires. Consequently, plot Y shows a message of width 1 displaced three units of time from the firing time of active element Y, plot Z shows a message of width 2 emerging from active element Z, and a message at time 4 is shown on plot X. The message on plot Z has reached its full width. Although the message width associated with connection XB is 2, since the message just began to emerge from active element X, the message shown plot X is only a line. Since the amplitude of the message associated with connection XB is 3, the height of the message on plot X is shown as 3. The messages shown on plots Y and Z have just begun to arrive at active element B, and the amplitude of each is 4. Consequently, the sum of the amplitudes of the messages arriving at active element B is 8, as shown in plot B. If the threshold associated with active element B is less than 8, and if the refractory period is has passed, active element B will fire.

Figure 1G:
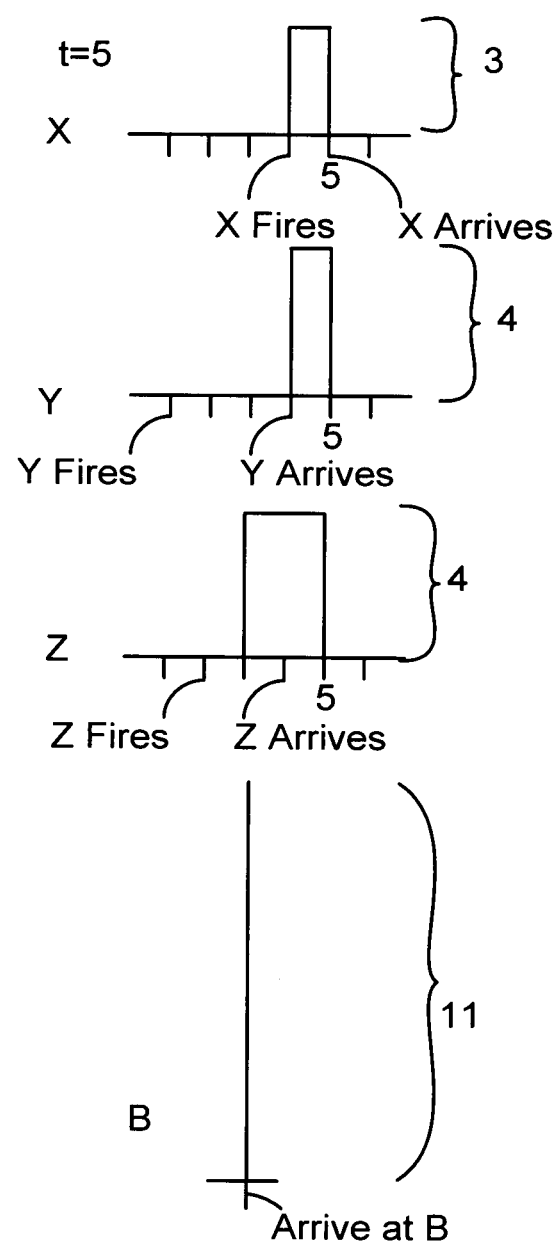

As shown in FIG. 1G, at time t=5, one unit of time has passed since active element X fired, three units of time has passed since active element Z began to fire, and four units of time has passed since active element Y began to fire. Consequently, plot Y shows a message of width 1 displaced four units of time from the firing time of active element Y, plot Z shows a message of width 2 displaced three units of time from the firing time of active element Z, and a message of width 1 emerging from active element X. Although the message width associated with connection XB is 2, since only one unit of time has passed since the message began to emerge from active element X, the message shown in plot X is only one unit of time wide. The message shown on plot Y is just finishing its arrival at active element B, the message shown on plot Z is still in the middle of arriving at active element B, and the message shown on plot X is just beginning to arrive at active element B. Consequently, the sum of the amplitudes of the messages arriving at active element B is now 11, as shown in plot B. If the threshold associated with active element B is less than 11, and if the refractory period has passed, active element B will fire. For example, in an embodiment, if the refractory period is 1, and the threshold is 6, then the active element will have fired twice, once at time t=4, when the sum of the amplitudes of the messages arriving at active element B was 8, and a second time at time t=5 when the sum of the amplitudes of the messages arriving at active element B is 11. Similarly, if the refractory period is 0.49, at time t=5, active element B will have fired 3 times: at time t=4, t=4.49, and t=4.98.

Figure 1H:
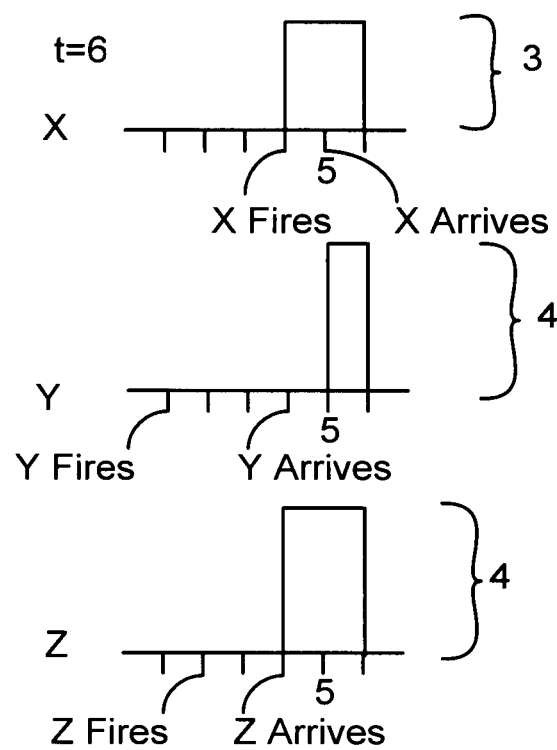

As shown in FIG. 1H, at time t=6, two units of time has passed since active element X fired, four units of time has passed since active element Z began to fire, and five units of time has passed since active element Y began to fire. Consequently, plot Y shows a message of width 1 displaced four units of time from the firing time of active element Y, plot Z shows a message of width 2 displaced two unit of time from the firing time of active element Z, and a message of width 2 emerging from active element X. The message width associated with connection XB is 2, and consequently, the message shown on plot X has reached its full width. The message shown on plot Z is just finishing arriving at active element B, and the message shown on plot X is also still in the middle of arriving at active element B. The message shown on plot Y is no longer arriving at active element B, and the amplitude of the message on connection YB (which is 4) is no longer added to the sum of amplitudes of messages arriving at active element B. Consequently, the sum of the amplitudes of the messages arriving at active element B is the sum of the amplitude of the messages associated with connections XB (which has a height of 3) and ZB (which has a height of 4), which sums to just 7, as shown in plot B. If the threshold associated with active element B is less than 7, and if the refractory period has passed, active element B will fire.

As shown in FIG. 1I, at time t=7, three units of time has passed since active element X fired, five units of time has passed since active element Z began to fire, and six units of time has passed since active element Y began to fire. Consequently, plot Y shows a message of width 1 displaced six units of time from the firing time of active element Y, plot Z shows a message of width 2 displaced five units of time from the firing time of active element Z, and a message of width 2 displaced three units of time from the firing time of active element X. The message shown on plot X is just finishing arriving at active element B. The messages shown on plots Y and Z are no longer arriving at active element B, and the amplitudes of the message on connection YB and ZB are no longer added to the sum of amplitudes of messages arriving at active element B. Consequently, the sum of the amplitudes of the messages arriving at active element B only includes the amplitude of the message associated with connection XB, and consequently the sum of messages arriving at active element B is 3. If the threshold associated with active element B is less than 3, and if the refractory period has passed, active element B will fire.

Figure 1J:
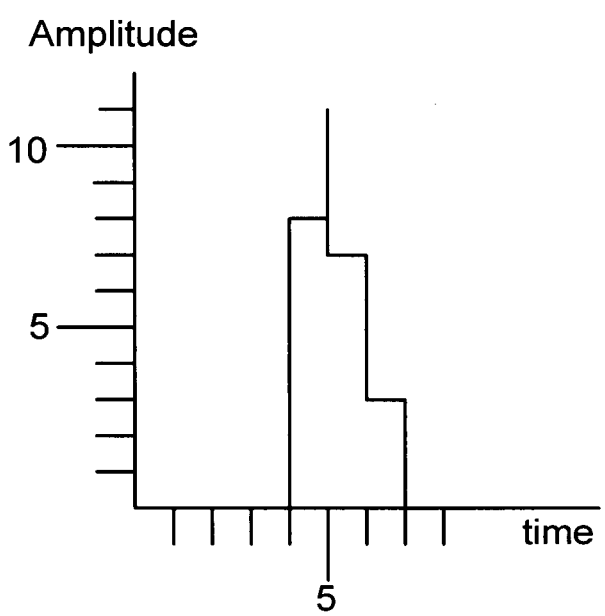

FIG. 1J shows a plot of the sum of amplitudes as a function of time, which corresponds to plot B of FIGS. 1B-I. At time t=4 the sum of amplitudes at active element B is 8, and remains at 8 until time t=5. At time t=5, the amplitude momentarily jumps to 11 and then declines to 7. The amplitude remains at 7 until time t=6. At time t=6, the amplitudes drops to 3, and remains at 3 until time t=7. At time t=7, the amplitude drops to zero. If the threshold of active element B is less than 3, then active element B may fire at anytime between time t=4 and t=7, depending on the value of the refractory period. If the threshold of active element B is greater than 3 and less than 7, then active element B may fire at anytime between time t=4 and t=6, depending on the value of the refractory period. If the threshold of active element B is greater than 7 and less than 8, then active element B may fire at anytime between time t=4 and t=5, depending on the value of the refractory period. If the threshold of active element B is greater than 8 and less than 11, then active element B may fire at time t=5, depending on the value of the refractory period.

EXAMPLE 2

Suppose an incoming message from active element $E_X$ arrives at active element $E_B$. Suppose active element $E_X$ fires at time s=2. Suppose the transmission time $\tau_{XB}$ from active element $E_X$ to active element $E_B$ is given by $\tau_{XB}$=5, and the message width $\omega_{XB}$=2. Assume also that the current time is t=6.99. It follows that $\Xi_{XB}(6.99)=\emptyset$, because $t-s-\tau_{XB}$=6.99−2−5=−0.01 is not in the interval [0, $\omega_{XB}$], and therefore $|\Xi_{ki}(t)|$=0. This is because the message from active element $E_X$ has not yet arrived at active element $E_B$. Therefore, based on the definition $\Phi_{XB}(6.99)=|\Xi_{ki}(6.99)| \Box_{XB}$, it follows that $\Phi_{XB}(6.99)$=0, because $|\Xi_{XB}(6.99)|$=0

However, at the time t=7, $t-s-\tau_{XB}$=7−2−5=0, which is within the interval [0, $\omega_{XB}$]. Consequently, $\Xi_{XB}(7)=\{2\}$, because the value of $\Xi_{XB}(7)$ is the set of firing times.

Although $\Xi_{XB}(7)=\{2\}$, the value of $|\Xi_{XB}(7)|$ is given by $|\Xi_{XB}(7)|=1$ because $|\Xi_{XB}(7)|$ is the number of elements in the set $\Xi_{XB}(7)$. Assume that $A_{XB}=2$, then based on the formula $\Phi_{XB}(7)=|\Xi_{XB}(7)|A_{XB}$, it follows that, $\Phi_{XB}(7)=1$, because $t-s-\tau_{XB}$ lies in the interval $[0, \omega_{XB}]$. The calculation is $t-s-\tau_{XB}=7-2-5=0$ and 0 lies in $[0, 2]$. Time $t=7$ is the time when the message from active element $E_X$ first arrives at active element $E_B$. Therefore, $A_{XB}(7)=|\Xi_{XB}(7)|A_{XB}=1 \cdot A_{XB}=A_{XB}$.

Next, it is shown how this message from active element $E_X$ passes through active element $E_B$. Assume that the firing time s is 2 and that the transmission time $\tau_{XB}$ is 5, at time $t=9$, $t-s-\tau_{XB}=9-2-5=2$, which is the length of the message width, $\omega_{XB}$. In other words, time $t=9$ the message from active element $E_X$ "exits" or "passes through" active element $E_B$. Consequently, $\Xi_{XB}(9)=\{2\}$ because the firing time is 2, and $t-s-\tau_{XB}$ lies in the interval $[0, \omega_{XB}]$. Since $t-s-\tau_{XB}=9-2-5=2$, which lies in the interval $[0, 2]$, therefore, $\Phi_{XB}(9)=A_{XB}$.

At, a small amount of time after the boundary condition $t=9$, for example at $t=9.01$ the function $\Xi_{XB}(9.01)=\emptyset$, because $t-s-\tau_{XB}$ does not lie in the interval $[0, \omega_{XB}]$. Specifically, the value of $t-s-\tau_{XB}$ is given by $t-s-\tau_{XB}=9.01-2-5=2.01$, and 2.01 does not lie in $[0, 2]$. Therefore, $\Phi_{XB}(9.01)=0$.

EXAMPLE 3

Suppose that two incoming messages from active element $E_X$ and active element $E_Y$ arrive at active element $E_B$ at different times. Suppose active element $E_X$ fires at $s=2$, the value of $\tau_{XB}=5$ and the message width $\omega_{XB}=2$. Assume that the message amplitude $A_{XB}=4$. Assume also that Active element $E_Y$ fires at $s=2$. Assume that the transmission time from active element $E_Y$ to $E_B$ is $\tau_{YB}=7.5$, and the message width $\omega_{YB}=2$. The message amplitude from active element $E_Y$ to $E_B$ is $A_{YB}=-2$. The analysis of the input function $\Phi_{XB}(t)$ is performed in example 1, above. In that analysis, it was found that $\Phi_{XB}(t)=0$ when $t<7$. Also, $\Phi_{XB}(t)=A_{XB}=4$ when $7 \leq t \leq 9$ and $\Phi_{XB}(t)=0$ when $t>9$.

Using a similar analysis on $\Phi_{YB}(t)$, it is found that $\Phi_{YB}(t)=0$ when $t<9.5$. $\Phi_{YB}(t)=A_{YB}=-2$ when $9.5 \leq t \leq 11.5$ and $\Phi_{YB}(t)=0$ when $t>11.5$. Suppose the time that active element $E_B$ last fired is $t=2$, so $\psi_B(7)=2$, because the value of $\psi_B(7)$ is the time that the active element $E_B$ last fired. Suppose the refractory period of active element $E_B$ is $r_B=4$ and the threshold $\Phi_B=3$.

To determine when active element $E_B$ fires, $g_B(t)=1$ if $\Phi_{XB}(t)+\Phi_{YB}(t) > \theta_B$ and $t \geq \psi_B(t)+r_B$; otherwise, $g_B(t)=0$. Thus, $g_B(t)=0$ when $t<7$ because $\Phi_{XB}(t)+\Phi_{YB}(t)=0+0<3$. At time $t=7$, $\Phi_{XB}(7)+\Phi_{YB}(7)=4+0>3$. Also, the time last fired is $\psi_B(7)=2$, and the refractory period $r_B=4$, so $t \geq \psi_B(7)+r_B=2+4$. Thus, $g_B(7)=1$. At time $t=7.0001$, the function $\psi_B$ has the value $\psi_B(7.0001)=7$, and the refractory period is $r_B=4$, so $t=7.0001<7+4$. Thus, $g_B(7.0001)=0$. At time $t=9$, it follows that $\psi_B(9)=7$, and $r_B=4$ so $t<\psi_B(t)+r_B$. Thus, $g_B(9)=0$. At time $t=9.5$, the sum of the input functions is given by $\Phi_{XB}(t)+\Phi_{YB}(t)=0+-2<3$. Thus, $g_B(9.5)=0$. At time $t=11.5$, the sum of the input functions is given by $\Phi_{XB}(t)+\Phi_{YB}(t)=0+-2<3$. Thus, $g_B(11.5)=0$. Overall, since $g_B(7)=1$, active element $E_B$ fires once at time $s=7$.

Firing Representations

Consider active element $E_i$'s firing times $F(E_i)=\{s:g_i(s)=1\}$. If $E_i$'s refractory period is greater than zero, arrange the elements of the set $F(E_i)$ into a sequence $[s_0, s_1, \ldots]$, where $s_0 < s_1 < s_2 < \ldots$. Consider the interval of time $W=[t_1, t_2]$, which starts at and includes time $t_1$, and ends at and includes time $t_2$. Let $s_m$ be the smallest element lying in W, and $s_n$ the largest element lying in W. Then $E_i$'s firing sequence within the window of computation W is $F(E_i;W)=[s_m, s_{m+1}, \ldots, s_n]$, where $$s_m < s_m+1 < \ldots < s_{n-1} < s_n \text{ and } \bigcup_{k=m}^{n} \{s_k = s \in W : g_i(s) = 1\}.$$

In other words, the sequence of times $[s_m, s_{m+1}, \ldots, s_n]$ are the set of times within W for which $g_i(s)=1$ and active element $E_i$ fired. The sequence $F(E_i;W)$ may be called a firing representation of the active element $E_i$ over the interval of time W. With a collection of active elements $\{E_0, E_1, E_2, \ldots\}$, one can create the infinite tuple $(F(E_0,W), F(E_1,W), F(E_2,W), \ldots)$. The infinite tuple $(F(E_0,W), F(E_1,W), F(E_2,W), \ldots)$ may be called a firing representation of the set of active elements $\{E_0, E_1, E_2, \ldots\}$ over the window of computation W. At a fundamental level of interpretation, firing representations may be used to express the input to, the computation of, and the output of a machine of active elements. At a more abstract level, the firing representations can be represented by an input symbol, an output symbol, a sequence of symbols, a number, or even a sequence of program instructions.

Example of a Firing Representation

For each real number x within the interval $[0, 1]$, one can construct a distinct firing representation of active elements $\{E_0, E_1, E_2, \ldots\}$ over a finite interval of time. For example, let $\gamma > 0$ be a finite real number. Choose the interval of time for each active element to be $[0, \gamma]$. For any time $t<0$, there are no restrictions on when active elements $E_i$ fired. With this in mind, for each index i, choose the refractor period $r_i=\gamma$ and suppose the last time fired is $\psi_i(0)=-\gamma$, so that it is possible for active element $E_i$ to fire or to not fire during the interval of time $[0, \gamma]$. Let the sequence $(b_0, b_1, b_2, b_3 \ldots)$ be a binary representation of a real number x in $[0, 1]$. If $b_i=1$, then choose $E_i$ to fire once during the interval of time $[0, \gamma]$. If $b_i=0$, then choose $E_i$ to not fire during the interval of time $[0, \gamma]$. Thus a set of active elements can be used to represent a number, which shows the existence of a firing representation for x.

Sequence of Firing Representations

Let $C=\{E_0, E_1, E_2, \ldots\}$ denote a collection of active elements. Also, let $W_1, W_2, W_3, \ldots, W_n$ be a sequence of time intervals. Let $F(C; W_1)=(F(E_0, W_1), F(E_1, W_1), F(E_2, W_1), \ldots)$ be a firing representation over the interval $W_1$. Let $F(C; W_2)=(F(E_0, W_2), F(E_1, W_2), F(E_2, W_2), \ldots)$ be a firing representation of the active elements $\{E_0, E_1, E_2, \ldots\}$ over the interval of time $W_2$. In general, let $F(C, W_i)=(F(E_0, W_i); F(E_1, W_i); F(E_2, W), \ldots)$ be the firing representation over the interval of time $W_i$. From these one can create a sequence of firing representations, $F(C, W_1), F(C, W_2), F(C, W_3), \ldots F(C; W_n)$.

Machine Computations

Let $F(C, W_1), F(C, W_2), F(C, W_3), \ldots F(C, W_n)$ denote a sequence of firing representations. Let $F(C, S_1), F(C, S_2), F(C, S_3), \ldots F(C; S_n)$ be a sequence of firing representations. If there exists a machine architecture for a machine (1) whose input elements can be represented with a sequence of firing representations $F(C, S_1), F(C, S_2), F(C, S_3), \ldots F(C; S_n)$, and (2) generates with its output elements the sequence of firing representations $F(C, W_1), F(C, W_2), F(C, W_3), \ldots F(C; W_n)$, then one says that the machine computes $F(C, W_1), F(C, W_2), F(C, W_3), \ldots F(C; W_n)$.

A Machine Represented by Firing Representation

A machine is an interpretation between two sequences of firing representations if the machine can compute the output sequence of firing representations from the input sequence of firing representations. When using a dynamic machine, it is possible to use a distinct machine architecture for each distinct sequence of firing representations.

A Static Program

Let M(J, C, D) denotes a machine, where M may be a static machine or a dynamic machine. Then a static program is a sequence of firing representations presented to M(J, E, D)'s input elements, J.

A Meta Program

A meta-program determines how to change a dynamic machine's architecture as it executes. In an embodiment, a meta program is executed in which the instructions of the meta program change the connections between the active elements in the computing machine. Let M(J, C, D) denote a dynamic machine. For each j, let the symbol $x^j$ be used to represent a variable (e.g., as a number or any other symbol), which may be any of A, $\omega$, or $\tau$ (for example), representing a message amplitude, a message width or a transmission time, respectively (which are parameters associated with a connection element connecting two active elements). In an embodiment, the variable $x^j$ may be used to represent other parameters of connection elements.

In an embodiment, a meta-program may be represented by a finite sequence of quintuples [($x^1$, $k_1$, $i_1$, $v_1$, $t_1$); ($x^2$, $k_2$, $i_2$, $v_2$, $t_2$), . . . , ($x^n$, $k_n$, $i_n$, $v_n$, $t_n$)], where each $t_i$ represents a time and $t_1 < t_2 < \ldots < t_n$. In other words, the sequence of quintuples is arranged in time order. Within these quintuples, the pairs of values ($k_1$, $i_1$), ($k_2$, $i_2$), . . . ($k_n$, $i_n$) reference the two active elements that are connected by the connection being modified by the quintuple. For each j, where $1 \leq j \leq n$, the quintuple, ($x^j$, $k_j$, $i_j$, $v_j$, $t_j$), instructs M(J,C,D) to assign the value $v_j$ to connection element, $x^j_{k_j i_j}$, connecting active elements $k_j$, $i_j$, at time $t_j$. In particular, at time $t_1$, connection element, $x^1_{k_1 i_1}$, is assigned the value $v_1$. If $x^1$ is the symbol A, then message amplitude $A^1_{k_1 i_1}$ is assigned the value $v_1$ at time $t_1$. Similarly, at time $t_2$, connection element, $x^2_{k_2 i_2}$, is assigned the value $v_2$. If $x^2$ is the symbol $\omega$, then message width $\omega_{k_2 i_2}$ is assigned the value $v_2$ at time $t_2$. Changing the connections between active elements while executing a set of instructions, enables the active element machine to perform tasks that digital computers are unable to perform. If $k_j$, $i_j$ have the same value, a connection is established between an active element and itself. In an embodiment, $x^j$ may also have values that indicate a refractory time period, a threshold value, or any other parameter associated with an active element. Then by setting $x^j$ to a parameter associated with an active element and by setting $k_j$ to the same value as $i_j$ the parameters of the active element may set or changed.

Example of Programming an Active Element Machine

A program for a machine may be represented as a set of pairs of numbers each pair including a time and an identification numbers identifying one of the active elements of a machine. Each pair of numbers specifies a time when a given active element should fire. An example of a simple static program is

| Machine Program | |
|---|---|
| Time | Input element |
| 0 | 0 |
| 5 | 0 |
| 11 | 0 |

The first line of this Static program has 0 in the time column and 0 in the input element column. The first line instructs that input element 0 to fire at time 0. The second line has a 5 in the time column and a 0 in the input element column. Thus, the second line instructs input element 0 to fire at time 5. The last instruction is on the third line, which instructs that input element 0 to fire at time 11. The above example of a program helps illustrate how a static program may be interpreted by a static machine. Longer more complex static programs can also be executed with machine.exe. The program may be run simultaneously with a meta program in a dynamic machine.

A program for a machine may be represented as a set of pairs of numbers each pair including a time and an identification numbers identifying one of the active elements of a machine. Each pair of numbers specifies a time when an output element fired and the identification number of the output element that fired. An example of output from a machine may be

| Machine Program Output | |
|---|---|
| Time | Output element |
| 3.00 | 0 |
| 4.00 | 0 |
| 5.00 | 0 |
| 6.00 | 0 |
| 7.00 | 0 |
| 8.00 | 0 |
| 9.00 | 0 |

The first line of this static program has a 3.00 in the time column and 0 in the output element column. The first line means that output element 0 fired at time 3.00. The second line of this output has a 4.00 in the time column and 0 in the output element column. The second line means that output element 0 fired at time 4.00. The rest of the lines in the above example are interpreted in a similar way.

In this embodiment, the output has the same format as the input file. Consequently, the output of one machine can be used as a static program for another machine. This enables one to compose the results of one or more machines. Using machine composition, a programmer can program a complex task with many small machine that perform simpler tasks. In an alternative embodiment, the input and output files may have different formats so that they are not confused with one another. In another embodiment, the programmer may have a choice whether the input and output programs have the same format.

NAND Function Example

It is well-known that any Boolean function or circuit can be constructed from a composition of one or more NAND functions, [Enderton]. The following table shows the definition of a NAND Boolean function, where |—the Sheffer stroke—represents the NAND binary operator.

| B | C | B \| C |
|---|---|---|
| 0 | 0 | 1 |
| 0 | 1 | 1 |
| 1 | 0 | 1 |
| 1 | 1 | 0 |

In this example, we use four active elements to build a circuit that computes the equivalent of a NAND function. Active elements B and C are the inputs; active elements H and L represent the output, When 0 is input into both B and C or when the input to one of active elements B and C is 1 and the input to the other of active elements B and C is 0, active elements H fires and active element L does not fire, corresponding to the first three rows of the truth table for B|C=1. When the inputs to active elements B and C are both 1, active element L fires and active element H does not fire, corresponding to the last row of the truth table for B|C=0. With this correspondence in mind, the values in the following table represent the message amplitude, message width and transmission time from active element B to active element L.

|  | Message Amplitude $A_{BL}$ | Message Width $\omega_{BL}$ | Transmission Time $\tau_{BL}$ |
|---|---|---|---|
| From active element B To active element L | 2 | 1 | 1 |

Similarly, the values below represent the message amplitude, message width and transmission time from active element C to active element L.

|  | Message Amplitude $A_{CL}$ | Message Width $\omega_{CL}$ | Transmission Time $\tau_{CL}$ |
|---|---|---|---|
| From active element C To active element L | 2 | 1 | 1 |

Similarly, the values below represent the message amplitude, message width and transmission time from active element B to active element H.

|  | Message Amplitude $A_{BH}$ | Message Width $\omega_{BH}$ | Transmission Time $\tau_{BH}$ |
|---|---|---|---|
| From active element B To active element H | −2 | 1 | 1 |

Similarly, the values below represent the message amplitude, message width and transmission time from active element C to active element H.

|  | Message Amplitude $A_{CH}$ | Message Width $\omega_{CH}$ | Transmission Time $\tau_{CH}$ |
|---|---|---|---|
| From active element C To active element H | −2 | 1 | 1 |

Set the refractory period of elements H and L to 2, in other words, $r_L = r_B = 2$. Set the threshold of L to 3, in other words, $\theta_L = 3$. Set the threshold of H to −3, in other words, $\theta_H = -3$. We assume the time last fired for effectors H and L is $t = -1$.

Finally, all four possible inputs are analyzed.

Case 1.) At time $t=0$, both active elements B and C, do not fire, corresponding to B|C=0|0 (called the Sheffer stroke | in logic, as mentioned above). At time $t=1$, the refractory period of H and L has expired. At time $t=1$ the input to H is zero, so H fires because the input is greater than its threshold $\theta_H = -3$. At time $t=1$ the input to L is zero, so L does not fires because the input is less than its threshold $\theta_L = 3$.

Case 2.) At time $t=0$, active element B fires and active element C does not fire, corresponding to B|C=0|1. At time $t=1$, the refractory period of H and L has expired and the pulse from B has arrived. At time $t=1$, the input to H is −2 because $A_{BH} = -2$. Thus, H fires because its input is greater than its threshold $\theta_H = -3$. At time $t=1$, the input to L is 2 because $A_{BL} = 2$. Thus, L does not fire because its input is less than its threshold $\theta_L = 3$.

Case 3.) At time $t=0$, active element B does not fire and active element C fires, corresponding to B|C=1|0. At time $t=1$, the refractory period of H and L has expired and the pulse from C has arrived. At time $t=1$, the input to H is −2 because $A_{CH} = -2$. Thus, H fires because its input is greater than its threshold $\theta_H = -3$. At time $t=1$, the input to L is 2 because $A_{CL} = 2$. Thus, L does not fire because its input is less than its threshold $\theta_L = 3$.

Case 4.) At time $t=0$, active element B fires and active element C fires, corresponding to B|C=1|1. At time $t=1$, the refractory period of H and L has expired and the pulses from B and C have arrived. At time $t=1$, the input to H is −4 because $A_{BH} + A_{CH} = -4$. Thus, active element H does not fire because its input is less than its threshold $\theta_H = -3$. At time $t=1$, the input to L is 4 because $A_{BL} + A_{CL} = 4$. Thus, active element L fires because its input is greater than its threshold $\theta_L = 3$.

In summary, an AND operation is obtained by having an output active element, which in the above example is active element L, that does not fire unless the sum of inputs of two input active elements, which in the above example are active elements B and C, is greater than a set threshold. The negation of the digital operation AND, called NAND, may be obtained by changing the signs of both the amplitudes and the threshold, without changing the other parameters. A NAND operation in the above example may be represented by active element H, or it may represented by the collective behavior of both H and L.

Input and Output Interpreter

There are at least two different methods of programming a machine. In the first method, called explicit programming, someone explicitly designs a machine architecture, and writes a static program or meta program. The design of a machine architecture and a program, using explicit programming, were explained above. Despite the fact that machine instructions for a machine of active elements may be quite different from a digital computer's machine instructions, explicit programming is analogous to writing a computer program in assembly language, C, or some other programming language for a digital computer.

A second method, called implicit programming, designs the architecture and programs of a machine based on the desired machine behavior. A method for implicit programming is presented in the next section.

In both explicit programming and implicit programming, the use of an Input Interpreter and Output Interpreter may simplify the programming task. In any programming endeavor, the task that needs to be solved, performed, or finished can be represented mathematically by an (input, output) set of pairs, $\{(I_1,O_1), (I_2,O_2), \dots\}$. In some cases, the set, $\{(I_1,O_1), (I_2,O_2), \dots (I_n,O_n)\}$, is finite. In other cases, it can be infinite. For each i, $I_i$ is the input point, and $O_i$ is the corresponding output point. The (input, output) set specifies the behavior of the machine that is to be designed. An input and output interpreter translates a chosen pair $(I_i, O_i)$ to the native machine instructions of the machine. Specifically, the input interpreter translates the point $I_i$, into a sequence of firing activities executed by the input active elements, J. The output interpreter translates the firing activity of the output active elements, D, into an output point, $O_i$. This output point represents the output of the machine. For example, the input points may represent hand written letters of the alphabet, and the output points may represent an identification of the letter.

An input interpreter and output interpreter may be designed with C++ source code and can change, depending on what the machine is designed to do. Also, an input interpreter can be implemented as a distinct machine. Likewise, an output interpreter can be implemented as a distinct machine. Alternatively the same machine may be used as both the input and output interpreter or the machine performing the computations may perform its own input and/or output interpretation.

Evolutionary Design of an Active Element Machine

Implicit programming on an active element machine can be accomplished using evolutionary methods. Evolutionary methods for extremely different applications were first introduced by [Box], [Bledsoe], [Bremermann], and [Friedman]. Implicit programming is preferable to explicit programming when the programmer knows what she wants the active element machine to accomplish, but she does not know how to explicitly design the active element machine architecture, static program or meta program. This is analogous to a CEO of a company asking her engineers to build a new computer, but she does not know how to build this computer. The CEO knows how she wants the computer to behave, but does not know how to explicitly build it.

The symbol $\Theta$ represents an optimal fitness value. As an example, a fitness value may be the percentage of input/output pairs correctly computed, called the computing accuracy. In some applications, computing speed and the number of active elements used may be important, so the fitness value may be a weighted average of the speed, number of active elements, and computing accuracy. For example, the weighting may be 40% computing accuracy, 30% speed and 30% number of elements. In other words, if a machine has a fitness value greater than $\Theta$, then it can competently compute the (input, output) set of pairs, $\{(I_1,O_1), (I_2,O_2), \dots\}$. The fitness of $M_j$ is determined by its overall ability to represent, $O_i$, with its output active elements, after $M_j$'s input active elements receive input $I_i$. The fitness may also dependent on the amount of memory $M_j$ consumes, the average amount of computational time that it takes to compute the outputs $M_j$, and/or the amount of other resources consumed by $M_j$. A smaller amount of memory, computational time, and/or other resources consume increases the fitness.

Directed Graph

A machine may be represented by a directed graph in which the vertices represent active elements, and the lines connecting the vertices (referred to as edges) indicate which active elements are capable of sending messages to which other active elements.

FIG. 2 shows two directed graphs. In a directed graph diagram, a dot represents a vertex. A line segment with one arrow pointing from one vertex to the other vertex represents a directed edge. Plot 202 of FIG. 2 is a graph that contains a cycle. A cycle is formed when it is possible to follow the line segments in the direction of the arrows back to the starting point. Plot 204 is another directed graph that does not contain a cycle so it is called a tree.

A useful analogy is that the structure of hyperlinks on the World Wide Web is a directed graph because it is possible to click on a link to go to web page A, by clicking on a link while at web page B, but not vice versa. In mathematical language, a line segment connected from B pointing to A may be written as (B,A), which is called an edge in the directed graph. However, in this example (A,B) is NOT an edge, because the line connecting A and B points to A and does not point to B.

Let $V=\{v_1, v_2, \dots, v_n\}$ be a finite set of n vertices. An edge in a directed graph is an ordered pair $(v_i, v_j)$ with each vertex lying in V. Let $E=\{(v_{i1}, v_{k1}), (v_{i2}, v_{k2}), \dots, (v_{im}, v_{km})\}$ be a finite set of edges. A directed graph is formally, $G=(V,E)$, where E and V have just been defined. A machine including active elements can be represented by a directed graph. Each edge may represent a connection between two active elements (which are represented by the vertices).

Cyclic Graph Evolution

There are many methods of improving the fitness of a machine, which include deterministic and probabilistic methods. An advantage of using a probabilistic method is the search for an improved machine extends over a larger space. Probabilistic methods are less likely to improperly identify a local extremum (a minimum or maximum) as a global extremum, and can therefore obtain often obtain better Witnesses. On example of a method of improving the fitness is Cyclic Graph Evolution, which will be abbreviated with the letters, CGE. CGE may be performed in any of a number of ways. In one embodiment, CGE may be used to design at least one machine that competently computes the collection of (input, output) pairs, $\{(I_1,O_1), (I_2,O_2), \dots (I_n,O_n)\}$. In an embodiment, first an initial generation of machines, $A=\{M_0, M_1, M_2, \dots M_m\}$ is built. In an embodiment, the number m represents the number of machines in each generation of the evolutionary process. In other words, the evolutionary process may involve the construction of a set of m machines. Each of the machines is varied in order to find a machine with an adequate fitness. There are many possible methods of varying the machines.

In one embodiment, two methods of varying machines are used, which are permutation and mutation. During permutation, one or mores sets of one or more components (e.g., active elements) of one machine are switched with other components. In one type of permutation, which will be referred to as a crossover, the components are switched with one more components of another machine. Permutations, such as crossovers increase the complexity and variety of machines searched when looking for a machine with a better fitness. During a permutation, one or more parameters are altered without there necessarily being any relationship to parameters altered in another machine. For example, the value of any one of, or any combination of, an amplitude, message width, transmission time, threshold, and/or refractory period may be changed. In an embodiment, an active element and/or connection may be added or removed. In different embodiments different sets of these parameters may be varied during a mutation or permutation.

In an embodiment, after constructing a set of machines, the fitness of each machine, $M_j$ is determined. Then the following is performed multiple times: CGE randomly chooses two machines for possible crossover and mutation, from the current generation based on their fitness. As an example, if one machine, $M_1$, has a fitness of 74% and another machine, $M_2$, has a fitness of 90%, then $M_2$ is more likely to be chosen for the next generation. However, since the machines are chosen randomly, it is still possible for $M_1$ to be chosen for the next generation, but not $M_2$. Sometimes the two machines selected are crossed over and/or mutated. The choice of whether to perform a mutation, and/or whether to perform a mutation may be made randomly. For example these choices may based on a random number selection. After a possible crossover and mutation, these two machines are placed in the next generation. The selection of two machines, and possible crossover and mutation is repeated until the next generation has m machines. CGE is repeated until the best machine $M_{best}$ has a fitness greater than $\Theta$. The CGE design process is presented below as an algorithm.

An Example of an Algorithm for Performing CGE to Design an Active Element Machine An example of psuedocode for designing machines via CGE is as follows.

---

Build an initial population of machines, A = {$M_0$, $M_1$, $M_2$,... $M_m$}.
while(true)
{
Set G equal to the empty set. (G stores the machines in the next generation.)
For each j in {1, 2, 3,...,m}
{
    For each i in {1, 2, 3,...,n}
    Find $M_j$'s overall ability to represent, $O_j$, with its output active
        elements, after $M_j$'s input active elements receive input $I_i$.
    Store this ability as the fitness of $M_j$ .
}
Set q equal to the number of machines with fitness greater than $\Theta$.
If q ≥ 1, exit the loop while(true) and return $M_{best}$, the machine with
    the highest fitness.
while( the size of G < m)
{
    Randomly choose two machines, $M_j$ , $M_k$, from A for the next
    generation.
    (The probability of choosing $M_j$ is proportional to its fitness.)
    Randomly choose a number r between 0 and 1.
    If r < $p_{crossover}$, then crossover machines $M_j$ and $M_k$.
    Randomly choose numbers $s_1$ ; $s_2$ between 0 and 1.
    If $s_1$ < $p_{mutation}$, then mutate machine $M_j$ .
    If $s_2$ < $p_{mutation}$, then mutate machine $M_k$.
    Set G equal to G U {$M_j$ , $M_k$}.
}
Set A equal to G.
}

---

In the above program, the symbol $p_{crossover}$ denotes the probability that two machines chosen for the next generation will be crossed over (e.g., have modules interchanged). Also, the symbol $p_{mutation}$ denotes the probability that a machine will be mutated (e.g., have a change made to one of the machines parameters). In an embodiment, the parameters $p_{crossover}$, $p_{mutation}$, and m are input by a user at the start of running the CGE. In an embodiment, if a set of mutations and crossovers for a given machine do not result in a machine with the same fitness or a higher fitness than the initial fitness, then the mutation is not performed. Optionally, a different set of mutations and crossovers are chosen. In an embodiment, after making each mutation or crossover, a determination is made as to what fitness results, and if the fitness is lower the mutation or crossover is not made. Optionally, if the fitness is lower a different mutation or crossover is performed. Optionally, a random number may be chosen to see if another mutation or crossover is performed.

Constructing an Initial Set of Machines

FIG. 3 shows an example of a machine in which the active elements are divided into modules to facilitate cyclic graph evolution, which is an example of some further details of the construction of the machines in the initial population. Each machine may be constructed separately. Each machine that is designed by cyclic graph evolution may be composed of an Input Module, an Output Module, and one or more Internal Modules, such as $m_1$, $m_2$, $m_3$, . . . $m_K$, as illustrated in FIG. 3. The dots within the modules represent active elements, and the lines connecting the dots represent the connections between the active elements. In an embodiment, every active element lies in exactly one module. The manner in which the active elements are organized into modules does not affect how the machine computes. However, as explained below, the manner in which the active elements are organized into modules may affect how two machines are created for CGE, crossed over, and mutated. A non-zero connection between two active elements lying in two distinct modules is called an external connection. A non-zero connection between two active elements lying in the same module is called an internal connection.

For each machine created, an Input Module and an Output Module are created. Further, a random number k may be chosen such that MIN_MODULES_PER_MACHINE ≤ k ≤ MAX_MODULES_PER_MACHINE, and k internal modules are created. In other embodiments, the initial number of internal modules in a machine may be chosen in a different manner. For example, in an embodiment the number of initial internal modules may be chosen based on the number of computations that are expected to be required to perform a desired task. In another embodiment, the number of internal modules chosen may be a fixed number.

Each module is constructed separately. External connections are added afterwards. For each module, a random number u may be chosen such that MIN_ACTIVE_ELEMENTS_PER_MODULE ≤ u ≤ MAX_ACTIVE_ELEMENTS_PER_MODULE. Next, u active elements are created. In other embodiments, the initial number of active elements in a module may be chosen in a different manner. For example, in an embodiment the number of initial active elements may be chosen based on the number of computations that are expected to be required to perform a desired task. In another embodiment, the number of active elements chosen may be a fixed number for a given machine or a fixed number for all machines. In another embodiment, there may be a fixed set of numbers in which each number represents the initial number of active elements in a module within a given initial machine.

For each active element, the refractory period may be randomly chosen between MIN_REFRACTORY_PERIOD and MAX_REFRACTORY_PERIOD. For each active element, the threshold may be randomly chosen between MIN_THRESHOLD and MAX_THRESHOLD. In other embodiments, the initial thresholds may be chosen in a different manner. For example, in an embodiment the value of an initial threshold may be chosen based on the number of initial input connections and/or type of computations that are expected to be required to perform a desired task. In another embodiment, the value of the initial thresholds may be chosen to be a fixed number. In an embodiment, the value of the initial thresholds may be chosen to be the same number for an entire module, for an entire machine and/or for all machines. In another embodiment, there may be a fixed set of thresholds in which each threshold represents the initial threshold of a given active element.

Next, for each active element, a random number v is chosen such that MINIMUM_CONNECTIONS ≤ v ≤ MAXIMUM_CONNECTIONS. This means that v connections are created for this particular active element. In other embodiments, the initial connections may be chosen in a different manner. For example, in an embodiment the number of initial connections may be chosen based on the number and/or type of computations that are expected to be required to perform a desired task. In another embodiment, the number of connections chosen may be a fixed number. In an embodiment, the number of the initial connections may be chosen to be the same number for an entire module, for an entire machine and/or for all machines. In another embodiment, there may be a fixed set of numbers in which each number represents the initial number of connections to a given active element.

For each of these v connections, the initial value of the message amplitude may be randomly chosen between MIN_AMPLITUDE and MAX_AMPLITUDE, inclusive. For each connection, the value of the message width is randomly chosen between MIN_MESSAGE_WIDTH and MAX_MESSAGE_WIDTH, inclusive. In other embodiments, the message widths may be chosen in a different manner. For example, in an embodiment the message widths may be chosen to have a fixed initial value. In an embodiment, all of the initial message widths may be chosen to be the same. In an embodiment, the value of the initial message widths may be chosen to be the same number for an entire module, for an entire machine and/or for all machines. In another embodiment, there may be a fixed set of numbers in which each number represents the initial message width of a given active element.

For each connection, the initial transmission time is randomly chosen between MIN_TRANSMISSION_TIME and MAX_TRANSMISSION_TIME, inclusive. In other embodiments, the initial transmission times may be chosen in a different manner. For example, in an embodiment the transmission time may be chosen to have fixed set of initial values. In an embodiment, all of the initial transmission times within a given module or machine may be chosen to be the same.

An Example of a Crossover

FIG. 4 shows an example of how CGE executes a crossover between two machines, machine A and machine B. Before the crossover machine A includes an input module, an output module, and internal modules $m_1$, $m_2$, and $m_3$, while machine B includes an input module, an output module, and internal modules $m_1'$ and $m_2'$. After the crossover machine A still includes an input module, an output module, and internal modules $m_1$, but now includes internal module $m_2'$ instead of internal modules $m_2$ and $m_3$. Similarly, machine B still includes an input module, an output module, and internal module $m_1'$, but not includes internal modules $m_2$ and $m_3$ instead of internal module $m_2'$. In the process of switching internal modules $m_2$ and $m_3$ with internal module $m_2'$, all of the external connections to internal modules $m_2$, $m_3$, and $m_2'$ were removed and new external connections indicated by the dashed lines are randomly created according to the algorithm disclosed below in the paragraphs that follow.

In connection with FIG. 4, let the variable $n_1$ represents the number of internal modules in the machine A, and the variable $n_2$ represents the number of internal modules in machine B. For machine A, a random whole number $j_1$ is chosen, lying between LOWER_FRACTION_NUM_MODULES*$n_1$ and UPPER_FRACTION_NUM_MODULES*$n_1$. For machine B, a random whole number $j_2$ is chosen, lying between LOWER_FRACTION_NUM_MODULES*$n_2$ and UPPER_FRACTION_NUM_MODULES*$n_2$. In FIG. 4, for machine A, $j_1=2$ was selected. For machine B, $j_2=1$ was selected. Since $j_1=2$, two distinct numbers are chosen randomly from the set $\{1, 2, \ldots, n_1\}$. In the example of FIG. 4, for machine A, these two numbers were chosen as 2 and 3. Since $j_2=1$, one number is randomly chosen from $\{1, 2, \ldots, n_2\}$. In the example of FIG. 4, the number 2 was chosen. Based on the above choices, internal modules $m_2$ and $m_3$ of Machine A are crossed over (e.g., switched) with internal module $m_2$ of Machine B. All the external connections to these modules are also severed.

In FIG. 4, after the crossover, new external connections are created and added to the internal modules that were crossed over. In an embodiment, internal connections in a module that is crossed over are not changed or severed as part of the crossover. In another embodiment, internal connections may be altered after and/or during the crossover.

More About Mutations

This part further discusses mutations of a Machine. There are multiple ways to mutate a machine. An active element can be added to a module along with some non-zero connections, connecting the new active elements to active elements inside the same module, and possibly connecting the active element to active elements in different modules. A second type of mutation deletes an active element. Any non-zero connections are removed that connect to the active elements being deleted. A third type of mutation may change the message amplitude, message width, and/or the transmission time of a connection. Similar to adding an active element, a fourth type of mutation adds a new connection to an active element. Similar to removing an active element, a fifth type of mutation removes a connection from a machine.

A sixth type of mutation creates a new module containing new active elements and connections between them and connects this new module to other modules with new external connections. A seventh type of mutation deletes a module and removes all of the deleted module's external connections.

In one embodiment, $p_{crossover}$ should usually range from 0.3 to 0.7. Also, in one embodiment $p_{mutation}$ should usually be less than 0.1. In other embodiments, $p_{crossover}$ and/or $p_{mutation}$ may have other values. Previous evolutionary methods evolve directed graphs that contain no cycles. CGE is the first evolutionary method to evolve directed graphs containing cycles. Including cycles in the directed graph of a machine may facilitate the performance of tasks that require the use of an iterative process. It is also the first evolutionary method that is capable of performing crossovers and mutations on these directed graphs containing cycles.

In previous evolutionary methods, each vertex represents a static function. The directed edge represents output from one function delivered as input to the other function. Because of this structure, information does not flow in the opposite direction. Furthermore in a function, the output cannot be computed until it receives the input. Consequently, information flows in a synchronized way. On the other hand, the objects that CGE operates on (e.g., the active elements) are entirely different. Active elements may have more structure, more flexibility, and more computing capability than functions. Each vertex may represent one active element, and each directed edge may represent a non-zero connection between active elements. Furthermore, it is also possible to have a non-zero connection between two active elements, so information may flow asynchronously in both directions. Since active elements can change over time, active elements can mimic the behavior of an infinite number of functions.

Designing a VLSI

CGE can be used to design analog VLSI circuits which are suitable for implementing machines in hardware. One of Mead's primary methods of designing subthreshold analog circuits, [MEAD], is to use piecewise linear analysis to design non-linear circuits. Piecewise linear analysis becomes difficult as the size of the circuit increases. Also, piecewise linear analysis often requires a person to come up with clever techniques for predicting how the nonlinear circuit will behave. In other words, it is very difficult to write a computer program that can automate the design of circuits representing machines, using piecewise linear analysis; it also may increase the time and financial cost of designing machines. CGE does not require cleverness. One can treat the analog VLSI circuit as a black box. Only a set of inputs $\{I_1, I_2, \ldots I_n\}$ and a corresponding set of outputs $\{O_1, O_2, \ldots, O_n\}$, are required of the analog VLSI circuit. Then execute CGE on the (input, output) set, $\{(I_1,O_1), (I_2,O_2), (I_3,O_3), \ldots\}$. The machine that results from the execution of CGE can be used as the VLSI circuit desired.

Some Examples of Other Uses for an Active Element Machine

Using a training set, of input, output pairs, the active element machine can be used for pattern recognition, handwriting recognition, voice recognition, classifying, or any of the utilities specified in U.S. patent application Ser. No. 10/409,431, entitled Machine Learning filed Apr. 6, 2003, Michael Fiske, using the methods described therein. For example, a particular active element machine could be trained to implement a handwriting template that determines whether a loop exists in a handwritten symbol. Once the active element machine is trained to produce the outputs of the training set based on the inputs of the training set, if the training set is not poorly chosen, the active element machine will also recognize and produce other correct outputs based on inputs that are not in the training set.

Additionally, since the active element machine can be explicitly programmed using the meta language or in ways that will be discussed later in this specification, one can explicitly program an active element machine to perform any task performed by standard digital computers, such as executing a particular microprocessor instruction set, an operating system, word processing application, a spreadsheet application, and other software applications.

Hardware Implementation of Active Elements

This section addresses the implementation of a machine in hardware; an example is a semiconductor chip. In a hardware implementation of a machine, computation still can be robustly executed even though there may be a small amount of variance in the transmission time or the exact time an active element is supposed to fire. The analysis below explains how to design an active element machine despite substantial variance in the physical parameters of the hardware.

Let r denote the refractory period of an active element. Let $t_{detect}$ denote the time at which active element $E_i$ detects that some other active element has fired. Let $t_{actual}$ denote the actual time that this other active element fired. To simplify the analysis, ignore the transmission time from the active element that fired to the active element that received the message fired. Let $\epsilon_i$ denote the maximum possible value for $|t_{detect} - t_{actual}|$ in active element $E_i$. Define $\epsilon = \max\{\epsilon_i : E_i \text{ is an active element in machine M}\}$. If $\epsilon_i = 0$, then all active elements detect when another active element has fired with perfect precision. Let T denote a finite interval of time such that the hardware obeys $0 < \epsilon < r < T$.

Figure 5:
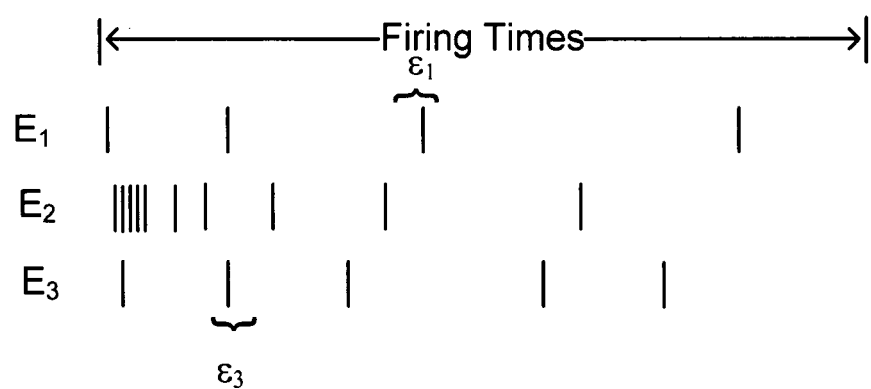
FIG. 5 shows a graph of an example of a set of firing times for a set of active elements.

FIG. 5 shows error tolerance of an embodiment of an active element. Define $$\chi: N \times N \to N \text{ as } \chi(L; n) =$$

$$L*(L-2)*(L-4)\ldots*(L-2n+2) = \prod_{k=1}^{n}(L-2k+2).$$

As an example, $\chi(7, 3) = 7*5*3$. As another example, $\chi(20, 5) = 20*18*16*14*12$. Choose T so that r divides T with zero remainder.

In this example, the formula:

$$\sum_{n=1}^{\frac{T}{r}} \frac{\chi\left(\frac{T}{r}, n\right)\left(\frac{r}{\varepsilon}\right)^n}{n!}$$

is the maximum number of possible distinct firing configurations for an active element, during the interval of time T. This number of firing configurations determines the number of different states that the active element could be in during this time period.

Figure 6:
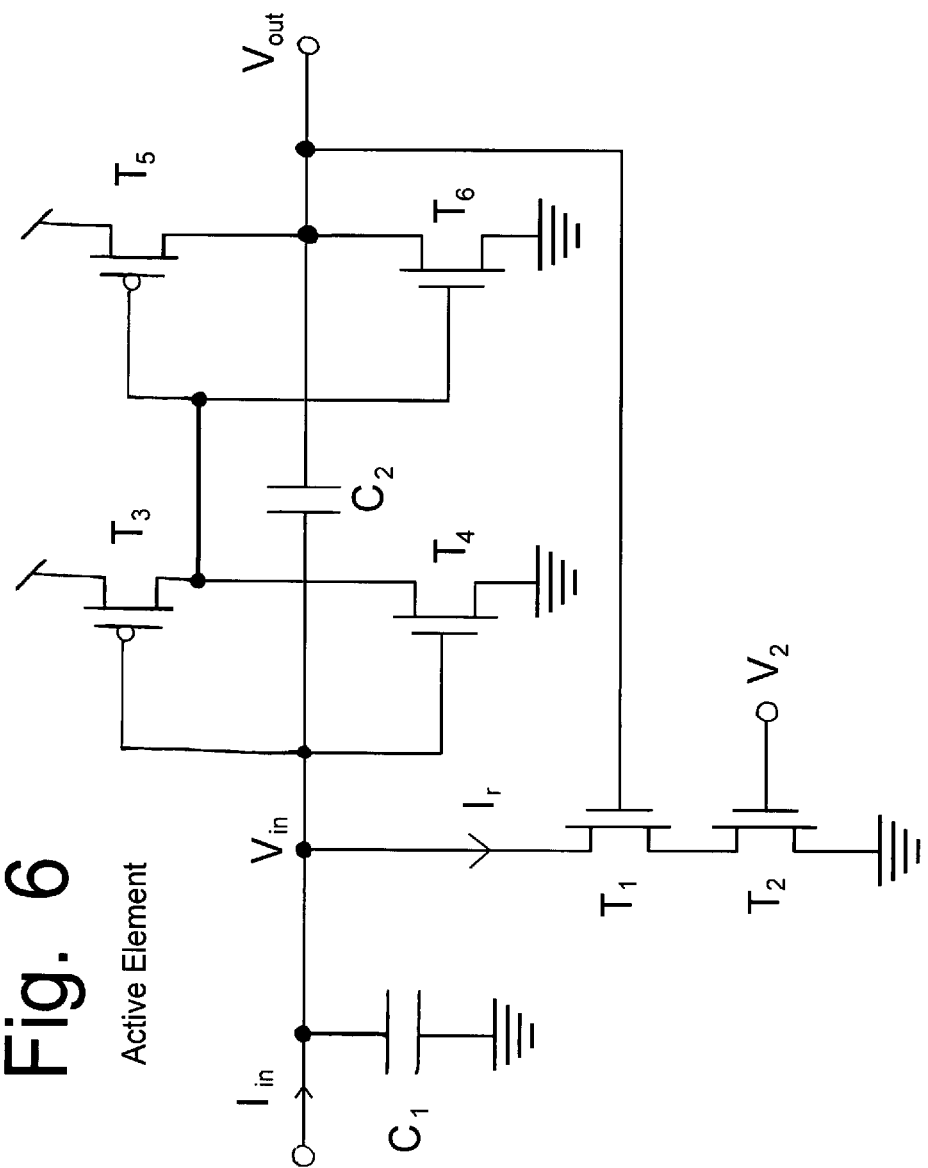
FIG. 6 shows an example of a circuit diagram of an active element.

FIG. 6 shows a schematic diagram of an embodiment of a circuit of an active element. The computing machine, which may be referred to as an Active element machine, can be implemented in hardware and built from a variety of different components. For example, the computing machine may be built from circuits of transistors that operate subthreshold. FIG. 6 illustrates how transistors operating at subthreshold can be used to implement an active element.

In FIG. 6, transistors are denoted with the symbol T; capacitors are denoted with the symbol C; the voltage at a particular location is denoted with the symbol V; and the current is denoted with the symbol I and an adjacent arrow. The subscripts help further describe or distinguish components.

Figure 7:
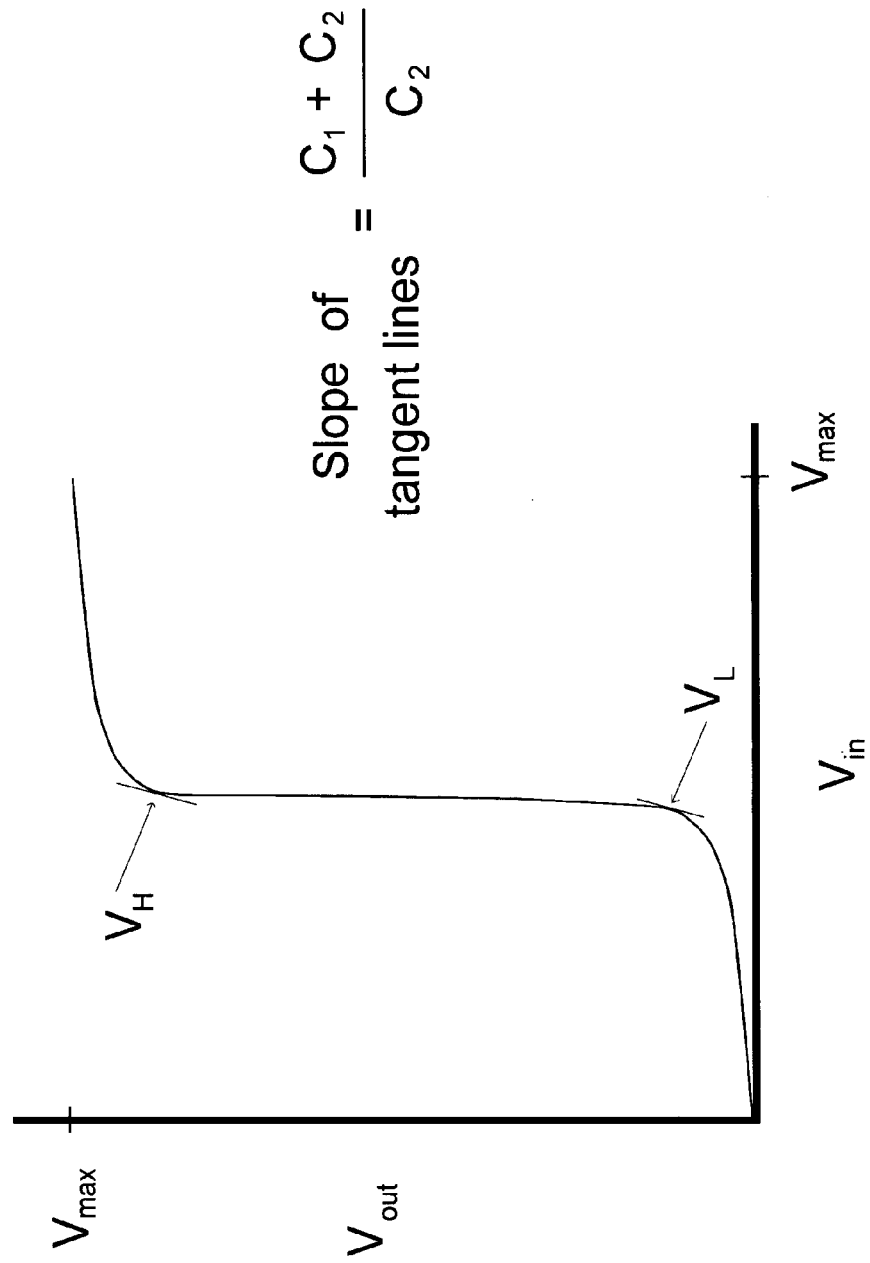
FIG. 7 shows an amplifier behavior of a collection of transistors in FIG. 6, which is described in the specification.

Regarding the firing of the active element, in FIG. 6, the four transistors, $T_3$, $T_4$, $T_5$, and $T_6$, act collectively as an amplifier. The characteristics of this amplification are shown in FIG. 7. Capacitor $C_1$ is connected between ground and an input terminal. The gates of transistors $T_3$ and $T_4$ are electrically connected to the input terminal. Transistors $T_3$ and $T_4$ are connected drain to drain to one another, where a line is electrically connected to the gates of transistors $T_5$ and $T_6$. Transistors $T_5$ and $T_6$ are also connected drain to drain to one another, and the drain-drain connection is electrically connected to an output terminal. Transistors $T_3$ and $T_5$ are p-channel FETs, and have their sources connected to a positive voltage source and possibly a load, as indicated by the diagonal lines at the end of top of the lines feeding into the drains of transistors $T_3$ and $T_5$. Transistors $T_4$ and $T_6$ are n-channel FETs and have their sources connected to ground. The drains of transistors $T_5$ and $T_6$ are electrically connected to the output terminal and are also electrically connected to one end of a capacitor $C_2$. The other end of the capacitor $C_2$ is electrically connected to the gates of transistors $T_3$ and $T_4$. In an alternative embodiment, the voltage source is a negative voltage source, and transistors $T_3$ and $T_5$ are n-channel transistors having their sources connected to the sources of p-channel transistors $T_4$ and $T_6$.

Transistor $T_1$ has its drain electrically connected to the input terminal, one end of capacitor $C_1$ and the gates of transistors $T_3$ and $T_4$. Transistor $T_1$ has its gate electrically connected to the output terminal, to one end of capacitor $C_2$, and to the drain-drain connection of transistors $T_5$ and $T_6$. Transistor $T_2$ has its drain electrically connected to the source of transistor $T_1$, its gate electrically connected to an adjustable voltage source, labeled $V_2$, and its source connected to ground.

As indicated by the circles at the gates of transistors $T_3$ and $T_5$, transistors $T_3$ and $T_5$ are doped in a manner such that is the gate current is biased in the opposite direction as that of transistors $T_4$ and $T_6$ (e.g., if transistors $T_3$ and $T_5$, are n-channel FETs, then transistors $T_4$ and $T_6$ are p-channel FETs). Transistors $T_3$ and $T_5$ amplify one of the positive or negative part of the signal, while transistors $T_4$ and $T_6$ amplify the other part of the positive or negative part of the signal. As transistors $T_3$, $T_4$, $T_5$, and $T_6$ form an amplifier, and it is possible to form an amplifier even with just one transistor, whether or not all four transistors are used is optional.

Additionally, transistors $T_3$ and $T_4$ form a first stage of the amplifier, which inverts the polarity of the signal, while transistors $T_5$, and $T_6$ form a second stage of the amplifier, which inverts the polarity of the signal to its original polarity. By including two stages of amplification, the rise in voltage is also sharper than were there only one stage of amplification. The second stage of amplification inverts the signal without loosing signal strength.

Before the firing takes place, the initial voltage of the node, denoted as $V_{in}$ in FIG. 6, is low. As $V_{in}$ increases, the output voltage $V_{out}$ increases. As $V_{out}$ increases, $V_{out}$ pushes back through capacitor $C_2$, which causes $V_{in}$ to increase, which then causes $V_{out}$ to increase faster. Once this positive feedback loop starts, $V_{out}$ abruptly increases to $V_{max}$. The abrupt increase in $V_{out}$ from a low voltage (near or at ground) to a high voltage (near or at $V_{max}$), is a physical representation of the active element firing. In alternative embodiments, other types of positive feedback may be used instead of a capacitor $C_2$.

After the active element has fired, the voltage $V_{out}$ may be decreased rapidly so that a pulse is created. One way to create the end of the pulse, is to enable the charge on $C_2$ to drain away when the output, $V_{out}$, is high, via transistors $T_1$ and $T_2$. In particular, transistor $T_2$ helps determine the pulse width. Once, $V_{out}$, is high, the gate of transistor $T_1$ is pulled to its high setting, which opens the channel of transistor $T_1$. As a result, the current $I_r$ flows from the capacitor $C_1$ to ground lowering $V_{out}$. Transistors $T_1$ and $T_2$ may be n-channel or p-channel FETs depending upon whether voltage $V_{out}$ is negative or positive or may be other types of transistors. The threshold depends to at least some degree upon the capacitance of capacitors $C_1$ and $C_2$. If the capacitance of $C_1$ is increased then it takes more charge on $C_1$ for $V_{in}$ to reach the threshold voltage $V_L$. Referring to FIG. 7, if the voltage, denoted as $V_2$, on the gate of transistor $T_2$ is increased, then charge drains off the capacitor $C_1$ faster. Consequently, this decreases $V_{in}$ at a faster rate, so biasing the gate of transistor $T_2$ turns off the active element faster, and the bias on $T_2$ may be used to control the pulse width. Alternatively, another method of varying the pulse width may be used, such as by including a variable delay in the connection from $V_{out}$ to $T_1$.

Using transistors operating at subthreshold reduces the amount of power consumed by more than 5 orders of magnitude when compared to using transistors operating at or above threshold. In Carver Mead's words, for a transistor to operate subthreshold means: "The gate voltage at which the mobile charge [in the transistor] begins to limit the flow of current is called the threshold voltage . . . . Most circuits described in this book operate in subthreshold—their gate voltages are well below the threshold voltage," [MEAD]. Furthermore, when transistors operate subthreshold, the amount of heat produced is greatly reduced when compared to operating at or above threshold.

A machine of active elements may be implemented on a digital computer with an operating system, OS. However, the active element machine realizes far greater computational power when its machine instructions are directly implemented in suitable hardware. A good hardware implementation may enable the active element machine to execute computations more than four orders of magnitude faster than today's digital computers.

Another Example of Hardware

Figure 8:
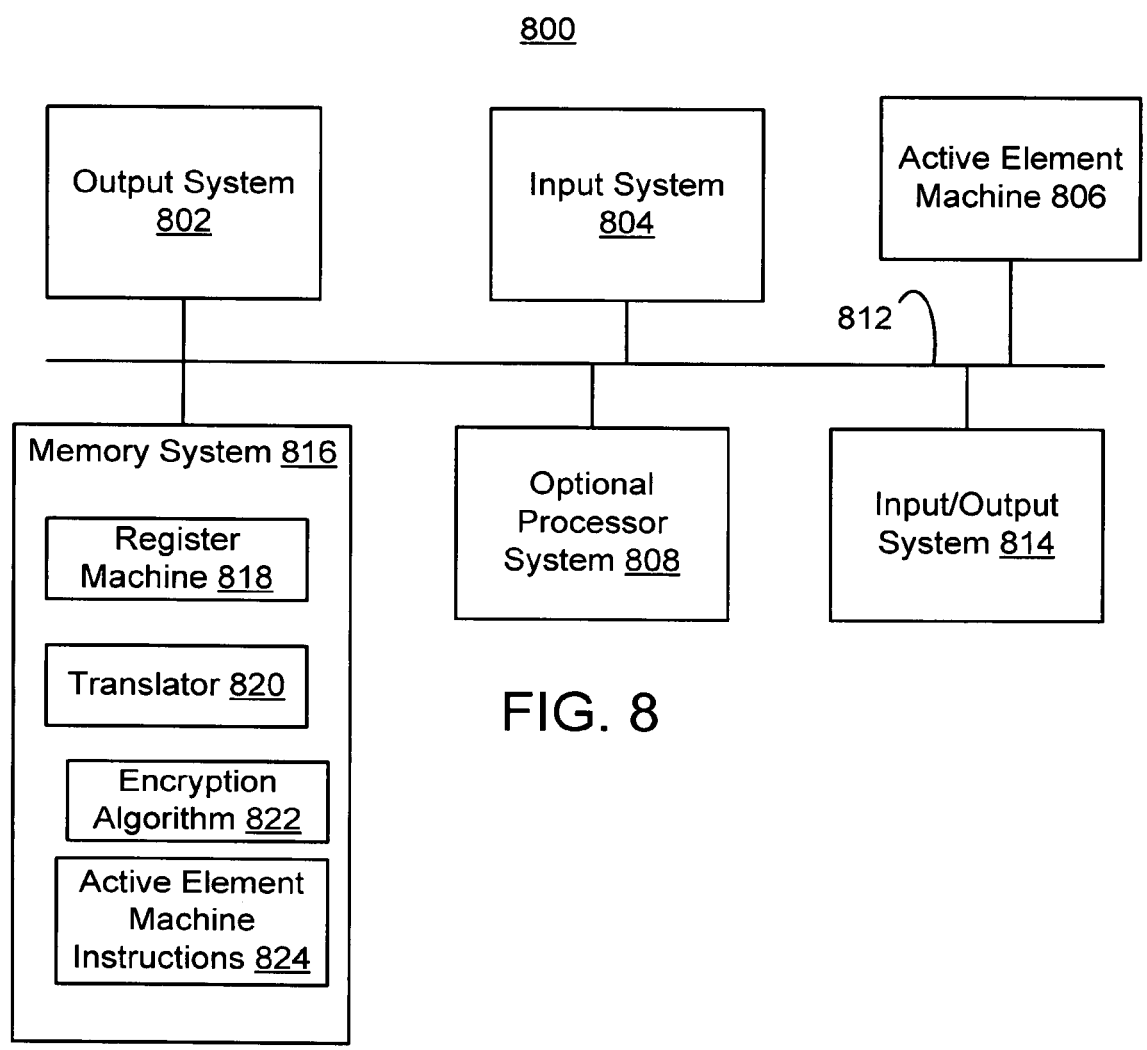
FIG. 8 shows a block diagram of a machine that may include an active element machine.

FIG. 8 shows a block diagram of a machine 800 that may include an active element machine. Machine 800 may include output system 802, input system 804, active element machine 806, optional processor system 808, communications system 812, input/output system 814, memory system 816, which stores register machine 818, translator 820, encryption algorithm 822, and active element machine instructions 824. In other embodiments, machine 800 may not include all of the components listed above and/or may include other components in addition to, or instead of, those listed above.

Machine 800 may be a handheld computing device, a laptop, a personal computer, a workstation, or a mainframe computer. Output system 802 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 804 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Active element machine 806 may be any of the embodiments of an active element machine described above. For example, active element machine 806 may include the active element machine of FIG. 3. Active element machine 806 may be used instead of a central processor or processor system. Active element machine 806 may be implemented on a programmable gate array. An example of hardware that may be used for constructing active element machine 806 is discussed in FIG. 3 and below in the section entitled, "AEM MACHINE EXECUTION ON EMBEDDED HARDWARE." In an embodiment, active element machine 806 is not present, and a processor runs a simulation of an active element machine or runs an abstract register machine. Through out this specification abstract register machines will be referred to as register machines. Register machines will be discussed below in conjunction with register machine 818 and FIGS. 9-12.

Optional processor system 808 may include any one of, some of, any combination of, or all of multiple parallel processors, a single processor, a system of processors having one or more central processors and/or one or more specialized processors dedicated to specific tasks. Optional processor system 808 is optional and not necessary, because active element machine 806 can perform any of the functions normally performed by a processor. Optional processor system 808 may simulate an active element machine or may run a register machine. For example, optional processor system 808 runs an abstract element machine, and active element machine 806 is not present. (As stated above, register machines will be discussed below in conjunction with register machine 818 and FIGS. 9-12.)

Communications system 812 communicatively links output system 802, input system 804, active element machine 806, optional processor system 808, input/output system 814, and/or memory system 816 to each other. Communications system 812 may include any one of, some of, any combination of, or all of electrical cables, fiber optic cables, and/or means of sending signals through air or water (e.g., wireless communications), for example. Some examples of means of sending signals through air and/or water include systems for transmitting electromagnetic waves such as infrared and/or radio waves and/or systems for sending sound waves.

Input/output system 814 may include devices that have the dual function as input and output devices. For example, input/output system 814 may include one or more touch sensitive screens, which display an image and therefore are an output device and accept input when the screens are pressed by a finger or stylus, for example. In an embodiment, the touch sensitive screens may be sensitive to heat and/or pressure. One or more of the input/output devices may be sensitive to a voltage or current produced by a stylus, for example. Input/output system 814 is optional, and may be used in addition to, or in place of, output system 802 and/or input system 804.

Memory system 816 may include, for example, any one of, some of, any combination of, or all of a long term storage system, such as a hard drive; a short term storage system, such as random access memory; a removable storage system, such as a floppy drive or a removable drive; and/or flash memory. Memory system 816 may include one or more machine readable mediums that may store a variety of different types of information. The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. The term machine-readable medium also includes mediums that carry information while the information that is in transit from one location to another, such as copper wire and/or optical fiber. Memory system 816 is optional, because active element machine 806 incorporates memory.

Register machine 818 is discussed below in conjunction with FIGS. 9 and 10. Translator 820 translates instructions in other languages into instructions within abstract machine 818. Translator 820 may also translate instructions in register machine 818 into instructions understood by active element machine 806 and/or processor 808 system. Translator 820 is discussed below in the section entitled, "ACTIVE ELEMENT TRANSLATOR." Encryption algorithm 822 encrypts active element machine instructions and optionally encrypts register machine instructions. Encryption algorithm 822 will be discussed further in the section under the heading "APPLICATIONS 2—Protecting Algorithms, Hardware, and Software." Active element machine instructions 824 include instructions that may be used to program an active element machine and/or simulate an active element machine. Active element machine instructions 824 are discussed below in conjunction with FIG. 11.

Register Machine

Figure 9:
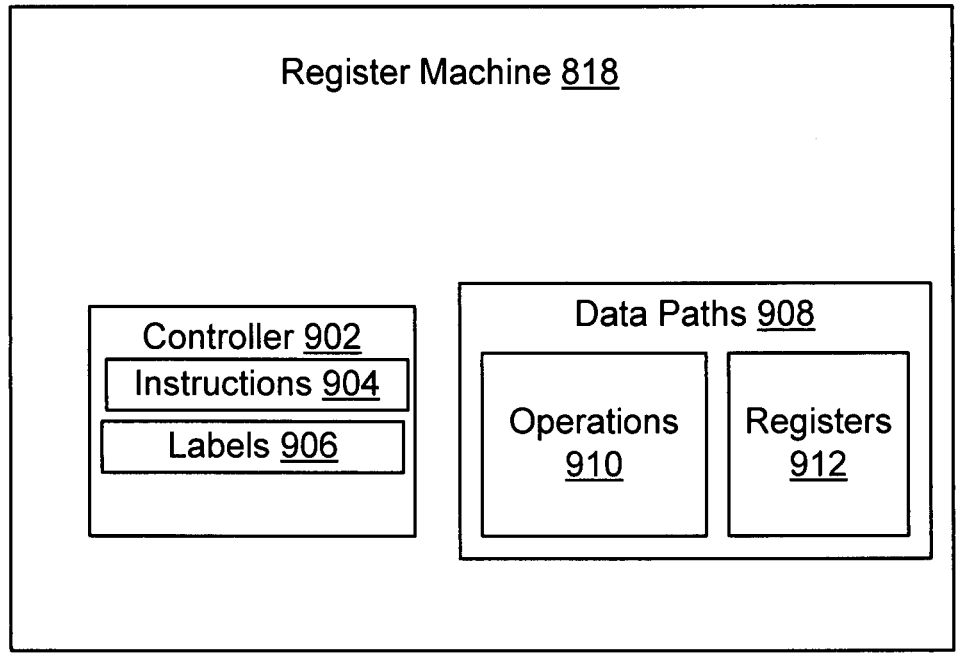
FIG. 9 shows a block diagram of an example of register machine.

FIG. 9 shows a block diagram of an example of register machine 818. Register machine 818 may include controller 902, which may include instructions 904 and labels 906. Register machine 818 may also include data paths 908, which may include operations 910 and registers 912. In other embodiments, register machine 818 may not include all of the components listed above and/or may include other components in addition to, or instead of, those listed above.

In some applications it may be useful to interpret, compile, or translate a high level source code to another programming language. The programming language may be expressed as a sequence of register machine instructions, described in this specification. In some of the same or other applications, it may be useful to translate this register machine program to an equivalent program, expressed as a sequence of active element machine commands.

In some embodiments, an active element machine program may execute on hardware that is designed to execute active element machine commands, thereby simulating an active element machine. Simulating an active element machine may help a developer debug and test a hardware embodiment of an active element machine, such as active element machine 806. Converting a programming language into a register machine, and/or running the program on an active element machine may also help the developer debug and test the program. In some embodiments, an active element machine program may execute on hardware, designed for a register machine instruction set, such as active element machine 806 or optional processor system 808. Running an active element machine program on hardware designed for a register machine instruction set may also help a developer debug and test the register machine hardware. Running the active element machine program on hardware designed for a register machine instruction set may also help the developer debug and test the active element machine program. Some examples and families of hardware chips that execute register machine instructions, which may be used for optional processor system 808, are Intel 8051, x86, Cypress USB microcontrollers, Freescale HC08, HCS08, HC12, HCS12, Zilog Z80, Rabbit Semiconductor R2000, R3000, Axis ETRAX 100LX, MCORE, 68K and PowerPC, Microchip PIC12/14/16/17/18 families, Atmel AT91, and Siemens C166.

Register machine 818 may be a different type of computing machine from the active element machine. Register machine 818 may be a compact instruction set (e.g., an instruction set that only includes a few different commands) that can represent any of a variety of computer programs executing on any of a variety of hardware. Further, any kind of compiler for any of a number of programming languages, such as C, JAVA, FORTRAN, LISP, PASCAL, PERL, PYTHON, etc. may convert the code in these programming languages to a sequence of machine instructions that are "computationally equivalent" to a program written in a register machine language. Register machine 818 may in turn be converted into a set of active element machine instructions. Conversely, translator 820 may convert a sequence of active element instructions to a sequence of register machine instructions.

Software may be written so that after compilation, the software essentially executes on a register machine. Thus, to utilize algorithms written in conventional languages, such as C, JAVA, FORTRAN, LISP, PASCAL, PERL, PYTHON, . . . , the software may be converted to a register machine, which may be converted to active element machine instructions. For example, the Linux operating system kernel is written in C, so translator 820 may enable the Linux operating system to execute on active element machine hardware, such as active element machine 806. Consequently, using translator 820, any application written for Linux can run on active element machine hardware, such as active element machine 806. Also, pattern recognition and machine learning programs, such as "voice, speech, and language understanding" programs may be written in, or converted to, register machine instructions. Then register machine instructions may be translated, via translator 820, to active element machine instructions that run on the active element machine hardware, such as active element machine 806 along with the Linux OS. Thus, translator 820 enables a large variety of computing applications to run on small (e.g., one to two inches long, ¼ inch to a ½ thick and ½ inch to an inch wide), mobile, low-power active element machine hardware, such as active element machine 806 or the active element machine of FIG. 3.

In the above embodiment, a programming language is converted into a register machine language, which is then converted into an active machine language, or else an active machine language is converted into a register machine language, which is then converted into another programming language that the user is expected to be more familiar with. In an alternative embodiment, another language is used as an intermediary language instead of a register machine language. For example a standard version of C may be used as an intermediary language. Thus, a program in Pascal, for example, would first be converted into particular version of C, and then that particular version of C would be converted into an active element machine. Any of a number of other languages may be used as the intermediary language, such as a particular machine language, a particular assembly language, JAVA, FORTRAN, LISP, PASCAL, PERL, PYTHON, BASIC, HTML, or any other language. In this specification, the word language should be understood to be generic to a script, a compiled language, an interpretive language, or any other language that runs on a machine.

There may be at least two components in register machine 818, which are data paths 908 and controller 902. Controller 902 of register machine 818 is a sequence of instructions 904, along with labels 906 that identify entry points into sequence of instructions 904. In an embodiment of register machine 818, the first instruction in the controller instruction sequence of controller 902 is executed first, and execution halts when the execution reaches the last instruction in the controller instruction sequence of controller 902. In an embodiment, the instructions are listed in the order in which they are executed. In another embodiment, the instructions are labeled according to the sequence in which the instruction will be executed, but not necessarily listed in the same order as executed.

Labels 906 may be referred to as controller labels, which are labels that are recognized by the register machine. Data paths 908 may be defined by describing the register machine's registers 912 and operations 910. Each of registers 912 may be given a name. A source of data may be copied to a register. The source of the data may be a register, constant, label, or the result of an operation. Each operation has a name and one or more arguments. The arguments of an operation are constants or come from registers. Some examples of entry points that a label may be associated with are a register (or an entry point into a sequence of instructions that identifies a register), an operation (or an entry point into sequence of instructions that identifies an operation), a constant (or an entry point into sequence of instructions that identifies a constant), a line number in a program, and/or a routine in a program.

Figure 10:
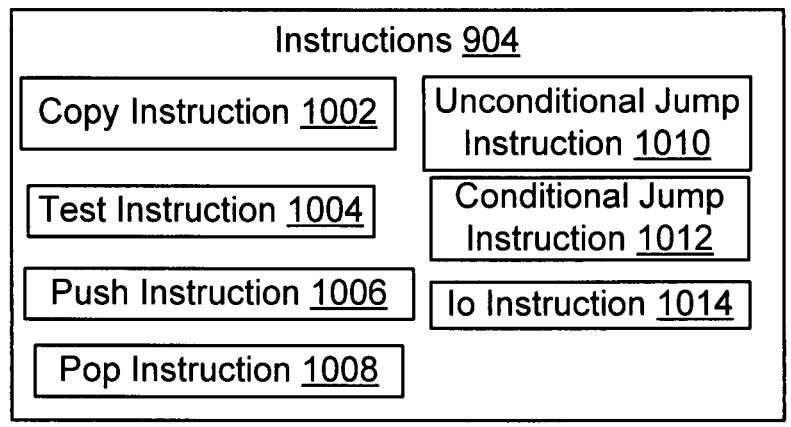
FIG. 10 shows a block diagram of an example of the instructions of the register machine of FIG. 9.

FIG. 10 shows a block diagram of an example of instructions 904. The register machine's instructions 904 may be defined to be a copy instruction 1002, a test instruction 1004, a push instruction 1006, a pop instruction 1008, an unconditional jump instruction 1010, a conditional jump instruction 1012, and an input/output instruction 1014. In other embodiments, instructions 904 may not include all of the instructions listed above and/or may include other instructions in addition to, or instead of, those listed above.

The word "keyword" will be used to refer to a word that may be given special meaning that is recognized by a compiler, interpreter, or translator, for example, within the context of the human readable form of an instruction or command. Some examples of keywords that may be used in a computer language to call instructions are "reg," which tags a register, "op," which a tags an operator, "const," which tags for a constant, and label, which tags a controller label. Each of these keywords may be used within one or more instructions. In the remainder of this specification, a set of one or more instructions called by the above keywords may be referred to as an instruction. For example, the set of one or more instructions that may be called by the keyword "reg" may be referred to as instruction reg, the set of one or more instructions called by the keyword "op" may be referred to as instruction op, the set of one or more instructions called by the keyword "push" may be referred to as instruction push, the set of one or more instructions called by the keyword "pop" may be referred to as instruction pop, and the set of one or more instructions called by the keyword "io" may be referred to as instruction io.

Each of the above keywords may be associated with a syntax. For example, the instruction reg may have the syntax reg{register_name}, where register_name is the name of the register being referenced by the keyword reg. Similarly, the instruction label may have the syntax label{label_name}, where label_name is the name of the label being referenced by the keyword label. In an embodiment, text that is not part of an instruction is assumed to a label.

The instruction const may have the syntax const {constant_value}, where constant_value is the value of the constant. The instruction, op may have the syntax (op {operation_name}) {input$_1$} ... {input$_n$}, where operation_name is the name of the operation being referenced by the keyword op, and input$_1$ ... input$_n$ are the names of the inputs, which may be names of registers, names of constants, names of labels or other operations, for example, which the operation operation_name operates upon.

Copy instruction 1002 copies a register, constant, label, or the results of an operation to a specified register. An example of a possible syntax for copy instruction 1002 is as follows.

```
(copy {register_name1} (reg {register_name2}) )·
(copy {register_name} (const {constant_value}) )
(copy {register_name} (label {label_name}) )
(copy {register_name} (op {operation_name}) {input$_i$} ... {input$_n$} )
```

In the above syntax, the argument of copy instruction 1002 is the target register to which the value copied is sent. The keyword following the keyword copy references a set of one or more instructions that define the type of source from which the value is being copied, which may be the instruction reg, the instruction const, the instruction label or the instruction op. In other embodiments, copy instruction 1002 may have a different syntax and/or there may be other types of copy instructions instead of, or in addition to, the copy instructions described above.

Test instruction 1004 may test an operation to see if a condition is true or false. In an embodiment, test instruction 1004 may have two possible outputs. One output may indicate that the condition was true, and another output may indicate that the condition was false. In another embodiment, there may be a diagnostic instruction test that tests whether one or more instructions include a syntax and/or other error. Test instruction 1004 may have the syntax (test (op {operation_name}) {input$_1$} ... {input$_n$}).

In the above example, the output of test instruction 1004 is not explicitly associated with a name of a register. In another embodiment, the test instruction 1004 includes a clause for designating the name of a register that will store the output of test instruction 1004, which may facilitate storing the results of different instances of test instruction 1004 in different registers. In other embodiments, test instructions 1004 may have a different syntax and/or there may be other types of test instructions instead of or in addition to the test instruction described above.

Push instruction 1006 saves the contents of a register, designated by the argument of push instruction 1006 onto the top of a stack. In contrast, pop instruction 1008 removes the element from the top of a stack and copies it into a register designated by the argument of the stack. In an embodiment, the syntax of push instruction 1006 is (push {register_name}), where is {register_name} is the name of the register whose contents are being pushed onto the stack. In other embodiments, push instructions 1006 may have a different syntax and/or there may be other types of push instructions instead of or in addition to the push instruction described above.

Similarly, the syntax of the pop instruction may be (pop {register_name}), where {register_name} is the name of the register to which the top of the stack is removed. In other embodiments, pop instructions 1008 may have a different syntax and/or there may be other types of pop instructions instead of or in addition to the pop instruction described above. In the above example, the stack is not explicitly associated with a name. In another embodiment, push instruction 1006 and/or pop instructions 1008 may include a clause for designating the name to a stack, which having multiple stacks with different names.

Unconditional jump instruction 1010, when implemented, may cause the controller to jump to an entry point in a sequence of instructions, where the entry point is indicated by the argument of the jump. The syntax of the unconditional jump may be (jmp (arg)), where arg may be a label keyword or a reg keyword. For example, a valid statement may be (jmp (label {label_name})) or (jmp (reg {register_name})). The argument of the jump describes the entry point to where the jump is made. In an embodiment, the arg may also be an operator that computes a label or register name. In other embodiments, jump instruction 1010 may have a different syntax and/or there may be other types of unconditional jump instructions instead of or in addition to the unconditional jump instruction described above.

Conditional jump instruction 1012, when implemented, may cause the controller to jump to an entry point in a sequence of instructions, indicated by the argument of the conditional jump, if a previous test was true. If the previous test was false, the controller will continue with the next instruction in the sequence. In another embodiment, if the previous test was false, the controller will not jump to the label or register in the argument of conditional jump instruction 1012, and if the previous test was true the controller continue with the next instruction in the sequence. In another embodiment, the conditional jump may have a second argument that references a register that contains the output of a particular instance of test instruction 1004, thereby facilitating having different instances of conditional jump instruction 1012 making jumps based on the outcome of particular instances of test instruction 1004. The syntax for conditional jump instruction 1012 may be (jmp_if (arg)), where arg may have any of the values described above in conjunction with the unconditional jump. Since unconditional jump instruction 1010 is a special case of conditional jump instructions 1012, in an embodiment, instructions 904 may not include an unconditional jump instructions 1010. In other embodiments, conditional jump instruction 1012 may have a different syntax and/or there may be other types of conditional jump instructions instead of or in addition to the conditional jump instruction described above.

Io Instruction 1014 handles all input and output operations, such as printing to a file, printing to a printer, and reading a file. The syntax of the io instruction is (io address (op {operation_name}) {input$_1$} ... {input$_n$}), where address is the address of the device performing the operation (e.g., the address of printer or monitor) operation_name is the name of an operation that is referenced by the instruction op and {input$_1$} ... {input$_n$} are the inputs to the op instruction. In other words, the io instructions operates on (e.g., prints) the results of instruction op to the device having the address "address." The purpose of an io instruction 1014 is to have one instruction that represents all input/output operations that the register machine is capable of causing. Some examples of the input/output functions that may be handled by the io instruction are printing text to a screen, reading information from a file, and sending information over a TCP/IP protocol. In another embodiment, io function 1014 may have a different syntax. In an alternative embodiment, there may be several input/output functions (in addition to, or instead of, io function 1014) in which different input/output functions handle different forms of input and/or output.

EXAMPLE

Greatest Common Divisor

The following sequence of controller instructions defines a program that computes the greatest common divisor, implemented using a less than operation (op <), which compares whether or not one register has a smaller value than another register, and a subtraction operation (op −), which subtracts the value of one register from another

```
(controller
    test_b
        (test (op =) (reg b) (const 0))
        (jmp_if (label gcd_halt))
        (copy c (reg a))
    remainder_loop
        (test (op <) (reg c) (reg b))
        (jmp_if (label remainder_halt))
        (copy c (op −) (reg c) (reg b))
        (jmp (label remainder_loop))
    remainder_halt
        (copy a (reg b))
        (copy b (reg c))
        (jmp (label test_b))
    gcd_halt)
```

In the above program, the first line "(controller" labels everything within the parenthesis as a controller. The next line "test_b" labels an entry point into the sequence of instructions. In the above controller, register b contains a divisor. Register b contains the most current value that is being tried to see if it is the greatest common divisor. The line "(test (op =) (reg b) (const 0))" tests whether register b is equal to 0. If the content of the register b is 0, then the current program should halt and the gcd is stored in register a. Specifically, if register b has the value 0, then test returns a first of two values (e.g., a true), and if register b does not have the value 0, then a second of two values is returned (e.g., a false). In the next line, the instruction "(jmp_if (label gcd_halt))" causes a jump to the line labeled "gcd_halt" if the value returned by the instruction test corresponded to a true, which ends the execution of the program (because b was equal to zero, which indicates that the greatest common divisor was found). Otherwise, the next line of the controller is executed, which is "(copy c (reg a))," where the contents of register a are copied to register c, which is equivalent to the C, FORTRAN or BASIC statement, c=a. Register a contains the prior value of register b, and consequently, the current value of register c is the prior trial greatest common divisor.

Next, in the line "(test (op <) (reg c) (reg b))," a test is performed to see whether the contents of register c are smaller than the contents of register b. Next, if the instruction returns a true, then the instruction "jmp_if (label remainder_halt)" causes a jump to the line labeled "remainder_halt." Otherwise, if the test instruction returns a false, the next line of the controller is executed. In the next line, the instruction "copy c (op −) (reg c) (reg b)" copies the value of the difference between registers c and b into register c. This line is equivalent to the statement c=c−b in BASIC, FORTRAN, or C, for example. Next the line "jmp (label remainder_loop)" causes an unconditional return to the line "remainder_loop." In other words, the sequence of instructions following the label "remainder_loop" repeats the operation c=c−b until c is smaller than b, and once c is smaller than b the program jumps to the sequence of instructions following the label "remainder_halt." If b is initially greater than c, then the "remainder_halt" section of the code copies the value of b to a (a=b) and copies c to b (b=c); and then starts execution at label test_b.

In the next line, "(copy a (reg b))," copies the contents of register b into register a. In the next line, "(copy b (reg c)," copies the contents of register c into register b. Then the line "(jmp (label test_b)" causes an unconditional jump to the label test b. This section, in combination with the statement just after the conditional jump of the test_b section, has the effect of switching the contents of register b with c and c with b. This way, if the initial choice for c is smaller than b, b and c will switch places. Basically the difference between a and b is either the greatest common divisor or a multiple of the greatest common divisor. If the difference is the greatest common divisor, then the remainder loop will produce a remainder of zero. If the difference is not the greatest common divisor, then the remainder loop produces a non-zero remainder. However, the remainder is either the greatest common divisor or a multiple of the greatest common divisor. Consequently, the process is repeated except this time the smaller of the original values of a and b now replaces the larger of the original values of a and b, and the newly found remainder replaces the smaller of the original values of a and b. So for example, if a is originally 81 and b is originally 18, repeated execution of the remainder loop produces a remainder of 9 in register c, execution proceeds to remainder_halt and then the remainder loop is repeated except now 18 is the value for a and 9 is the value for b.

The next example illustrates the design of subroutines, which may be useful for building a register machine that is easier to program than were no subroutines available. A continue register is used for implementing subroutines in the register machine, which marks the end of the subroutine. The continue register stores the label of the entry point in the controller sequence that indicates where execution should continue when the subroutine is finished.

In the example that follows, the greatest common divisor subroutine starts at the label "gcd." With the use of the continue register, the gcd subroutine may be called more than once during the execution of the register machine, and each time after the gcd subroutine ends control a different return entry point may be used.

Comments about the code may be indicated using two semicolons that are adjacent to one another. In other embodiments, other symbols (e.g., the letter "c") may be used to demark a comment.

```
gcd
    (test (op =) (reg b) (const 0))
    (jmp_if (label gcd_halt))
    (copy c (reg a))
remainder_loop
    (test (op <) (reg c) (reg b))
    (jmp_if (label remainder_halt))
    (copy c (op −) (reg c) (reg b))
    (jmp (label remainder_loop))
remainder_halt
    (copy a (reg b))
    (copy b (reg c))
    (jmp (label gcd))
gcd_halt
    (jmp (reg continue))
.
    ;; Before calling gcd (e.g., in the body of the routine that is calling
    ;; the gcd subroutine), a value is assigned to the label
    ;; "continue," which indicates the entry point to which gcd
    should return.
    (copy continue (label after_gcd_1))
    (jmp (label gcd))
after_gcd_1
    .
    ;; Here is a second call to gcd with a different continuation.
    (copy continue (label after_gcd_2))
    (jmp (label gcd))
after_gcd_2
```

In the above code, the sequence of instructions following the label "gcd" are the same as in the greatest common divisor example up until after the label "gcd_halt," where the instruction "(jmp (reg continue)." The jump instruction causes a jump to the line that has the value of a label name that is stored in the register labeled continue. Specifically, the line "(copy continue (label after_gcd_1))" copies the label "after_gcd_1" into the register continue. The line "(jmp (label gcd))" causes a jump to the line "gcd," which is a label that marks the beginning of the greatest common divisor program. After executing the greatest common divisor program, the program jumps to the line "gcd_halt" and then executes the line "(jmp (reg continue))," and since the current value of continue is "after_gcd_1," the line "(jmp (reg continue))" causes a jump to the line "after_gcd_1." Next the line "(copy continue (label after_gcd_2))" stores the value "after_gcd_2" as the new value for continue. Then the line "(jmp (label gcd))" causes a jump to the beginning of the greatest common divisor program, which is therefore executed again. As before, after executing the greatest common divisor program, the program jumps to the line "gcd_halt" and then executes the line "(jmp (reg continue))." However, this time, since the current value of continue is "after_gcd_2," the line "(jmp (reg continue))" causes a jump to the line "after_gcd_2" instead of the line "after_gcd_1."

EXAMPLE

Fibonacci Numbers

A stack may be used in a register machine to implement recursion. Consequently, the instructions "(pop {register_name})" and "(push {register_name})" may be useful for writing recursion algorithms, as will be discussed in this example.

This example computes the nth Fibonacci numbers, {1, 1, 2, 3, 5, 8, 13, 21, 34, . . . }, which is a sequence of numbers such that at any point in the sequence three consecutive numbers { . . . $a_i$, $a_{i+1}$, $a_{i+2}$, . . . } satisfy the relationship $a_{i+2}$= $a_{i+1}$+$a_i$, where the first two number in the sequence are the integer 1.

```
(controller
    (copy continue (label Fibonacci_halt))
    Fibonacci_loop
        (test (op <) (reg n) (const 2))
        (jmp_if (label answer))
        ;; set everything up to compute Fibonacci(n – 1)
        (push continue)
        (copy continue (label Fibonacci_n_minus_1))
        (push n)                              ;; save previous value of n
        (copy n (op –) (reg n) (const 1))     ;; copy n – 1 to n
        (jmp (label Fibonacci_loop))
    Fibonacci_n_minus_1
        (pop n)
        ;; set everything up to compute Fibonacci(n – 2)
        (copy n (op –) (reg n) (const 2))
        (copy continue (label Fibonacci_n_minus_2))
        (push val)
        (jmp (label Fibonacci_loop))
    Fibonacci_n_minus_2
        (copy n (reg val))
        (pop val)
        (pop continue)
        (copy val (op +) (reg val) (reg n)) ;; Fibonacci(n–1) +
        Fibonacci(n–2)
        (jmp (reg continue))
    answer
        (copy val (reg n))
        (jmp (reg continue))
Fibonacci_halt)
```

As in the previous program, in the above program, the first line "(controller" labels everything within the parenthesis as a controller. The open parenthesis is closed at the end of the controller. In the next line, "(copy continue (label Fibonacci_halt))," the contents of the register having the label "Fibonacci_halt" are copied to the register labeled continue. The next line, "Fibonacci_loop" is a label marking the beginning of a loop. The next line, "(test (op <) (reg n) (const 2))" tests whether the value of the content of register n is less than 2 and returns one of two values (in a register that is not explicitly given any name). Which of the two values is returned depends on whether register n is less than 2 or not. Initially, the value of n is the place in the series of Fibonacci numbers that is being sought. So, if the third Fibonacci number is being sought, then n is initialized as 3. To initialize the value of n, a copy statement may be executed prior to executing the controller. If the 101st Fibonacci's number is sought, n may be initialized with the statement, (copy n (const 101)). The next line, "(jmp_if (label answer))" causes a jump to the line labeled "answer" if n is less than 2, because if n is less than 2, a decision determines which section of the program executes next.

As indicated in the next comment of the program the next few lines set everything up to compute the (n–1)th Fibonacci number. Specifically, an index needs to be created to control how many times and when the section of code following the label, "Fibonacci_n_minus_1" is executed. Thus, if n is greater than or equal to 2, the program proceeds to the next line, and program begins by setting up the stack and the continue register for finding the (n–1)th Fibonacci number. Next, in the line "(push continue)" the value in the register continue is pushed to the top of the stack saving the contents of the register continue. The first time executing this line, the value stored in the register "Fibonacci_halt," which is therefore placed into the stack, which at this point is the only element in the stack. The label "Fibonacci_halt" becomes the bottom of the stack, and is only placed at the bottom of the stack. Once the controller reaches the bottom of the stack, the label "Fibonacci_halt" will be popped into the continue register, which will cause the execution of the program to end. Next, the line "(copy continue (label Fibonacci_n_minus_1))" copies the label "Fibonacci_n_minus_1" into the register "continue," which when later popped into the continue register may be used to cause a jump to the section of code under the label "Fibonacci_n_minus_1." The next line, "(push n)" saves the value of n at the top of the stack. The next line "(copy n (op –) (reg n) (const 1))" computes the value of n–1 and copies the value of n–1 into register n. The next line, "(jmp (label Fibonacci_loop))" causes a jump to the line labeled "Fibonacci_loop" at the top the program, where a check is made whether to cause a jump to the label "answer." The set up part of the loop continues to be repeated until n is less than 2, and creates a stack having the values Fibonacci_halt, n, Fibonacci_minus_1, n–1, Fibonacci_minus_1, n–2, . . . Fibonacci_minus_1, 2, where 2 is at the top of the stack and Fibonacci_halt is at the bottom of the stack. The stack is used as an index, and is used for computing successive Fibonacci numbers.

The next line, "Fibonacci_n_minus_1" labels the next section of code. After completing the set up, the value of continue is "Fibonacci_n_minus_1" and consequently, after checking if n is less than 2, the conditional jump of the next line sends jumps to the "Fibonacci_n_minus_1" line to compute the (n–1)th Fibonacci number. The next line, "(pop n)" removes the top value from the stack, which is 1, which is placed into register n, and the following line "(pop continue)" removes the next value from the stack. The first time through the Fibonnacci_minus_1 portion of the loop the label "Fibonnacci_minus_1" is at the top of the stack, and the value of continue becomes "Fibonnacci_minus_1."

As indicated by the next comment, the next few lines set everything up to compute the Fibonacci n–2 value. The next line, "(copy n (op –) (reg n) (const 2))" copies the value of n–2 into the register n, which is equivalent to the C, BASIC, or FORTRAN statement n=n–2. In the next line, "(push continue)" the value of the register "continue" is pushed onto the top of the stack. Next, the line "(copy continue (label Fibonacci_n_minus_2))" copies the label "Fibonacci_n_minus_2" to the register continue. The next line "(push val)" pushes an input value to the top of the stack. The register val is initialized by the answer section of code with 0 or 1, when the program begins execution with a 0 or 1 in register n. In general, however, the label "Fibonacci_n_minus_1" is not reached until after the two lines after the label "answer," which assigns the current value of n to the register val, and consequently, val does not need to be initialized. The next line "(jmp (label Fibonacci_loop))" causes a jump to the line labeled, "Fibonacci_loop," which is the top of the program. The next line, "Fibonacci_n_minus_2" labels the n–2 loop. The next line, "(copy n (reg val))" copies the input value, stored in register val, into the register n. The next line, "(pop val)" removes the top of the stack and places it in the register val. The next line "(pop continue)" removes the top of the stack and places the contents in the register continue. The next line "(copy val (op +) (reg val) (reg n))" sums the contents of the register val and the contents of register n and places the sum into the register val (i.e., val=val+n). The effect of this operation is to find the value of the next number in the Fibonacci series. The next line, "(jmp (reg continue))" causes a jump to the line currently stored in the register continue. The line stored in the continue register will be Fibonacci_n_minus_1, Fibonacci_n_minus_2, or Fibonacci_halt. The next line, "answer" labels the next few lines. The next line, "(copy val (reg n))" copies the value of register n into register val. The next line "(jmp (reg continue))" causes a jump to the line currently stored in the register continue, determining where to continue execution. The label "Fibonacci_halt)" identifies the last line of the Fibonacci program, and the parenthesis closes the set of instructions labeled as the controller.

Abstract Register Machine Simulator and Hardware

To execute the instructions of an abstract register machine (which will be referred to as a register machine), it is useful to build a register machine simulator or in other embodiments hardware that directly executes register machine instructions. To build the a register machine simulator four routines may be used, which include a routine for making a machine, a routine for making operators, a routine for setting register contents, a routine for retrieving register contents, and a routine for executing the machine. These routines will be referred to as instructions. In hardware embodiments, these routines may be implemented with specialized hardware circuits.

The instruction for making a machine may have the syntax
(make_machine {register_names} {operations} {controller}),
where register_names identifies the names of one or more registers that are used by the machine, operations identifies names of one or more operators that are used by the machine, and controller names a controller associated with the machine. The make_machine instruction builds and returns a model of the machine, machine_model, with the given registers, operators, and controller. In other embodiments, the make_machine instruction may have a different syntax and/or there may be other types of instructions for building a model of the machine instead of or in addition to the make_machine instruction described above.

The instruction for identifying names of operators may have the syntax
(make_operations {operations}),
where operations are the names of the operators that will be used. The make_operations instruction makes a list of the operators. In other embodiments, the make_operations instruction may have a different syntax and/or there may be other types of instructions for identifying names of operations instead of, or in addition to, the make_machine instruction described above.

The instruction for setting the contents of the registers of a machine model may have the syntax
(set_register_contents {machine_model} {register_name} {value}),
where machine_model is the name of a machine model, register_name is the name of a register associated with the machine model, and value is the value that will be stored in the register identified by register_name. The set_register_contents instruction causes the value of value to be stored in a simulated register, register_name, of the machine, named machine_model. In other embodiments, the set_register_contents instruction may have a different syntax and/or there may be other types of instructions for setting the value of registers instead of, or in addition to, the set_register_contents instruction described above.

The instruction for retrieving the contents of the registers of a machine model may have the syntax
(get_register_contents {machine_model} {register_name}),
where register_name is the name of a register associated with the machine named or described as machine_model. The get_register_contents instruction returns the contents of a simulated register in the given machine. In an embodiment, as a result of executing the instruction get_register_contents, the value of the register contents is displayed and/or printed to a file. In other embodiments, the get_register_contents instruction may have a different syntax and/or there may be other types of instructions for retrieving the contents of registers instead of, or in addition to, the get_register_contents instruction described above.

The instruction for executing a machine may have the syntax
(execute {machine_model}),
where machine_model has the value of the name of the machine being executed. The execute machine instruction simulates the execution of the given machine, starting at the first instruction in the controller sequence and halting when the simulation reaches the end of the sequence. Optionally, there may be a define statement that assigns a name to the register machine, which may have the syntax,
define machine_name
where machine_name is the name of the register machine. In other embodiments, the execute and define instructions may have a different syntax and/or there may be other types of instructions for executing a machine and/or assigning a name to a register machine instead of, or in addition to, the execute instruction described above.

An example of how the routine for making a machine, the routine for making operators, the routine for setting register contents, the routine for retrieving register contents, and the routine for executing the machine are used is as follows.

```
(define gcd_machine
    (make_machine '(a b c)              ;; register names
        (make_operations < = -)         ;; operations
        '(test_b
            (test (op =) (reg b) (const 0))
            (jmp_if (label gcd_halt))
            (copy c (reg a))
            remainder_loop
                (test (op <) (reg c) (reg b))
                (jmp_if (label remainder_halt))
                (copy c (op -) (reg c) (reg b))
                (jmp (label remainder_loop))
            remainder_halt
            (copy a (reg b))
            (copy b (reg c))
            (jmp (label test_b))
    gcd_halt)))
(set_register_contents gcd_machine 'a 88)   ;; stores 88 in
register a
(set_register_contents gcd_machine 'b 154)  ;; stores 154
in register b
(execute gcd_machine)
(get_register_contents gcd_machine 'a) ;; returns the contents of
register a, which is
11                                     ;; 11 because gcd(88, 154) = 11
```

The first nested procedure call initializes gcd_machine to a register machine program that computes the greatest common divisor. Specifically, the call "(make_machine '(a b c) . . . )" creates a machine having registers named a, b, and c, and where the argument "(make_operations < = -)" creates the operators <, =, and -. Similar to newLISP, which is an open source dialect of LISP, the apostrophe or single quote indicates that the symbol or the register representing the symbol is returned instead of the value contained in the variable. Next, the lines of code that list the instructions carried out to find the greatest common divisor appear. As determined by the specific sequence of instructions that make up the gcd_machine, the result of executing the gcd_machine is stored in register a. The next two procedure calls, "(set_register_contents gcd_machine 'a 88)" and "(set_register_contents gcd_ machine 'b 154)" initialize the input registers of a and b to the values 88 and 154, respectively. The fourth procedure call computes the greatest common divisor. Next, the line "(execute gcd_machine)" causes the gcd machine to execute. Then the line "(get_register_contents gcd_machine 'a)" retrieves the contents of register a after the gcd_machine has executed, which causes the number 11 to appear on the next line.

Active Element Machine Commands

Figure 11:
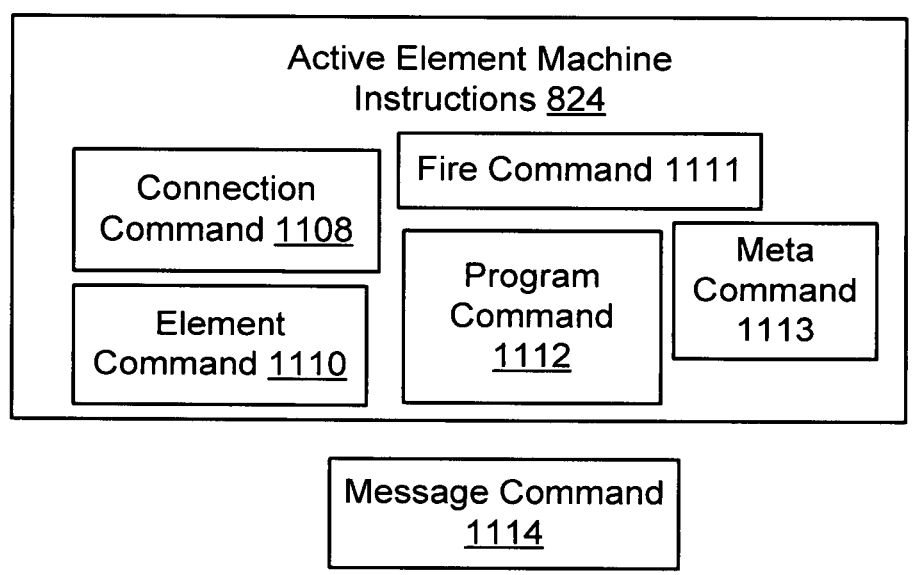
FIG. 11 shows a block diagram of an example of active element commands and message command.

FIG. 11 shows a block diagram of an example of active element machine instructions 824, which may include connection command 1108, element command 1110, optional fire command 1111, optional program command 1112, and optional meta command 1113. FIG. 11 also shows message command 1114. In other embodiments, one or more of the commands listed above may not be included within active element machine instructions 824 and/or there may be other commands within active element machine instructions 824 in addition to, or instead of, those listed above. Similarly, there may be other commands in addition to, or instead of, message command 1112.

It may be useful to define a command syntax for expressing an active element machine program and its architecture. The command syntax may use Symbolic-expressions (commonly referred to as S-expressions), which are common in the programming languages Lisp and Scheme. S-expressions are a form of semi structured data that may be used for creating a symbolic notation. In an embodiment, the S-expressions used for the command expressions either have the form of a single identifier or a list of identifiers and/or other S-expressions. The list may be enclosed within parenthesis. In another embodiment the list may be enclosed within brackets or another pair of symbols. Each identifier may represent any of a variety of elements of a program, such as a single variable or a set of instructions. In an embodiment, the first element in the list is an identifier, which is the name of the command.

The design of an active element and the computations executed on an active element machine can be represented as a sequence of commands. These active element commands may make it easier for a developer to design or program the active element machine. The active element commands may also be helpful in defining an active element translator, as will be discussed in the next section. In an embodiment, there are three types of active element commands (which are connection command 1108, element command 1110, and program command 1112). In another embodiment, there may be five types of commands (which are connection command 1108, element command 1110, fire command 1111, program command 1112, and meta command 1113).

Connection command 1108 specifies a connection from one element to another element and how those values are to be updated. In other words, connection command 1108 may be used to create or update a connection. Specifically, connection command 1108 may specify the time at which the connection values are updated, which may be indicated by a tag called time; the name of the element from which a message might be sent with these updated values, which may be indicated by a tag called from; the name of the element that might receive the message with these updated values, which may be indicated by tag called to; the message amplitude value that is assigned to this connection, which may be indicated by a tag called amp; the pulse width value that is assigned to this connection, which may be indicated by a tag called width; the transmission time value, which may also be called the propagation delay time that is assigned to this connection, which may be indicated by a tag called delay.

The syntax of connection command 1108 may be
(connection (time time) (from source_name) (to target_name) (amp amplitude) (width pulse_width) (delay delay_time)), where time may be the time at which the connection values are updated, source_name may be the name of the element from which a message might be sent from, target_name may be the name of the element that might receive the message, amplitude may be the message amplitude value that is assigned to this connection, pulse_width may be the pulse width value that is assigned to this connection, and delay_time may be the transmission time value that is assigned to this connection. In an embodiment, not all of the connection parameters listed need to be specified in every connection statement. Instead, just one or more of the connection values may be specified, and the unspecified connection values remain at default values and/or at values that were previously set in a prior connection statement.

An example of connection command 1108 may be
(connection (time 2) (from C) (to L) (amp 2) (width 1) (delay 3)).

In this example, at time 2, the connection from active element C to active element L has its amplitude set to 2, its pulse width set to 1, and its transmission time set to 3.

Element command 1110 specifies the time at which the element values are updated, which is indicated by a tag called time; the name of the active element, which is indicated by a tag called name; the threshold value that is assigned to this element, which is indicated by a tag called threshold; the refractory value that is assigned to this element, which is indicated by a tag called refractory; and the last time fired value assigned to this element, which is indicated by a tag called lastfire. The syntax of the element command may be
(element (time update_time) (name name) (threshold threshold) (refractory refractory_value) (lastfire last_time_fired)), where update_time is the time at which the element values are updated, name is the name of the active element, threshold is the threshold value that is assigned to the active element, refractory_value is the refractory value that is assigned to this active element, and the last_time_fired is the value for the last time that the active element was fired that is assigned to this active element.

An example of element command 1110 is
(element (time −1) (name H) (threshold −3) (refractory 2) (lastfire −1)).

In the above element command, at time −1, active element H has its threshold set to −3, its refractory period set to 2, and its last time fired set to −1. In an embodiment, in the above element command, all times may be relative, and consequently negative values are accepted for values of times.

Fire command 1111 specifies that at the time indicated by the time tag, the active element indicated by the name tag fires. Fire command 111 is optional. As an example, the fire command 1111 may be used to fire input active elements in order to communicate program input to the active element machine. The syntax for the fire command is
(fire (time time) (name name))
where time is the time that the element that has the name tag name fires, and name is the name of the active element that is fired.

An example of the fire command 1111 is
(fire (time 3) (name C))
The above fire command causes element C to fire at time 3.

Program command 1112 is optional. Program command 1112 may be convenient when a sequence of the other commands are used repeatedly. Program command 1112 combines a sequence of commands into a single command. Program command 1112 may be used in conjunction with an initialize function, which initializes a set of parameters to the values specified as the arguments of the initialize function. The syntax of the program command is (program(function_name $a1$ $a2$ $a3$ ...)

(Instruction1 ($a1$, $a2$, $a3$, ...)

(Instruction2 ($a1$, $a2$, $a3$, ...)

⋮

(InstructionN ($a1$, $a2$, $a3$, ...))

In the above, program command function_name is the name assigned to the function created. Also, in the above program command a1, a2, . . . are arguments passed to the program called function_name. The arguments a1, a2, . . . may pass variables, constants, or other objects such as another function or program name. Arguments a1, a2, . . . may be dummy arguments (arguments that have not yet been assigned a specific value). Any of the arguments a1, a2 . . . may be an argument of any type as long as each of the arguments a1, a2, . . . , are used as arguments of the appropriate type for the instructions that use them. For example, if a1 is a name of an active element, then the instructions that reference a1 should have a1 in locations that names of active elements are located. If a1 is numerical, then a1 may be used as an argument of any instructions that requires a numerical input. In the above example, instructions Instruction1, Instruction2, InstructionN are the sequence of instructions that the program command will cause to be implemented. There may be any number of instructions (e.g., one or more instructions) in the program command. The instructions may be any command or other instructions. In an embodiment, program commands may be nested within one another or include an execution statement of another program command as one of the instructions of the sequence of instructions of the program command. An example of an execution syntax for program command is (function_name $e1$ $e2$ $e3$ . . . $eN$), where function_name, above, in the execution statement is the same as, and has the same value as function_name in the program command, and $e1$, $e2$, $e3$, . . . $eN$ are the argument values that are to be used for the dummy arguments a1, a2, a3, . . . aN, respectively.

In the example below, the program command is used to define a function, named Initialize, so that when the arguments are passed to the Initialize function, the program command returns the whole program with each of the instructions initialized to the values of the arguments. After executing the program command using the Initialize function. Later the Initialize function may be called to cause the sequence of instructions in program command 1112 to be executed.

Using program command 1112, the initialize function may be defined as (program(Initialize $s$ to_elem $a$ $w$ $tu$)

(connection(time $s$) (from $E_1$) (to to_elem) (amp $a$) (width $w$) (delay $tu$))

(connection(time $s$) (from $E_2$) (to to_elem) (amp $a$) (width $w$) (delay $tu$))

(connection(time $s$) (from $E_3$) (to to_elem) (amp $a$) (width $w$) (delay $tu$))

⋮

(connection(time $s$) (from $E_M$) (to to_elem) (amp $a$) (width $w$) (delay $tu$)))

The above program command establishes a series of connections. Each connection is established at a time s, and each connection is established from one active elements $E_1$, $E_2$, . . . $E_M$ to active element to_elem and the connection is established with amplitude a, pulse width w, and transmission time tu. As a result of executing the above program command, the function call (Initialize $-1$ B 0 0 1)

causes s to be set to $-1$, to_elem to be set to B, a to be set to 0, w to be set to 0, and tu to be set to 1, therefore the above function call is equivalent to the program of commands (connection(time $-1$) (from $E_1$) (to $B$) (amp 0) (width 0) (delay 1))

(connection(time $-1$) (from $E_2$) (to $B$) (amp 0) (width 0) (delay 1))

(connection(time $-1$) (from $E_3$) (to $B$) (amp 0) (width 0) (delay 1))

⋮

(connection(time $-1$) (from $E_M$) (to $B$) (amp 0) (width 0) (delay 1)))

The fire command may be constructed from a program command. Another example of the syntax of the program command is (program (FireN n E)
    (element (time 0) (refractory 1) (threshold 1) (lastfire 0) )
    (connection (time 0) (from E) (to E) (amp 2) (width 1) (delay 1) )
    (connection (time n+1) (from E) (to E) (amp 0) )
).

The above statements define a program. The syntax for calling the FireN program is (FireN 8 E1).

The FireN command causes element E1 to fire 8 times at times 1, 2, 3, 4, 5, 6, 7, and 8 and then E1 stops firing at time=9.

The meta command 1113 enables a command to execute when an element fires within a window of time (the meta program described above is a different than and not related to the meta command describe here). The syntax for the meta command 1113 is (meta (name elem_name) (window beg_time end_time)
  (command cmd) )
where
  elem_name is the name of the element that may fire,
  beg_time is the value of the lower bound of the window of time,
  end_time is the value of the upper bound of the window of time,
  cmd executes each time that elem_name fires during the window of time.
If the window of time is omitted, then cmd is executed if at any time elem_name.
In other words, effectively beg_time = $-\infty$ and end_time = $\infty$. An example of a use of the meta command 1113 is
  (FireN 8 E1)
  (meta (name E1) (command C))

This example causes command C to be executed each time element E1 fires. Since (FireN 8 E1) causes element E1 to fire at times 1, 2, 3, 4, 5, 6, 7, 8, therefore command C executes at times 1, 2, 3, 4, 5, 6, 7, and 8.

Message command 1114 specifies that at the time indicated by the time tag, the element indicated by the from tag fires and consequently sends or propagates a message to the element indicated by the to tag, and optionally specifies values for the connection connecting the two active elements exchanging the message. Message command 1114 may be issued automatically as a result of executing an active element machine or other processor. The message command may be useful when executing a program on multiple active element machines and/or processors. The message commands may be used to keep track of the results of a section of a program executed on one machine, so that another machine may execute other active element commands that are supposed to occur simultaneously. The message command may have the syntax (message (time time) (from source_name) (to target_name) [(amp amplitude)] [(width pulse_width)] [(delay delay_time)]), where time is the time at which the message is sent, source_name is the name of the active element from which the message was sent, and target_name is the name of the active element to which the message was sent, amplitude may be the message amplitude value that is assigned to this connection while the message is being sent, pulse_width may be the pulse width value that is assigned to this connection while the message is being sent, and delay_time may be propagation delay time value that is assigned to this connection while the message is being sent.

In an embodiment, not all of the connection parameters listed need to be specified. Instead just one or more of the connection values may be specified, and the unspecified connection values remain at values that were previously set in a connection statement. An example of a use of the message command is (message (time 3) (from C) (to L)), which represents the sending of a message from active element C to active element L at time 3. Another example of a message statement is (message (time 5) (from C) (to L) (amp −4) (width 3) (delay 1)), which represents the sending a message from active element C to active element L at time 5, using an amplitude of −4, a pulse width of 3, and a transmission time of 1 for the connection.

Connection command 1108, element command 1110, and optionally fire command 1111, program command 1112, and meta command 1113 may be used instead of meta programs. Element instruction 1110 may be built from a series of meta program statements. For example, an element command may be replaced by a meta command setting the threshold, a meta command setting the refractory time, and a meta command setting the last time fired. Regarding setting the threshold, by setting $k_j$ equal to $i_j$, setting $x^j$ to a value associated with a threshold identifier (e.g., the letter T), and setting $v^j$ to a value to the which the threshold is to be set (e.g., −3), the threshold of active element $i_j$ is set to the value $v_j$ by the meta program statement $(x^j, k_j, i_j, v_j, t_j)$.

Active Element Translator

Regarding translator 820, instructions copy, test, push, pop, jump, jump_if, and io may be associated with numbers the 1-6, (which may be referred to as "types"). For each instruction I of the register machine, an equivalent active element machine program $P_I$ is designed that can perform computations that are equivalent to this instruction I.

Regarding notation, the active element translator may be denoted as T and defined as $T(I)=P_I$, where I is an abstract register machine instruction of the type 1 thru 6. T represents a translator program that translates a sequence of register machine instructions to a sequence of active element machine instructions that perform an equivalent computation. Translator T, which is also a program, may be executed on an abstract register machine or on an active element machine. For the io instruction, the active element translator will act as the identity map on this instruction, so $T(I)=I$ if I is an io instruction. Similarly, a program S may be said to have a register machine Program $P_S$ as its translation, even if S is another identifier of a program other than the numbers 1-6 or even if the numbers 1-6 identify different programs than those listed above. The translator may associate a program statement with a one or more register machine statements.

Any Boolean function can be composed of one or more NAND gates. Above, an example illustrating an active element circuit performing a NAND-gate computation. These computations can be represented with active element commands. The following program command creates the NAND function so that many active element NAND "gates" can be created with different elements and executed simultaneously

```
(program (NAND s in1 in2 out1 out2)
    (connection (time s)  (from in1)  (to out1)  (amp  2)  (width  1)
       (delay  1) )
    (connection (time s)  (from in1)  (to out2)  (amp  −2) (width  1)
       (delay  1) )
    (connection (time s)  (from in2)  (to out1)  (amp  2)  (width  1)
       (delay  1) )
    (connection (time s)  (from in2)  (to out2)  (amp  −2) (width  1)
       (delay  1) )
    (element  (time s)  (name out2)  (threshold −3) (refractory 2)
       (lastfire s))
    (element  (time s)  (name out1)  (threshold 3) (refractory 2)
       (lastfire s)))
```

The connections setup by the above program commands are the same as the connections used in the NAND example, above. The element statements ensure that the output active elements have the appropriate thresholds, refractory time, and last times fired to produce a NAND function. The refractory times, thresholds, and last times fired do not affect whether the NAND function creates a truth table appropriate for a NAND function, and therefore are not specified within the NAND function (although they may be specified elsewhere). Using B and C as input elements and L and H as output elements, the call (NAND −1 B C L H)

creates the connections in the program command that defined the NAND function, in which B and C are used as input elements and L and H are used as output elements. In this call of the NAND function the time is set to −1 as in the NAND example.

There are four cases that make up the truth table of a NAND operation, which are referred to as cases I, II, III, and IV in the discussion that follows. Case I) Both active element B and C do not fire at t=0, i.e. B|C=0|0° (called the Sheffer stroke | in logic). If there is a non-zero connection from element H, then at time t=1, the message command is generated:

(message (time 1) (from H) (to External1)).

In an embodiment, by default output elements send message commands to whatever they are connected to outside of the active element machine, because they are not connected to an internal active element. Consequently, since time 1 is after the refractory time, a message from H to the external environment is sent. This external environment could be a solenoid that opens or closes a mechanical device. Alternatively, this external environment could be artificial muscles that are made out of steel or composite material that are contracted or extended using electricity.

Case II) Active element B fires and C does not fire at t=0, i.e. B|C=1|0. Thus, the message commands generated are
(message (time 0) (from B) (to L))
(message (time 0) (from B) (to H))
(message (time 1) (from H) (to External1))

Case III) Active element B does not fire and C does fire at t=0, i.e. B|C=0|1. Thus, the message commands generated are
(message (time 0) (from C) (to L))
(message (time 0) (from C) (to H))
(message (time 1) (from H) (to External1)).

Case IV) Both active elements B and C fire at t=0, i.e., B|C=1|1. Thus, the message commands generated are
(message (time 0) (from B) (to L))
(message (time 0) (from B) (to H))
(message (time 0) (from C) (to L))
(message (time 0) (from C) (to H))
(message (time 1) (from L) (to External2)).

Thus, a translator may translate a NAND operation into connection commands 1108 and element commands 1110 or identify a group of instructions as a NAND operator.

Register Machine Operators

Register machine operators can be constructed from the NAND function. Specifically, the register machine operators, such as (op =), (op +), (op <), (op –), are Boolean functions. These operators can be simulated with active element machine programs that use compositions of the NAND program because it is well-known in logic and digital circuit theory that the NAND function is complete, [Enderton]. In other words, any Boolean function can be constructed from a composition of one or more NAND functions. Thus, a translator may translate any operator into a combination of one or more NAND operations, which in turn may be translated into element and connection commands.

Copy Programs

An active element program can perform a computation that is equivalent to the register machine instruction:
(copy b (reg a))
where a and b may represent 32 bit registers on a register machine, alternatively a and b may represent larger or smaller registers, which may be 8 bits, 4096 bits, or even greater.

Figure 12:
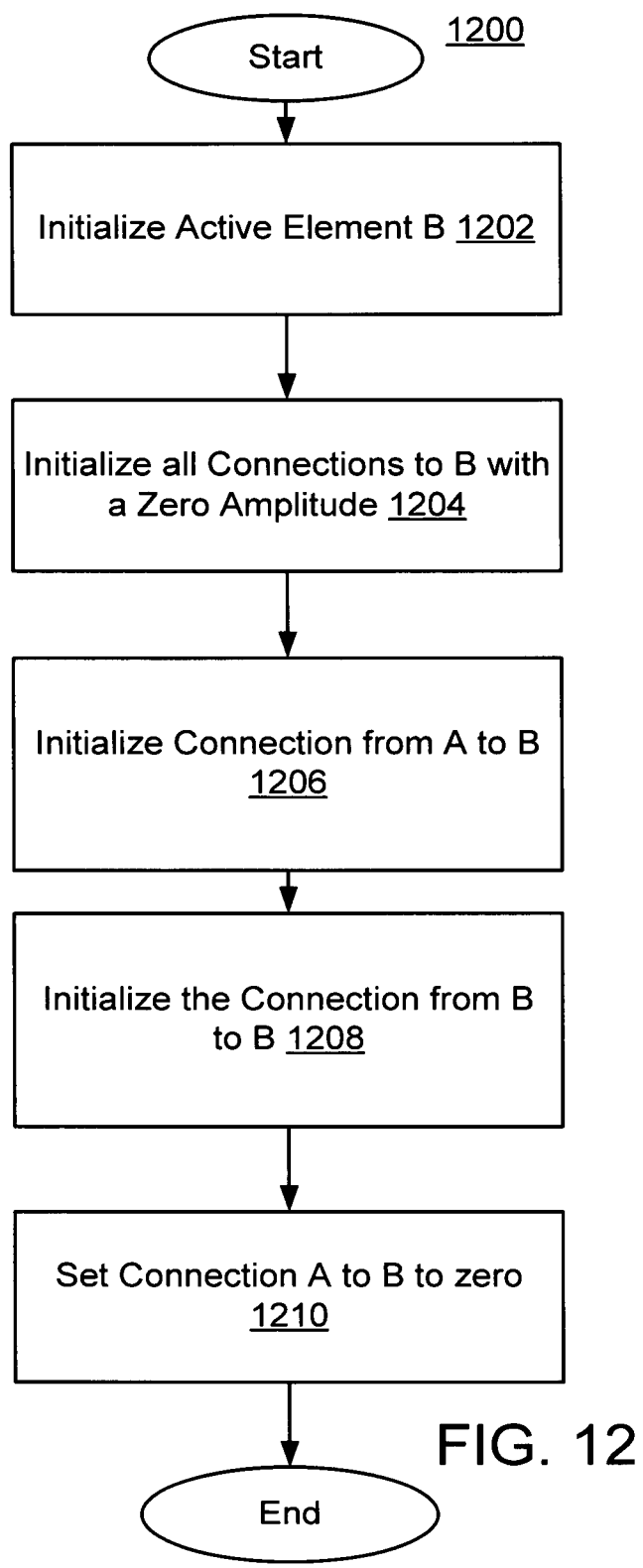
FIG. 12 shows a flowchart of an example of a method of performing a copy function using an active element machine.

FIG. 12 shows a flowchart of an example of a method 1200 of performing a copy function using an active element machine. to show that an active element program can perform a computation that is equivalent to the register machine instruction, it is first shown how to copy one bit of information from active element A to active element B. Suppose $\{E_1, E_2, E_3, \ldots E_M\}$ represents every active element in the machine. First, in step 1202, active element B is initialized to have a threshold of 1, refractory time of 1, and the time of the last firing is set to −1 using the command
(element (time −1) (name B) (threshold 1) (refractory 1) (lastfire −1)).

In step 1204, all connections to active element B may be initialized to have an amplitude and width of zero and a transmission time of 1 using the set of commands (connection(time − 1) (from $E_1$) (to B) (amp 0) (width 0) (delay 1))

(connection(time − 1) (from $E_2$) (to B) (amp 0) (width 0) (delay 1))

(connection(time − 1) (from $E_3$) (to B) (amp 0) (width 0) (delay 1))

$\vdots$ (connection(time − 1) (from $E_M$) (to B) (amp 0) (width 0) (delay 1))

In step 1206, the connection from element A to element B may be initialized to copy element A's state to element B using the statement
(connection (time 0) (from A) (to B) (amp 2) (width 1) (delay 1)).

Then, in step 1208, the connection from element B to itself may be initialized using the command
(connection (time 0) (from B) (to B) (amp 2) (width 1) (delay 1))
connecting active element B to itself, which allows active element B to maintain active element A's state indefinitely. As a consequence of connecting B to itself, if A fires once during the interval [0, s], then B continues to hold that state, by firing once ever unit of time after the first time B fires.

In step 1210, letting s represent a value of time, which may be set to a value greater than 0. The connection from element A to element B may be set to zero at time s so that element A's state may be copied to element B only during the time interval [0, s]. The following command prevents element A's state from being copied to element B after time s:
(connection (time s) (from A) (to B) (amp 0) (width 0) (delay 0))
Active element A's state may be interpreted as a 1 bit if A fires during the time interval [0, s]. Similarly, active element A's state is interpreted as a 0 bit if A does not fire in the time interval [0, s]. This is because if A fires at any time in the interval [0, s], then B may fire 1 unit of time later. If A does not fire in the time interval [0, s], then B never fires.

Placing the above commands into a program command, a copy function may be created that is capable of copying more than one bit. Using the above-defined function (Initialize s to_elem a w tu) a copy function may be defined using the program command
(program (Copy s t b from_a)
  (element (time s−1) (name b) (threshold 1) (refractory 1) (lastfire s−1))
  (Initialize s−1 b 0 0 1)
  (connection (time s) (from_a) (to b) (amp 2) (width 1) (delay 1))
  (connection (time s) (from b) (to b) (amp 2) (width 1) (delay 1))
  (connection (time t) (from_a) (to b) (amp 0) (width 0) (delay 1))
The above copy function may be capable of copying n bits of information from active elements $A_1, A_2, A_3, \ldots A_n$, similar to an n bit register. For each natural number k such that $1 \leq k \leq n$, the above program Copy copies element $A_k$'s state to element $B_k$ during the interval [s, t] by calling the function
(Copy s t $B_k$ $A_k$).

Thus, the copy function may be translated into element commands 1108 and connection commands 1110. In another embodiment, each of the steps of method 1100 is a distinct step. In another embodiment, although depicted as distinct steps in FIG. 12, step 1202-1210 may not be distinct steps. In other embodiments, method 1200 may not have all of the above steps and/or may have other steps in addition to, or instead of, those listed above. The steps of method 1200 may be performed in another order. Subsets of the steps listed above as part of method 1200 may be used to form their own method.

Stack Programs—Push, Pop, Stack Pointer

An active element program that can copy one list of active elements to another list of active elements, can be used to push values onto a stack and pop values from a stack. It is just a matter of isolating the active elements that are going to represent the stack memory, similar to a register machine computer. On a register machine computer, the operating system should never let another program write values on its stack, because allowing another program to write values on its stack may cause the whole system to crash.

As an example of performing a push and a pop n bit values are copied form one list of active elements to another list of active elements, where n is any positive integer. Suppose that $X_1$ represents a list of n distinct active elements. Suppose that $X_2$ represents another list of n distinct active elements such that the intersection of list $X_1$ and list $X_2$ is empty. A collection of Q of these lists, $X_1, X_2, X_3, \ldots, X_Q$ may represent a stack of list size Q, in which each list includes n bits of information.

First, in order to isolate the lists of elements $X_1, X_2, X_3, \ldots, X_Q$, each active element $a_k$ in $X_k$, may be initialized using the function call (Initialize −1 $a_k$ 0 0 1).

This initialization may be accomplished before a program begins to execute its instruction set. Let |[x]| denote the smallest integer k≥x. There may be q=|[$\log_2$ Q]| active elements allocated to store where the stack pointer is located. Let $p_1, p_2, p_3, \ldots, p_q$ be a set of active elements that are distinct from $X_1, X_2, X_3, \ldots, X_Q$. Each active element $p_k$ may be initialized to a state in which active element $p_k$ does not fire. Initializing each active element $p_k$ to a state in which it does not fire has the effect of initializing the stack pointer to zero. A combination of NAND programs may be used to build an adder for incrementing the "number" $p_1\ p_2\ p_3\ \ldots\ p_q$. A program that increments a number will be referred to as "Increment." Similarly, a decrementer can be designed from another combination of NAND programs, and a program that decrements a number will be referred to as "Decrement."

The numerical value of the stack pointer may be denoted by Sp. The kth bit of the stack element may be denoted by $[X_{Sp}]_k$. A number, letter, or word, for example, may be represented by a sequence of elements $[X_{Sp}]_1\ [X_{Sp}]_2\ \ldots\ [X_{Sp}]_n$, which together may make up one element of the stack. The following program may be used to push the list of elements that is A's kth bit, $[A]_k$, of the current stack element during time interval [s, t].

(Copy s t $[X_{Sp}]_k\ [A]_k$).

A push function may be defined using the active element program (program(Push *s t* $X_{Sp}$ *A Sp*)

(Copy *s t* $[X_{Sp}]_1\ [A]_1$)

(Copy *s t* $[X_{Sp}]_2\ [A]_2$)

(Copy *s t* $[X_{Sp}]_3\ [A]_3$)

⋮

(Copy *s t* $[X_{Sp}]_n\ [A]_n$)

(Increment *Sp*))

In the above program, first each copy instruction copies the next bit of X, represented by the series of bits $[X_{Sp}]_1, [X_{Sp}]_2, \ldots [X_{Sp}]_n$ to the stack A represented by the series of bits $[A]_1, [A]_2, \ldots [A]_n$ at the current pointer value Sp, and then the pointer value Sp is incremented. Thus, the push instruction may be translated into a series of copy instructions and an increment instruction, which in turn can be translated into connection and element commands.

Similarly, to pop the top element of the stack each bit at the current pointer value is copied from A into the list of elements $X_n$, a pop function may be defined using (program(Pop *st A* $X_{Sp}$)

(Copy *st* $[A]_1\ [X_{Sp}]_1$)

(Copy *st* $[A]_2\ [X_{Sp}]_2$)

(Copy *st* $[A]_3\ [X_{Sp}]_3$)

⋮

(Copy *st* $[A]_n\ [X_{Sp}]_n$)

(Decrement *Sp*))

Thus, the pop instruction may be translated into a series of copy instructions and a decrement instruction, which in turn can also be translated into connection and element commands.

Program Flow—Jump, Jmp_If, Instruction Pointer

In order to simulate a register machine jmp_if or jmp instruction, the active element machine may store an instruction pointer in a collection of active elements $I_1, I_2, I_3, \ldots I_n$. The states of these active elements store the location of the current instruction. Consequently, a jmp_if or jmp command will copy a new list of states, representing the new instruction, into $I_1, I_2, I_3, \ldots I_n$. This may be accomplished using the copy program described above.

Testing the Translator

An abstract register machine simulator or even abstract register machine hardware may be useful for testing purposes. For example, the register machine program that computes the nth Fibonacci number may be translated to an active element machine program to see how well the translation is performed. Another test that may be performed is an execution speed comparison between a register machine program P and the translated active element machine program, T(P).

A few distinct programs, denoted $\{P_1, P_2, P_3, P_4\}$, coded with register machine instructions may be used to help test the translator. Although four programs are used in this example, less than four programs or more than four may also be used instead. Program $P_1$ may be the greatest common divisor program defined in the example titled Greatest Common Divisor, for example. First, program $P_1$ may be tested to check that program $P_1$ correctly computes the greatest common divisor for a few input values. Next, the active element translator may be set to run with input $P_1$, and the output of the translator may be the active element machine program $T(P_1)$. Then the active element machine program $T(P_1)$ may be executed with the same input values as input $P_1$ to check that it is computing the greatest common divisor.

To test the active element machine's ability to do recursion, a program $P_2$ may be chosen, such as the program defined in the example titled Fibonacci Numbers. Program $P_2$ may be tested to see that it computes the nth Fibonacci number on the register machine. Then active element machine program $T(P_2)$ may be tested to check that active element machine program T($P_2$) computes the nth Fibonacci number on the active element machine. Program $P_3$ may be a register machine implementation of the quick sort algorithm, [Sedgewick]. Program $P_4$ may be a register machine implementation of the fast Fourier transform algorithm. In another embodiment, any set of programs may be used to test the translator and/or the active element machine. In general, the larger the set of test programs and the greater the variety of programs, the more rigorous the testing.

Applications 1—Interpreters, Compilers, Translators, Original Source Code, Execution Speed and Accuracy For a hardware chip that is designed to execute native active element machine instructions, it may be helpful to use an algorithm (e.g., software), denoted as S, already written in another computer language, such as FORTRAN, C, SCHEME, PASCAL, C++, JAVA, PYTHON, PERL, or even a low level language such as assembly. This can be accomplished by designing an interpreter or compiler that maps the algorithm S to a program P of register machine instructions. After converting the algorithm S to a program P, the active element translator may translate program P to active element machine program T(P). Consequently, the original algorithm S is able to execute on a hardware chip designed to compute active element machine instructions (by running program P on the hardware chip designed to compute active element machine instructions).

In some cases, translating the computer language into register machine instructions that are translated into an active element machine language may speed up the execution of the algorithm S. In some cases, translating algorithm S to program P instead of to a conventional executable program (designed to execute on a conventional machine) may improve the performance of the algorithm or software, S. In some cases, it may reduce the man-hours so that a developer does not have to write a new program $P_S$, implemented in active element instructions that performs the same task or provides the same functionality as S.

Figure 13:
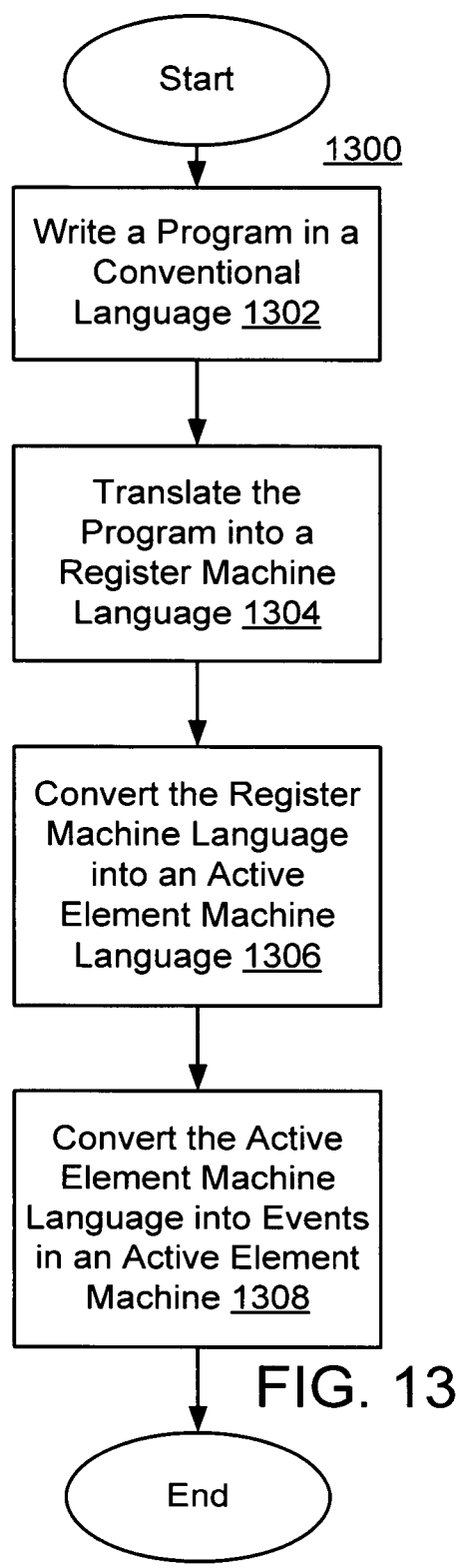
FIG. 13 shows a flowchart of an example of a method for programming an active element machine.

FIG. 13 shows a flowchart of an example of a method 1300 for programming an active element machine. In step 1302, a program is written in a conventional programming language known to the programmer, such as C, PERL, JAVA, or FORTRAN. In step 1304, compiler translates the conventional programming language into a register machine language. Step 1304 may include converting the conventional programming language to the above register machine language, to a register machine language associated with another entity, such as another conventional programming language, a particular compiler, or a particular processor. Alternatively, step 1304 may involve first converting the known language to a first register machine language associated with the conventional programming language, a particular compiler, or a particular processor, and then converting the first register machine language to the above register machine language. Step 1304 may also involve converting the program into instructions 904, labels 906, operations 910 (e.g., operators), and registers 910. In step 1306, the register machine language is converted to an active element machine language. Step 1306 may involve first converting operations 910 into a combination of NAND operations, and then converting the NAND operations and instructions 904 into connection statements and element statements. In step 1308, the active element machine statements are converted into events that occur on the active element machine. In another embodiment, although depicted as distinct steps in FIG. 13, step 1302-1308 may not be distinct steps. In other embodiments, method 1300 may not have all of the above steps and/or may have other steps in addition to, or instead of, those listed above.

Applications 2—Protecting Algorithms, Hardware, and Software

Dynamic Active Element Decryption

Keeping the design of a particular active element machine proprietary may rely upon a variety of security measures, such as encrypting the Active Element Machine (AEM) executable code, keeping the encryption keys secure, and dynamically decrypting the AEM code as the code executes. When an active element machine executes, any new commands generated during execution are placed on a priority queue, according to its expected time of execution. In other words, commands with lower expected execution times are given a higher priority, and therefore are executed first. Since the commands are in a queue, one can encrypt all commands in the priority queue and decrypt each command as that command is removed from the priority queue. Decrypting the commands one at a time is simpler than were the commands decrypted all at the same time. Furthermore, all initial commands that are set up before the active element machine starts execution can also be stored as encrypted commands in long term memory.

Many different methods may be used to hide the encryption keys that encrypt and decrypt the initial commands and all subsequent commands that are placed on and removed from the priority queue. For example, one method is to use a certain state of activity of the active element machine, during execution, to determine what the encryption key is. The state could depend on which of a group of active elements just fired and how far each of a group of active elements is into their refractory period. Thus, the encryption key would be different for every command removed from the queue. Consequently, determining all of the encryption keys is expected to make it difficult and expensive to reverse engineer the encrypted active element commands. Cracking the encryption can be made more difficult by implementing the active element commands directly on an active element machine, because the encryption key may also be dependent upon time. While executing, the original execution times of the program can be changed to reduce the likelihood of finding the correct key by reverse engineering. Consequently, in an embodiment, active element commands use relative times, so that the relative times can be utilized for creating keys that are dependent on the time and state of the active element machine.

There are also many other methods of hiding the encryption key that may be used instead of or in addition to basing the encryption key on time, such as hiding the encryption key, where the bits of the encryption key are spread out over a large block of memory that is initialized to random numbers.

Active Element Randomized Translation

As an alternative to cryptography, the translation of an active element machine program or register machine program may be randomized to create a pattern recognition problem with an enormous amount of computational complexity for the AEM disassembler. There are an infinite number of active element machines that can execute equivalent computations. For example, for a given function if all of the amplitudes and thresholds are multiplied by the same number, the operation of the function remains unchanged. Similarly, if an additive constant is added to all the times, specifically to the transmission times, firing times, and refractory periods, the operation remains unchanged. Consequently, the difficulty of discerning what instructions are being invoked may be increased if every so often all of the amplitudes and thresholds of a function are multiplied by the same arbitrary number and/or an additive constant is added to the times.

Using the NAND function as an example, for each natural number k, every threshold may be multiplied by k, and every amplitude may be multiplied by k using the program (connection (time −1) (from B) (to L) (amp 2k) (width 1) (delay 1))
(connection (time −1) (from B) (to H) (amp −2k) (width 1) (delay 1))
(connection (time −1) (from C) (to L) (amp 2k) (width 1) (delay 1))
(connection (time −1) (from C) (to H) (amp −2k) (width 1) (delay 1))
(element (time −1) (name H) (threshold −3k) (refractory 2) (lastfire −1))
(element (time −1) (name L) (threshold 3k) (refractory 2) (lastfire −1))

An analysis similar to Cases 1 thru 4 shows that for any k the above active element program executes an equivalent NAND function, starting at time 0.

An arbitrary multiplier to facilitate encryption may be used in a variety of other instructions in addition to the use described in conjunction with the NAND function to facilitate encryption. For any finite collection of active elements and their corresponding connections, there are an infinite number of message amplitudes, and thresholds that can execute an equivalent active element computation. A simple way to do this is to multiply each incoming message amplitude by k and multiply the threshold of the receiving active element by k. Observe that k can be any natural number. Consequently, there are an infinite number of active element machine programs that can execute a computation that is equivalent to the original active element program.

When the active element translator is executing, it may utilize a random number generator to help reduce reverse engineering. As the active element translator, translates register machine instructions to active element machine commands, a random integer k is generated. This value of k is applied to the original active element program that computes the register machine instruction. Thus, at two different times, the same register machine instruction may be translated to a distinct active element program.

There are also other more complex ways to change the pulse widths and transmission times in a subcollection of active elements and their associated connections so that the new machine executes equivalent instructions.

AEM Machine Execution on Embedded Hardware

In one embodiment, active element machine 806 may include one or more Reconfigurable Gate Array (RGA) chips, ASICs, and/or in some cases single microprocessors and/or groups of microprocessors. Configuring one or more Reconfigurable Gate Array (RGA) chips, ASICs, and/or microprocessors and/or groups of microprocessors into an active element machine may be referred to as executing an AEM program on embedded hardware [Gokhale].

The execution of an active element machine may depend on three math operations, such as addition, signed multiplication, and a comparison operation such as greater than (greater than can be replaced with less than). In other words, an active element A fires at time s if a weighted linear sum of A's inputs at time s is greater than a threshold $\theta$ and the element A is not in its refractory period at time s. The weighted linear sum may use addition and signed multiplication or in other implementations it may use addition, subtraction, and unsigned multiplication. The threshold comparison uses the greater than operation or in other implementations it may use a less than operation. The inequality $a_1x_1+a_2x_2+a_3x_3+ \ldots +a_nx_n > \theta$ is mathematically equivalent to $b_1x_1+b_2x_2+b_3x_3+ \ldots +b_nx_n < -\theta$ where $b_k = -a_k$ for each k satisfying $1 \leq k \leq n$. Consequently, a threshold comparison can be represented by either a less than (<) operator or a greater than (>) operator. Some RGA and ASIC chips have a weighted linear sum circuit built into the hardware, because weighted linear sum computation may be performed by RGA and ASIC chips that compute a finite-impulse response filter (FIR). The weighted linear sum and comparison operators (< or >) are also standard computations for microprocessor chips.

Some concepts that may help improve the effectiveness of AEM programs executing on embedded hardware are as follows. Let $\phi$ denote the active element degree of an AEM program, which is the maximum number of active elements computing a weighted linear sum from its inputs ranging over every possible time s. Let $\chi$ be the output connection degree of the program, which is the maximum number of non-zero connections coming out of an active element, ranging over all active elements at every possible time s. Let $\omega$ be the input connection degree of the AEM program, which is the maximum number of non-zero connections coming into an active element, ranging over all active elements at every possible time s. Let T be the transmission degree of the program, which is the maximum transmission time of a connection, ranging over all connections at every possible time s.

To alleviate lengthy debugging and reduce development time, an AEM hardware design program P may execute in an Operating System (OS) environment. For example, executing in an OS environment may be performed by a standard digital computer running an OS, such as Linux, MacOS, OpenBSD, Unix, or a version of Windows. However, an operating system is not necessary for designing or running an AEM program. The purpose of the AEM hardware design program P is to take an active element machine program M and produce an equivalent program P(M) that is computationally equivalent to M, but that is more suitable for execution on embedded hardware. In other words, the AEM designer program P receives as its input an active element machine program M and produces as its output an active element program P(M) that is computationally equivalent to P. For example, suppose the hardware of a particular RGA chip may only support $\phi=10,000$ distinct active elements, $\chi=100$ output connections, $\omega=80$ input connections, and T=6000. Then an effective designer program P will create P(M) such that for each time s during program execution, P(M) will have at most 10,000 distinct active elements, P(M) will have at most 100 non-zero connections coming out of an active element, P(M) will have at most 100 non-zero connections entering into an active element, and every transmission time will be at most 6000 units of time. In this example, an active element machine program M originally designed to have $\phi$ greater than 10,000 distinct active elements, $\chi$ greater than 100 output connections, $\omega$ greater than 80 input connections, and/or T greater than 6000 may need to be redesigned as P(M) having $\phi$ less than or equal to 10,000 distinct active elements, $\chi$ less than or equal to 100 output connections, $\omega$ less than or equal to 80 input connections, and/or T less than or equal 6000.

A finite sequence of active element machine commands can be translated into equivalent commands such that floating point values are mapped to integer values. To improve execution speed and simplify AEM execution in embedded hardware, AEM commands in P(M) may contain only integer values. For example, when command times are integer values, the AEM commands may be executed at times using a standard digital timer executing in the hardware. In other implementations that do not use a hardware designer program P, the human programmer may choose to write the original AEM program M so that all command arguments only take on integer values.

Next, implementation of the refractory period is discussed for an AEM executing in embedded hardware. For the refractory period, digital hardware can be used. Each active element may have a corresponding refractory AND gate, a refractory flip-flop, and a refractory timer circuit. For example, if at time s active element B has fired, the output of B is 1 at time s. The output of B goes to one of the inputs of its refractory AND gate. The other input of B's refractory AND gate will receive the output of B's refractory flip-flop. The value of B's refractory flip-flop is set to zero at time s+1 since B fired at time s. B's refractory flip-flop is changed from zero to one after B's refractory timer circuit indicates that B's refractory period has expired. In this example, if $\tau_B$ denotes the refractory period of B, then at time $S+\tau_B$, B's refractory timer circuit flips B's refractory flip-flop from 0 to 1. One can use similar digital methods, with gates, flip-flops and timer circuits for coordinating the transmission of the firing pulse from B at time s to other active elements at later times, greater than s.

Most integrated circuit designers use a Hardware Description Language (HDL). The two examples of HDLs are Verilog and VHDL. For simplicity, Verilog will be used as an example of an HDL, but any place the term "Verilog" appears, VHDL or another HDL may be substituted to obtain other embodiments.

Verilog can describe integrated circuit designs at four different levels of abstraction, which are the algorithmic level (which is similar to C code), the Register Transfer Level (RTL uses registers connected by Boolean equations), the gate level (which may be represented by interconnected logic operators, such as AND, NOR, OR, NOT, NAND, etc), and the switch level (the switches are MOS transistors inside the gates of the gate level).

Each of these different levels may be used for the design of an AEM program. For a prototype AEM machine embedded in hardware, the algorithmic abstraction level is more likely to be emphasized because it is easier to conceptualize at this level and the algorithmic level also helps reduce human design errors. However, some experienced AEM designers may still choose to use the gate and/or switch level design even for a prototype chip. For embedded hardware that is ready for production, more of the abstraction level is likely to be at the gate and/or switch level in order to increase speed and reduce storage.

In some applications, at a particular time s, the number of active elements that compute a weighted linear sum as their input, may be greater than the hardware resources of the chip. In this case, a command priority queue is used to order and store active element machine commands and thereby reduce the likelihood of (e.g., prevent) an overflow. As discussed in conjunction with the encryption, the command priority queue may include commands ordered in a queue based on the time in the command. In one embodiment, commands with an earlier time (e.g., a lower time value) are removed from the priority queue and executed on the embedded hardware before commands with a later time (e.g., command with a higher time value).

For example, the command (message (time 7) (from B) (to H)) is removed from the queue and executed before the command (message (time 8) (from H) (to H)). Similarly, (element (time 13) (name E17) (threshold 1) (refractory 8) (lastfire 2)) is removed and executed before the connection command (connection (time 67) (from E456) (to E123) (amp −7) (width 13) (delay 5)) is removed and executed.

Verilog has language constructs that enable hardware changes at a particular time, which may be used for AEM programs, because each AEM command has a time associated with it. In one Verilog implementation of an AEM program, distinct parts of the hardware chip may be dedicated to different active elements computing at the same time so that as many weighted linear sums can be computed in parallel as possible. Computing the activities associated with multiple active elements in parallel may enhance the AEM program execution speed, as compared to an implementation in which the activities associated with the active elements are not computed in parallel. Thus, the parallelism of an RGA chip and custom ASICs can be utilized by active element machine programs using the above methods. Programming languages, such as C, may also be used for implementing AEM programs on a standard microprocessor. However, some standard processors may only be able to execute one or very few active elements at one time or in parallel. Also, the use of active element machine commands with integer times and a priority queue for overflow conditions can help prevent the improper timing of circuits in the embedded hardware, which may help prevent bugs that are difficult to detect, [Gokhale]. Further, AEM programs running on an OS machine enable quick writing and testing of large, complex active element machine programs before they are executed on embedded hardware. The use of an AEM hardware designer program reduces the likelihood that the user would want to write an equivalent program to match the constraints of the embedded hardware. In some applications, AEM hardware designer software P running on an OS machine simplifies the design, and may facilitate mapping an AEM program M to an equivalent Verilog program P(M) that instructs the chip how to execute an equivalent AEM program in the embedded hardware.

Other Extensions

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:
1. A system comprising:
an artificially assembled multiplicity of man-made computing elements; and
a multiplicity of artificially constructed couplings communicatively connecting the artificially assembled multiplicity of man-made computing elements to one another, such that the couplings are capable of transmitting messages between the artificially assembled multiplicity of man-made computing elements;
a first portion of the artificially assembled multiplicity of man-made computing elements, which will be referred to as input elements, are capable of receiving input for the system that includes at least a set of instructions chosen by the user and input data, implementing the instructions causes parameters of the active man-made computing elements to be set to particular settings; and
a second portion of the artificially assembled multiplicity of man-made computing elements, which will be referred to as output elements, each have a content that represents output of the system, the content being based on the instructions and on the input data, the content being a result of applying a transformation to the input data, the transformation being caused by the particular settings that result from implementing the instructions.
2. The system of claim 1, wherein the input elements are capable of being configured to send at least one message of the messages to others of the input elements.

3. The system of claim 1, wherein a third portion of the artificially assembled multiplicity of man-made computing elements, which will be referred to as computational elements, are capable of receiving at least a first message of the messages from the input elements, and sending at least a second message of the messages to the output elements.

4. The system of claim 3, wherein the computational elements are capable of sending at least the second message to at least one other of the computational elements.

5. The system of claim 1, wherein at least one man-made computing element of the artificially assembled multiplicity of man-made computing elements is associated with a period of time that must elapse after sending a first message prior to sending a second message, wherein the period of time that must elapse must be greater than zero, and will be referred to as a refractory period.

6. The system of claim 1, wherein at least one message of the messages is associated with an amplitude that is dependent on a first of the artificially assembled multiplicity of man-made computing elements that is sending the at least one message and on a second of the artificially assembled multiplicity of man-made computing elements of the man-made computing elements that is receiving the at least one message.

7. The system of claim 6, wherein the system is configured such that the amplitude can be changed as a function of time while executing a set of instructions.

8. The system of claim 1, wherein at least one message of the messages is associated with a width that is dependent on a first of the artificially assembled multiplicity of man-made computing elements that is sending the at least one message and a second of the artificially assembled multiplicity of man-made computing elements that is receiving the at least one message.

9. The system of claim 8, wherein the system is configured such that the width can be changed as a function of time while executing a set of instructions.

10. The system of claim 1, wherein at least one message of the messages is associated with an adjustable period of transmission time that is dependent on a first of the artificially assembled multiplicity of man-made computing elements that is sending the at least one message and a second of the artificially assembled multiplicity of man-made computing elements that is receiving the at least one message.

11. The system of claim 10, wherein the system is configured such that the transmission time can be changed as a function of time while executing a set of instructions.

12. The system of claim 1, wherein at least two man-made computing elements of the artificially assembled multiplicity of man-made computing elements are associated with a period of time during which if a combination of amplitudes of received messages is greater than a threshold, a man-made computing element of the at least two man-made computing elements sends a message, wherein the received messages are those of the messages that were received from the at least two man-made computing elements.

13. The system of claim 12, wherein said combination is a sum.

14. The system of claim 12, wherein said combination is a product of amplitudes.

15. The system of claim 12, wherein said combination is a convolution.

16. The system of claim 12, wherein at least one message of the messages is associated with a width, which is a length of time associated with the at least one message, that is dependent on a first of the artificially assembled multiplicity of man-made computing elements that is sending the at least one message and a second of the artificially assembled multiplicity of man-made computing elements that is receiving the at least one message;

at least one man-made computing element of the artificially assembled multiplicity of man-made computing element is associated with a duration of time that must elapse after the at least one man-made computing element last fired, wherein the duration of time that must elapse must be greater than zero, and will be referred to as a refractory period; and the period of time starts after the refractory period.

17. The system of claim 1, wherein at least one man-made computing element of the artificially assembled multiplicity of man-made computing elements is associated with a time during which if a combination of amplitudes of messages received from other man-made computing elements is less than a threshold, the at least one man-made computing element sends a message.

18. The system of claim 17 wherein said combination is a sum.

19. The system of claim 17 wherein said combination is a convolution.

20. The system of claim 1, wherein at least one man-made computing element of the artificially assembled multiplicity of man-made computing elements is associated with a time during which if a combination of amplitudes of messages received from other man-made computing elements is inside the range of a lower threshold and upper threshold, the at least one man-made computing element sends a message.

21. The system of claim 20, wherein said combination is a sum.

22. The system of claim 1, wherein at least one man-made computing element of the artificially assembled multiplicity of man-made computing elements is associated with a time during which if a combination of amplitudes of messages received from other man-made computing elements is outside the range of a lower threshold and upper threshold, the man-made computing element sends a message.

23. The system of claim 22, wherein said combination is a sum.

24. The system of claim 1, wherein each man-made computing element of at least a group of the artificially assembled multiplicity of man-made computing elements is associated with a condition that causes the man-made computing element to fire, and a time at which the man-made computing element fires will be denoted as a firing time, and the system is configured to represent a symbol as a sequence of firing times.

25. The system of claim 1, wherein each man-made computing element of at least a group of the artificially assembled multiplicity of man-made computing elements is associated with a condition that causes the man-made computing element to fire, and a time at which the man-made computing element fires will be denoted as a firing time, and the system is configured to represent a set of one or more instructions as a sequence of one or more firing times.

26. The system of claim 1, wherein at least one message of the messages is associated with an amplitude that is dependent on a sending man-made computing element, which is a man-made computing element of the artificially assembled multiplicity of man-made computing elements that is sending the at least one message, and a receiving man-made computing element, which is a man-made computing element of the artificially assembled multiplicity of man-made computing elements that is receiving the at least one message;

the system is configured such that the amplitude can be changed as a function of time while executing a set of instructions;

the at least one message is associated with a width that is dependent on the sending man-made computing element and the receiving man-made computing elements;

the system is configured such that the width can be changed as a function of time while executing a set of instructions;

the at least one message is associated with a transmission time that is dependent on the sending man-made computing element and the receiving man-made computing element; and the system is configured such that the configuration of the system can be changed as a function of time while executing a set of instructions.

27. A method comprising:

causing the system of claim 1 to execute a set of instructions in which each instruction is at least
 a designation of a pair of communicatively coupled man-made computing elements,
 a value,
 a time when to apply the value, and
 a designation of a parameter that is charged to the value, when the value is applied.

28. A method of programming the system of claim 1 comprising:

configuring the system to produce a. set of outputs in which each output of the set corresponds to a given input of a set of inputs.

29. A method of programming the system of claim 1 comprising:

choosing a set of instructions to produce a set of outputs in which each output of the set of outputs corresponds to a given input of a set of inputs.

30. A method comprising:

receiving at first portion of a plurality of artificially constructed active man-made computing elements, which will be referred to as input elements, at least input data and a set of commands;

the receiving causing the plurality of artificially constructed active man-made computing elements to send and receive messages as a result of implementing the set of commands, wherein the messages travel along artificially constructed communication lines, and wherein each artificially constructed communication line connects a pair of artificially constructed man-made computing elements from the plurality of artificially constructed man-made computing elements;

the sending and receiving of messages causing a second portion of the plurality of artificially constructed active man-made computing elements, which will be referred to as output elements, to each have a content that represents output of the system, the content being based on the commands and on the content, the output data being a result of applying a transformation to the input data, the transformation being caused by the particular settings that result from implementing the commands.

31. The method of claim 30, further comprising:

adjusting an amplitude associated with at least one of the messages, wherein the adjusting is performed as a function of time.

32. The method of claim 30, further comprising:

adjusting a width associated with at least one of the messages, wherein the adjusting is performed as a function of time.

33. The method of claim 30, further comprising:

adjusting a transmission time associated with a time that at least one of the messages travels between the pair of the artificially constructed man-made computing elements, wherein the adjusting is performed as a function of time.

34. The method of claim 30, wherein each of the messages is associated with an amplitude, and a causing of a given artificially constructed man-made computing element of the plurality of artificially constructed man-made computing elements to send is performed by the given artificially constructed man-made computing element if a combination of amplitudes associated with a set of messages received by the given artificially constructed man-made computing element is above a threshold.

35. The method of claim 34, wherein the set of messages is received during a window of time.

36. The method of claim 35, wherein a message received outside of the window is not included in the combination.

37. The method of claim 35, wherein the window starts an amount of time after a prior sending of a message and ends after a time that is a width associated with a particular message.

38. A system comprising:

an active man-made computing element capable of sending and receiving messages, wherein the active computing element includes at least
 an amplifier having an input and an output,
 a positive feed from the output to the input, and
 a switch for ending the positive feedback;

the active man-made computing element being associated with a threshold, wherein if a combination of messages received is greater than the threshold, the active man-made computing element sends a message; and the active man-made computing element also being associated with a refractory period, wherein after sending a first message, the active man-made computing element waits until after the refractory period passes prior to sending a second message, the active-man-made computing element being part of a system including at least
 an artificially assembled multiplicity of man-made computing elements; and
 a multiplicity of artificially constructed couplings communicatively connecting the artificially assembled multiplicity of man-made computing elements to one another, such that the couplings are capable of transmitting messages between the artificial assembled multiplicity of man-made computing elements;
 a first portion of the artificially assembled multiplicity of man-made computing elements, which will be referred to as input elements, are capable of receiving input for the system that includes at least a set of instructions chosen by the user and input data, implementing the instructions causes parameters of the active man-made computing elements to be set to particular settings; and
 a second portion of the artificially assembled multiplicity of man-made computing elements, which will be referred to as output elements, each have a content that represents output of the system, the content being based on the instructions and on the input data, the content being a result of applying a transformation to the input data, the transformation being caused by the particular settings that result from implementing the instructions.

39. The system of claim 38, wherein the amplifier includes at least two stages, the first outputs an inverted signal, which is a signal that is inverted with respect to the input signal; and the second stage inverts the inverted signal output of the first stage.

40. The system of claim 38, wherein the positive feedback includes at least a capacitor.

41. The system of claim 40, wherein the output controls a gate voltage of an field effect transistor that drains the capacitor.

42. The system of claim 38, wherein said combination is a sum.

43. A system comprising:
an active man-made computing element capable of sending and receiving messages, wherein the active computing element comprises:
an amplifier having an input and an output;
a positive feed from the output to the input; and
a switch for ending the positive feedback;
the active man-made computing element being associated with a threshold, wherein if a combination of messages received at some time is less than the threshold, the active man-made computing element sends a message; and
the active man-made computing element also being associated with a refractory period, wherein after sending a first message, the active man-made computing element waits until after the refractory period passes prior to sending a second message.

44. A system comprising:
an active man-made computing element capable of sending and receiving messages, wherein the active computing element comprises:
an amplifier having an input to the output;
a positive feed from the output to the input; and
a switch for ending the positive feedback;
the active man-made computing element being associated with a threshold interval, wherein if a combination of messages received at some is outside the range of a lower threshold and upper threshold, the active man-made computing element sends a message; and
the active man-made computing element also being associated with a refractory period, wherein after sending a first message, the active man-made computing element waits until after the refractory period passes prior to sending a second message.

45. A system comprising:
an active computing element capable of sending and receiving messages, wherein the active computing element comprises:
an amplifier having an input and an output;
a positive feed from the output to the input; and
a switch for ending the positive feedback;
the active man-made computing element being associated with a threshold interval, wherein if a combination of messages received at some time is inside the range of a lower threshold and upper threshold, the active man-made computing element sends a message; and
the active man-made computing element also being associated with refractory period, wherein after sending a first message, the active man-made computing element waits until after the refractory period passes prior to sending a second message.

46. A method comprising:
building a set of machines, wherein each machine includes artificially assembled multiplicity of man-made computing elements connected to one or more of other man-made active elements of the collection, wherein each man-made active element is capable of sending and receiving messages, each machine including at least
a first portion of the artificial assembled multiplicity of man-made computing elements, which will be referred to as input elements, are capable of receiving input for the system that includes at least a set of instructions chosen by the user and input data, implementing the instructions causes parameters of the active man-made computing elements to be set to particular settings; and
a second portion of the artificially assembled multiplicity of man-made computing elements, which will be referred to as output elements, each have a content that represents output of the system, the content being based on the instructions and on the input data, the content being a result of applying a transformation to the input data, the transformation being caused by the particular settings that result from implementing the instructions; and
determining a value for an overall ability of a machine from the set to represent a given output based on a given input;
storing the value; and
randomly choosing at least two machines from the set wherein the process of randomly choosing is performed in a manner such that a probability of selecting a particular machine is proportional to the overall ability associated with the particular machine.

47. The method of claim 46, further comprising:
randomly choosing whether to move a group of man-made active elements from a first one of the two machines chosen to a second one of the two machines chosen.

48. The method of claim 46, further comprising:
randomly choosing whether to change a parameter of a first one of the two machines.

49. The method of claim 46, wherein an execution speed of a given machine from the set contributes to the overall ability of the given machine.

50. The method of claim 46, wherein a number representing how many active elements are in a given machine from the set contributes to the overall ability of the given machine.

51. The method of claim 46, wherein a number representing how many couplings are in a given machine of the set contributes to the overall ability of the given machine.

52. The method of claim 46, wherein a computational accuracy of a given machine from the set contributes to the overall ability of the given machine.

53. The method of claim 46, further comprising:
determining a value for an overall ability of a machine to represent a given output based on a given input;
storing the value;
randomly choosing two machines from the set, wherein the process of randomly choosing is performed in a manner such that a probability of selecting a particular machine is proportional to the overall ability associated with the particular machine;
randomly choosing a first number;

if the first number is less than a first threshold moving a group of man-made active elements from a first one of the two machines chosen to a second one of the two machines chosen;
randomly choosing a second number;
if the second number is less than a second threshold changing a parameter of the first one of the two machine;
randomly choosing a third number;
if the third number is less than a third threshold changing a parameter of the second one of the two machines.

54. The method of claim 46, the building is performed by at least
   for each machine, constructing at least one input module, at least one output module, and one or more internal modules, wherein the at least one input module, the at least one output module, and one or more internal modules are connected to one another by external connections;
   for each machine, randomly choosing a number of modules therein;
   for each module, randomly choosing a number of man-made active elements;
   for each man-made active element, randomly choosing a refractory period, which is a time period between when the man-made active element receives a first message and is capable of sending a second message;
   for each man-made active element, randomly choosing a number of connections;
   for each connection between two man-made active elements, randomly choosing a message width;
   for each connection between two man-made active elements, randomly choosing an amplitude associated with messages traveling on the connection;
   for each man-made active element, randomly choosing a threshold, wherein if a combination of amplitudes of incoming messages is greater than the threshold, the man-made active element sends a message; and
   for each connection between two man-made active elements, randomly choosing a transmission time, which is a time between a sending of a message and a receiving of the message.

55. The method of claim 46, the build is performed by at least
   for each machine, constructing at least one input module, at least one output module, and one or more internal modules, wherein the at least one input module, the at least one output module, and one or more internal modules are connected to one another by external connections;
   for each machine, randomly choosing a number of modules therein;
   for each module, randomly choosing a number of active elements;
   for each active element, randomly choosing a refractory period, which is a time period between when the active element receives a first message and is capable of sending a second message;
   for each active element, randomly choosing a number of connections;
   for each connection between two active elements, randomly choosing a message width;
   for each connection between two active elements, randomly choosing an amplitude associated with messages traveling on the connection;
   for each active element, randomly choosing a threshold, wherein if a combination of amplitudes of incoming messages is less than the threshold, the active element sends a message; and
   for each connection between two active elements, randomly choosing a transmission time, which is a time between a sending of a message and a receiving of the message.

56. The method of claim 46, the building is performed by at least
   for each machine, constructing at least one input module, at least one output module, and one or more internal modules, wherein the at least one input module, the at least one output module, and one or more internal modules are connected to one another by external connections;
   for each machine, randomly choosing a number of modules therein;
   for each module, randomly choosing a number of man-made active elements;
   for each man-made active element, randomly choosing refractory period, which is a time period between when the man-made active element receives a first message and is capable of sending a second message;
   for each man-made active element, randomly choosing a number of connections;
   for each connection between two man-made active elements, randomly choosing a message width;
   for each connection between two man-made active elements, randomly choosing an amplitude associated with messages traveling on the connection;
   for each man-made active element, randomly choosing a threshold, wherein if a combination of amplitudes of incoming messages is less than the threshold, the man-made active element sends a message; and
   for each connection between two man-made active elements, randomly choosing a transmission time, which is a time between a sending of a message and a receiving of the message.

57. A system comprising:
   programmable hardware including at least
   a non-transient machine readable medium storing at least
      a user-defined set of commands that specify a set of parameters, where implementing the user-defined set of commands causes the parameters of the active computing elements to be set to the particular settings; and
      a set of active computing elements for sending and receiving messages, the set of active computing elements including at least
         an input unit for receiving
            the user-defined set of the commands, and
            input data, and
         an output unit for presenting output data that is based on the user defined set of the commands and on the input data, the output data being a result of applying a transformation to the input data, the transformation being caused by the particular settings that result from implementing the user-defined set of the commands.

58. The system of claim 57, the set of active computing elements being a set of instructions defining a virtual set of active computing elements, the set of instructions being stored on the computer readable medium; and
   the programmable hardware further including at least one processor for implementing the instructions, implementing the instructions causes the at least one processor to perform a simulation of a hardware set of active computing elements that correspond to the virtual set of active computing elements.

59. The system of claim 57, the set of active computing elements being a hardware set of active computing elements.

60. The system of claim 57, the commands are represented by a symbolic notation having an S-expression syntax.

61. The system of claim 57, the commands are represented by a symbolic notation having a syntax in which a statement includes at least a list of elements.

62. The system of claim 57, the commands including at least one command that specifies a connection between at least two active computing elements.

63. The system of claim 57, the commands including at least one command that specifies an identification of an active computing element.

64. The system of claim 57, the commands including at least one command that specifies a time for firing a given active element.

65. The system of claim 57, the commands including at least one command that specifies a set of commands to be implemented and specifies parameters of the commands in the set of commands.

66. The system of claim 57, the commands including at least one command that specifies a window of time within which another command is implemented.

67. The system of claim 57 the commands including at least one command that communicates computational results from one set of active computing elements in a form that is readable by another set of active computing elements.

68. The system of claim 57, the input unit including at least one active computing element of the set of active computing elements.

69. The system of claim 57, the output unit including at least one active computing element of the set of active computing elements.

70. A method comprising: implementing the system of claims 57, 58, 59, 60, 61, 62, 63, 64, 65, 66, 67, or 68 and designing a programmable unit using the commands on the programmable hardware.

71. A computer product comprising a non-transient machine-readable medium that stores one or more instructions that cause a man-made machine to set one or more parameters of one or more physical man-made active elements to effect a transformation of a set of input data to a set of output data; wherein a physical man-made active element is a physical man-made computing element capable of sending and receiving messages, the physical man-made active element being associated with parameters that are capable of being adjusted and readjusted; one of the parameters being a time at which another parameter is adjusted or readjusted as a result of carrying out the one or more instructions.

72. A system comprising:
programmable hardware including at least
a machine readable medium storing at least a user-defined set of commands that specify a set of parameters, where implementing the user-defined commands causes the parameters of the active computing elements to c set to particular settings;
a set of man-made hardware active computing elements for sending and receiving messages, the set of man-made hardware active computing elements including at least
an input unit, that includes a first subset of the man-made hardware active elements, that receive
the user-defined set of the commands, and
input data, and
an output unit, that includes a first subset of the man-made hardware active elements, that presents output data that is based on the commands and on the input data, the output data being a result of applying a transformation to the input data, the transformation being caused by the particular settings that result from implementing the commands.

* * * * *